United States Patent
Courtemanche et al.

(10) Patent No.: US 12,441,844 B2
(45) Date of Patent: Oct. 14, 2025

(54) METHODS FOR MAKING POLYFUNCTIONAL ORGANOSILOXANES AND COMPOSITIONS CONTAINING SAME

(71) Applicants: Dow Silicones Corporation, Midland, MI (US); Dow Global Technologies LLC, Midland, MI (US)

(72) Inventors: Marc-Andre Courtemanche, Midland, MI (US); Anne-Catherine Bedard, Midland, MI (US); Heather Spinney, Midland, MI (US); David Wilson, Midland, MI (US); Arjun Raghuraman, Pearland, TX (US); Sukrit Mukhopadhyay, Midland, MI (US); Travis Sunderland, Midland, MI (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 482 days.

(21) Appl. No.: 17/916,827

(22) PCT Filed: Jun. 16, 2021

(86) PCT No.: PCT/US2021/037540
§ 371 (c)(1),
(2) Date: Oct. 4, 2022

(87) PCT Pub. No.: WO2021/262494
PCT Pub. Date: Dec. 30, 2021

(65) Prior Publication Data
US 2023/0151156 A1    May 18, 2023

Related U.S. Application Data

(60) Provisional application No. 63/043,152, filed on Jun. 24, 2020.

(51) Int. Cl.
C08G 77/12     (2006.01)
C08G 77/08     (2006.01)
C08G 77/16     (2006.01)

(52) U.S. Cl.
CPC ............. *C08G 77/12* (2013.01); *C08G 77/08* (2013.01); *C08G 77/16* (2013.01)

(58) Field of Classification Search
CPC ........ C08G 77/12; C08G 77/08; C08G 77/16; C08L 83/04
See application file for complete search history.

(56) References Cited

U.S. PATENT DOCUMENTS

| | | |
|---|---|---|
| 3,159,601 A | 12/1964 | Ashby et al. |
| 3,220,972 A | 11/1965 | Lamoreaux et al. |
| 3,296,291 A | 1/1967 | Scotia et al. |
| 3,419,593 A | 12/1968 | Willing et al. |
| 3,516,946 A | 6/1970 | Scotia et al. |
| 3,814,730 A | 6/1974 | Karstedt et al. |
| 3,989,668 A | 11/1976 | Lee et al. |
| 4,374,967 A | 2/1983 | Brown et al. |
| 4,766,176 A | 8/1988 | Lee et al. |
| 4,784,879 A | 11/1988 | Lee et al. |
| 5,017,654 A | 5/1991 | Togashi et al. |
| 5,036,117 A | 7/1991 | Chung et al. |
| 5,175,325 A | 12/1992 | Brown et al. |
| 5,625,023 A | 4/1997 | Chung et al. |
| 6,586,535 B1 | 7/2003 | Clark et al. |
| 6,624,254 B1 | 9/2003 | Arriola et al. |
| 6,806,339 B2 | 10/2004 | Cray et al. |
| 7,064,173 B2 | 6/2006 | Rubinsztajn et al. |
| 8,048,819 B2 | 11/2011 | Rubinsztajn et al. |
| 8,304,543 B2 | 11/2012 | Jialanella et al. |
| 8,722,153 B2 | 5/2014 | Ekeland |
| 8,933,177 B2 | 1/2015 | Hori et al. |
| 9,035,008 B2 | 5/2015 | Yang et al. |
| 9,156,948 B2 | 10/2015 | Brandstadt et al. |
| 9,593,209 B2 | 3/2017 | Dent et al. |
| 9,670,392 B2 | 6/2017 | Larson et al. |
| 11,133,504 B2 | 9/2021 | Kawakami et al. |
| 2003/0088042 A1 | 5/2003 | Griswold et al. |
| 2003/0139287 A1 | 7/2003 | Deforth et al. |
| 2004/0254274 A1 | 12/2004 | Griswold |
| 2005/0038188 A1 | 2/2005 | Ahn et al. |

(Continued)

FOREIGN PATENT DOCUMENTS

| | | |
|---|---|---|
| EP | 0556023 A1 | 8/1993 |
| EP | 0347895 B | 11/1993 |

(Continued)

OTHER PUBLICATIONS

Becke, "Density-functional thermochemistry. III. The role of exact exchange", J. Chem. Phys., 1993, 98, p. 5648.
Chojnowski, "Hydried Transfer Ring-Opening Polymerization of a Cyclic Oligomethylhydrosiloxane. Route to a Polymer of Closed Multicyclic Structure", Macromolecules 2012, vol. 45, pp. 2654-2661.
Chojnowski, "Mechanism of the B($C_6F_5$)3-Catalyzed Reaction of Silyl Hydrides with Alkoxysilanes. Kinetic and Spectroscopic Studies", Organometallics, 2005, 24, pp. 6077-6084.

(Continued)

*Primary Examiner* — Randy P Gulakowski
*Assistant Examiner* — Virginia L Stonehocker
(74) *Attorney, Agent, or Firm* — Catherine U. Brown

(57) ABSTRACT

A polyfunctional organohydrogensiloxane is prepared using a fluorinated triarylborane Lewis acid as catalyst. The polyfunctional organohydrogensiloxane may be formulated into release coating compositions. Alternatively, the polyfunctional organohydrogensiloxane may be further functionalized with a curable group to form a clustered functional organosiloxane. The clustered functional organosiloxane may be formulated into thermal radical cure adhesive compositions.

19 Claims, No Drawings

(56) References Cited

U.S. PATENT DOCUMENTS

| | | |
|---|---|---|
| 2006/0241271 A1 | 10/2006 | Rubinsztajn et al. |
| 2007/0289495 A1 | 12/2007 | Cray et al. |
| 2011/0287267 A1 | 11/2011 | Hori et al. |
| 2016/0053056 A1 | 2/2016 | Gould et al. |

FOREIGN PATENT DOCUMENTS

| | | |
|---|---|---|
| WO | 0212386 A1 | 2/2002 |
| WO | 2013142956 A1 | 10/2013 |
| WO | 2019023008 A1 | 1/2019 |
| WO | 2019055740 A1 | 3/2019 |
| WO | 2019182986 A1 | 9/2019 |
| WO | 2019182993 A1 | 9/2019 |
| WO | 2020131365 A1 | 6/2020 |
| WO | 2020247334 A1 | 12/2020 |

OTHER PUBLICATIONS

Chojnowski, "Oligomerization of Hydrosiloxanes in the Presence of Tris(pentaflurophenyl)borane", Macromolecules, 2006, 39, pp. 3802-3807.

Ditchfield, "Self-Consistent Molecular-Orbital Methods. IX. An Extended Gaussian-Type Basis for Molecular-Orbital Studies of Organic Molecules", J. Chem. Phys., 1971, vol. 54, p. 724.

Fawcett, "Rapid, Metal-Free Room Temperature Vulcanization Produces Silicone Elastomers", Polym. Sci. A Polym. Chem., 2013, 51, pp. 644-652.

Gordon, "The Isomers of Silacyclopropane", Chem. Phys. Lett. 1980, vol. 76, p. 163.

Hehre, "Self-Consistent Molecular Orbital Methods. XII. Further Extensions of Gaussian-Type Basis Sets for Use in Molecular Orbital Studies of Organic Molecules", J. Chem. Phys., 1972, vol. 56, p. 2257.

Herrington, "Novel H2 activation by a tris[3,5-bis(trifluoromethyl)phenyl]borane frustrated Lewis pair", Dalton Trans., 2012, vol. 41, p. 9019.

Lee, C. et al., Phys. Rev B 1988, 37, 785.

Miehlich, "Results Obtained with the Correlation Energy Density Functionals of Becke and Lee, Yang and Parr", Chem. Phys. Lett., 1989, vol. 157, p. 200.

Destreich, "A unified survey of Si—H and H-H bond activation catalyzed by electron-deficient boranes", Chem. Soc. Rev., 2015, 44, pp. 2202-2220.

Piers, "Mechanistic Aspects of Bond Activation with Perfluoroarylboranes", Inorg. Chem., 2011, 50, p. 12252-12262.

Poater, "SambVca: A Web Application for the Calculation of the Buried Volume N-Heterocyclic Carbene Ligands", Eur. J. Inorg. Chem., 2009, p. 1759.

Watson, "Colored indicators for simple direct titration of magnesium and lithium reagents", J. Organomet. Chem., 1967, vol. 9, pp. 165-168.

METHODS FOR MAKING POLYFUNCTIONAL ORGANOSILOXANES AND COMPOSITIONS CONTAINING SAME

CROSS REFERENCE TO RELATED APPLICATIONS

This application is a U.S. national stage filing under 35 U.S.C. § 371 of PCT Application No. PCT/US21/037540 filed on 16 Jun. 2021, which claims the benefit of U.S. Provisional Patent Application No. 63/043,152 filed 24 Jun. 2020 under 35 U.S.C. § 119 (e). PCT Application No. PCT/US21/037540 and U.S. Provisional Patent Application No. 63/043,152 are each hereby incorporated by reference.

TECHNICAL FIELD

A method for making a polyfunctional organosiloxane is disclosed. The polyfunctional organosiloxane comprises a linear polydiorganosiloxane backbone with cyclic siloxane endblockers. The polyfunctional organosiloxane is useful in curable compositions, e.g., as a crosslinker.

BACKGROUND

Methods for making polyfunctional organosiloxane crosslinkers having linear polydiorganosiloxane backbones with cyclic siloxane endblockers have been proposed using a platinum-catalyzed reaction of cyclic polyorganohydrogensiloxanes with either vinyl-terminated polydiorganosiloxanes or hydroxyl-terminated polydiorganosiloxanes. These methods suffer from the drawbacks of requiring purification of the cyclic polyorganohydrogensiloxanes, which is costly. These methods further suffer from the drawback of poor ability to control structure and molecular weight of the products.

SUMMARY

A method for preparing a polyfunctional organohydrogensiloxane using a fluorinated triarylborane Lewis acid as catalyst is disclosed. The method may further comprise functionalizing the polyfunctional organohydrogensiloxane to form a clustered functional organosiloxane. The polyfunctional organohydrogensiloxane and the clustered functional organosiloxane are useful in curable compositions.

DETAILED DESCRIPTION OF THE INVENTION

The polyfunctional organohydrogensiloxane prepared by the method described herein comprises a linear polydiorganosiloxane backbone with cyclic SiH functional endblockers. The polyfunctional organohydrogensiloxane may be used as a crosslinker. The polyfunctional organohydrogensiloxane is useful in curable compositions, such as release coating compositions.

A method for preparing a product comprising the polyfunctional organohydrogensiloxane comprises the steps of:

1) combining starting materials comprising
   A) a fluorinated triarylborane Lewis acid;
   B) a hydroxyl-functional organosilicon compound of formula

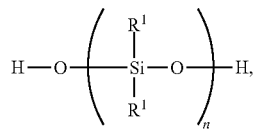

where
  each subscript n is 1 to 2,000, and each $R^1$ is independently selected from the group consisting of monovalent hydrocarbon groups and monovalent halogenated hydrocarbon groups; and C) a cyclic polyorganohydrogensiloxane of formula $(RHSiO_{2/2})_v$, where subscript v is 3 to 12; and each R is an independently selected monovalent hydrocarbon group; thereby preparing the product comprising the polyfunctional organohydrogensiloxane and a by-product comprising $H_2$. The starting materials in step 1) may optionally further comprise D) a solvent.

The method may optionally further comprise one or more additional steps. The method may further comprise recovering the polyfunctional organohydrogensiloxane. The method may further comprise: step 2) during and/or after step 1), removing the $H_2$ generated during formation of the polyfunctional organohydrogensiloxane and/or step 3) removing and/or neutralizing residual fluorinated triarylborane Lewis acid in the product. By-product $H_2$ may be removed by any convenient means, such as stripping and/or burning. Removing and/or neutralizing may be performed by adding E) a neutralizing agent to the product and optionally thereafter filtering the product. Steps 2) and 3) may be performed in any order. If a particulate by-product is present, e.g., as a result of neutralization, the method may further comprise step 4) removing a particulate such as alumina after neutralization by any convenient means, such as filtration.

One or more of the method steps may be performed at a temperature of 5° C. to 70° C., alternatively 5° C. to 65° C., alternatively 10° C. to 60° C., alternatively 15° C. to 50° C., alternatively 20° C. to 35° C., alternatively 5° C. to 30° C., and alternatively 30° C. Alternatively, step 1) may be performed at the temperature of 5° C. to 70° C., alternatively 5° C. to 65° C., alternatively 10° C. to 60° C., alternatively 15° C. to 50° C., alternatively 20° C. to 35° C., alternatively 5° C. to 30° C., and alternatively 30° C. Without wishing to be bound by theory, it is thought that performing the method, particularly step 1) at relatively low temperatures (e.g., 90° C. or less, alternatively 80° C. or less, alternatively 70° C. or less, and alternatively 50° C. or less) may provide improved reaction rate, yield, or both.

The starting materials used in step 1) of the method, alternatively steps 1), 2), and 3) of the method, may be free of platinum group metal catalysts. "Free of" as used herein includes none, alternatively an amount non-detectable by GC, and alternatively an amount insufficient to cause performance problems of release coatings prepared from release coating compositions including the polyfunctional organohydrogensiloxane made by the method described herein.

Starting Material A) Catalyst

Starting material A) in the method described herein is a fluorinated triarylborane Lewis acid. The fluorinated triarylborane Lewis acid has formula:

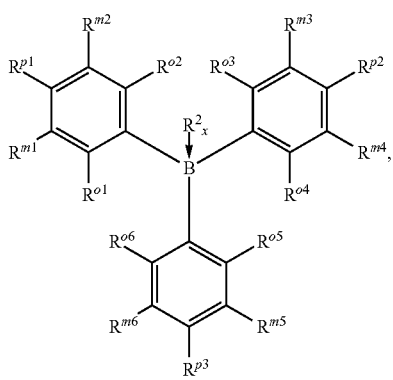

where each $R^o$ is an ortho substituent, each $R^m$ is a meta substituent, and each $R^p$ is a para substituent, $R^2$ is optional and includes a functional group or a functional polymer group; and subscript x is 0 or 1. In the formula above, each of $R^{o1-6}$, each of $R^{m1-6}$, and each of $R^{p1-3}$ is independently selected from H, F, or $CF_3$; with the provisos that: not all of $R^{o1-6}$, $R^{m1-6}$, and $R^{p1-3}$ can be F simultaneously; not all of $R^{o1-6}$, $R^{m1-6}$, and $R^{p1-3}$ can be H simultaneously; and when two or more of $R^{o1-4}$ are $CF_3$, then $R^{o5}$ and $R^{o6}$ are each independently selected from H or F. $R^2$ is optional, i.e., $R^2$ is present when subscript x=1 and $R^2$ is absent when subscript x=0. $R^2$ may be a Lewis base that forms a complex with the fluorinated triarylborane Lewis acid and/or a molecule or moiety that contains at least one electron pair that is available to form a dative bond with the Lewis acid, and may be as described for $R^4$ in WO2019/055740 at paragraphs [0024] to [0025]. Examples of $R^2$ include cyclic ethers such as tetrahydrofuran or tetrahydropyran. Alternatively, $R^2$ may be tetrahydrofuran (THF).

Alternatively, each of $R^{o1}$, $R^{o2}$, $R^{o3}$, $R^{o4}$, $R^{o5}$, and $R^{o6}$ may be H. Alternatively, each of $R^{o1}$, $R^{o2}$, $R^{o3}$, and $R^{o4}$ may be H. Alternatively, each of $R^{o5}$ and $R^{o6}$ may be F.

Alternatively, each of $R^{m1}$, $R^{m2}$, $R^{m3}$, $R^{m4}$, $R^{m5}$, and $R^{m6}$ may be $CF_3$. Alternatively, each of $R^{m1}$, $R^{m2}$, $R^{m3}$, and $R^{m4}$ may be $CF_3$. Alternatively, each of $R^{m5}$ and $R^{m6}$ may be F. Alternatively, each of $R^{m5}$ and $R^{m6}$ may be H.

Alternatively, each of $R^{p1}$, $R^{p2}$, and $R^{p3}$ may be H. Alternatively, $R^{p1}$ and $R^{p2}$ may be H. Alternatively, $R^{p3}$ may be F. Alternatively, $R^{p3}$ may be $CF_3$.

Alternatively, each of $R^{o1}$, $R^{o2}$, $R^{o3}$, $R^{o4}$, $R^{o5}$, $R^{o6}$, $R^{p1}$, $R^{p2}$, and $R^{p3}$ may be H; and each of $R^{m1}$, $R^{m2}$, $R^{m3}$, $R^{m4}$, $R^{m5}$, and $R^{m6}$ may be $CF_3$. Subscript x may be 1. Alternatively, starting material A) may comprise tris(3,5-bis(trifluoromethyl)phenyl)borane THF adduct.

Alternatively, each of $R^{o1}$, $R^{o2}$, $R^{o3}$, $R^{o4}$, $R^{o5}$, $R^{o6}$, $R^{m5}$, $R^{m6}$, $R^{p1}$, and $R^{p2}$, may be H; and each of $R^{m1}$, $R^{m2}$, $R^{m3}$, $R^{m4}$, and $R^{p3}$ may be $CF_3$. Subscript x may be 1. Alternatively, starting material A) may comprise bis(3,5-bis(trifluoromethyl)phenyl)(4-trifluoromethylphenyl)borane THF adduct.

Alternatively, each of $R^{o1}$, $R^{o2}$, $R^{o3}$, $R^{o4}$, $R^{m5}$, $R^{m6}$, $R^{p1}$, and $R^{p2}$ may be H; each of $R^{o5}$, $R^{o6}$, and $R^{p3}$ may be F; and each of $R^{m1}$, $R^{m2}$, $R^{m3}$, $R^{m4}$, may be $CF_3$. Subscript x may be 1. Alternatively, starting material A) may comprise bis (3,5-bis(trifluoromethyl)phenyl)(2,4,6-trifluorophenyl)borane THF adduct.

Alternatively, each of $R^{o1}$, $R^{o2}$, $R^{o3}$, $R^{o4}$, $R^{m5}$, $R^{m6}$, $R^{p1}$, $R^{p2}$, and $R^{p3}$ may be H; $R^{o5}$ and $R^{o6}$ may be F; and each of $R^{m1}$, $R^{m2}$, $R^{m3}$, and $R^{m4}$ may be $CF_3$. Subscript x may be 1. Alternatively, starting material A) may comprise bis(3,5-bis(trifluoromethyl)phenyl)(2,6-difluorophenyl)borane THF adduct.

Alternatively, each of $R^{o1}$, $R^{o2}$, $R^{o3}$, $R^{o4}$, $R^{o5}$, $R^{m6}$, $R^{p1}$, $R^{p2}$, and $R^{p3}$ may be H; and each of $R^{m1}$, $R^{m2}$, $R^{m3}$, $R^{m4}$, $R^{m5}$, and $R^{o6}$ may be $CF_3$. Subscript x may be 0. Alternatively, starting material A) may comprise bis(3,5-bis(trifluoromethyl)phenyl)(2,5-bis(trifluoromethyl)phenyl)borane.

Alternatively, each of $R^{m1}$, $R^{p1}$, $R^{o2}$, $R^{o3}$, $R^{o4}$, $R^{p2}$, $R^{p3}$, $R^{o5}$, and $R^{m6}$ may be H; and each of $R^{o1}$, $R^{m2}$, $R^{m3}$, $R^{m4}$, $R^{o6}$, and $R^{m5}$ may be $CF_3$. Subscript x may be 0. Alternatively, starting material A) may comprise (3,5-bis(trifluoromethyl)phenyl)bis(2,5-bis(trifluoromethyl)phenyl)borane.

Alternatively, each of $R^{o1}$, $R^{o2}$, $R^{o3}$, $R^{o4}$, $R^{p1}$, and $R^{p2}$ may be H; each of $R^{o5}$, $R^{o6}$, $R^{m5}$, and $R^{m6}$ may be F; and each of $R^{m1}$, $R^{m2}$, $R^{m3}$, $R^{m4}$, and $R^{p3}$ may be $CF_3$. Subscript x may be 1. Alternatively, starting material A) may comprise bis(3,5-bis(trifluoromethyl)phenyl)(2,3,5,6-tetrafluoro-4-trifluoromethylphenyl)borane THF adduct.

Alternatively, the fluorinated triarylborane Lewis acid may be selected from the group consisting of tris(3,5-bis (trifluoromethyl)phenyl)borane THF adduct; bis(3,5-bis(trifluoromethyl)phenyl)(2,4,6-trifluorophenyl)borane THF adduct; and bis(3,5-bis(trifluoromethyl)phenyl)(2,5-bis(trifluoromethyl)phenyl)borane. Alternatively, starting material A) may be bis(3,5-bis(trifluoromethyl)phenyl)(2,5-bis(trifluoromethyl)phenyl)borane.

Fluorinated triarylborane Lewis acids are known in the art, and may be prepared by known methods, for example, the methods disclosed in WO2019/055740, particularly at paragraphs [0052] to [0096] by varying appropriate starting materials.

The amount of starting material A) will depend on the type and amount of other starting materials used, however, starting material A) may be present in an amount of 5 ppm to 6000 ppm based on combined weights of starting materials A), B) and C). Alternatively, the amount may be 5 ppm to 600 ppm, alternatively 5 ppm to 500 ppm, alternatively 5 ppm to 100 ppm on the same basis.

Starting Material B) Hydroxyl-Functional Organosilicon Compound

Starting material B) is a hydroxyl-functional organosilicon compound of formula B-1):

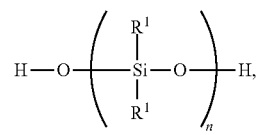

where each subscript n is 1 to 2,000, and each $R^1$ is independently selected from the group consisting of monovalent hydrocarbon groups and monovalent halogenated hydrocarbon groups. Alternatively, subscript n may have a value such that $2 \leq n \leq 2,000$, alternatively $2 \leq n \leq 1,000$, alternatively $5 \leq n \leq 900$, alternatively $5 \leq n \leq 50$, and alternatively $5 \leq n \leq 15$. Alternatively, each $R^1$ may be independently selected from the group consisting of an alkyl group of 1 to 20 carbon atoms, an alkenyl group of 2 to 20 carbon atoms, an aryl group of 6 to 20 carbon atoms or a halogenated alkyl group of 1 to 20 carbon atoms. Suitable alkyl groups include methyl, ethyl, and propyl (including n-propyl and isopropyl). Suitable alkenyl groups include vinyl, allyl, and hexenyl. Suitable aryl groups include phenyl, tolyl, and benzyl. Suitable halogenated alkyl groups include chloromethyl, chloropropyl, and trifluoropropyl. Alternatively, each $R^1$ may be independently selected from the group consisting of methyl, vinyl, phenyl, and trifluoropropyl.

When subscript n=1, starting material B) may be a hydroxyl-functional silane, such as dimethyldisilanol. Hydroxyl-functional silanes are commercially available. Alternatively, when subscript n≥2, then starting material B) may be a hydroxyl-terminated polydiorganosiloxane. Hydroxyl-terminated polydiorganosiloxanes suitable for use as starting material B) may be prepared by methods known in the art, such as hydrolysis and condensation of the corresponding organohalosilanes or equilibration of cyclic polydiorganosiloxanes. Exemplary hydroxyl-terminated polydiorganosiloxanes are hydroxyl-terminated polydimethylsiloxanes. Suitable hydroxyl-terminated polydimethylsiloxanes are also commercially available, e.g., from Gelest, Inc. of Morrisville, Pennsylvania, USA, such as DMS-S12, DMS-S14, DMS-S15, DMS-S21, DMS-S27, DMS-S41, DMS-S32, DMS-S33, DMS-S35, DMS-S42, and DMS-S45. Starting material B) may be one hydroxyl-functional organosilicon compound or a combination of two or more hydroxyl-functional organosilicon compounds that differ from one another.

Starting Material C) Cyclic Polyorganohydrogensiloxane

Starting material C) for the method described herein is a cyclic polyorganohydrogensiloxane of formula C-1): $(RHSiO_{2/2})_v$, where subscript v is 3 to 12, and each R is an independently selected monovalent hydrocarbon group. Alternatively, subscript v may be 4 to 10, alternatively 4 to 8. Alternatively, subscript v may have an average value of 4 to 6, alternatively 4 to 5, and alternatively 4. In formula C-1), R may be an alkyl group of 1 to 6 carbon atoms. Alternatively, R may be methyl, ethyl, or propyl. Alternatively, R may be methyl.

Examples of suitable cyclic polyorganohydrogensiloxanes for starting material C) include tetramethylcyclotetrasiloxane, pentamethylcyclopentasiloxane, hexamethylcyclohexasiloxane, and combinations of two or more thereof. Suitable cyclic polyorganohydrogensiloxanes are known in the art and are commercially available, e.g., from Dow Silicones Corporation of Midland, Michigan, USA.

The amounts of starting materials B) and C) depend on various factors including the OH content of B), the hydroxyl-functional organosilicon compound, and the silicon-bonded hydrogen (SiH) content of C), the cyclic polyorganohydrogensiloxane. However, amounts are sufficient to provide a molar ratio of SiH in starting material C) to OH in starting material B) (SiH:OH ratio) of 4:1 to 40:1, alternatively 5:1 to 20:1, and alternatively 5:1 to 10:1.

Starting Material D) Solvent

A solvent may be used in the method. The solvent may facilitate introduction of certain starting materials, such as starting material A), the fluorinated triarylborane Lewis acid. Solvents used herein are those that help fluidize the starting materials, but essentially do not react with any of these starting materials. Solvent may be selected based on solubility of the starting materials and volatility of the solvent. The solubility refers to the solvent being sufficient to dissolve and/or disperse the starting materials. Volatility refers to vapor pressure of the solvent.

Suitable solvents may be hydrocarbons. Suitable hydrocarbons include aromatic hydrocarbons such as benzene, toluene, or xylene; and/or aliphatic hydrocarbons such as heptane, hexane, or octane. Alternatively, the solvent may be a halogenated hydrocarbon such as dichloromethane, 1,1,1-trichloroethane or methylene chloride. One solvent, or a combination comprising two or more solvents may be used herein.

The amount of solvent can depend on various factors including the type of solvent selected and the amount and type of other starting materials selected. However, the amount of solvent may range from 0.1% to 99%, alternatively 2% to 50%, based on combined weights of starting materials A), B), and C).

Starting Material E) Neutralizing Agent

Starting material E) is a neutralizing agent that may optionally be used to neutralize starting material A) after the product forms. Alumina, triphenylamine, triethylamine, triphenylphosphine, and phenylacetylene are suitable neutralizing agents. Neutralizing agents are known in the art and are commercially available, e.g., from Millipore Sigma of St. Louis, Missouri, USA. The amount of neutralizing agent depends on various factors including the amount of starting material A), however, starting material E) may be present in an amount sufficient to provide a weight ratio of neutralizing agent to fluorinated triarylborane Lewis acid (E:A ratio) of 1:100 to 1:1000, alternatively 1:1 to 1000:1, and alternatively 1:100 to 1:1. Alternatively, when the neutralizing agent is triphenylphosphine or phenylacetylene, the E:A ratio may be 1:1 to 20:1. Alternatively, when the neutralizing agent is alumina, the E:A ratio may be 100:1 to 1000:1.

Product of the Method

The product of the method described above comprises a) a polyfunctional organohydrogensiloxane and a by-product comprising $H_2$. The product may comprise a polyfunctional organohydrogensiloxane of general formula

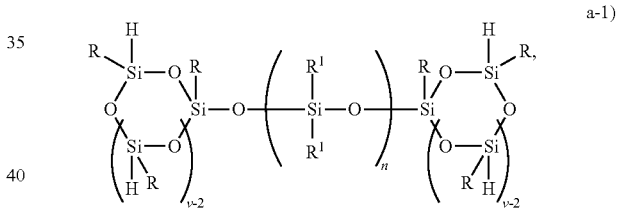

(a-1)

where subscripts v and n and groups R and $R^1$ are as described above, with the proviso that one or more of the hydrogen atoms in formula a-1) may be replaced by a group of formula a-2):

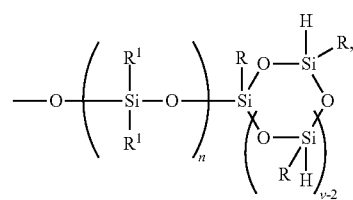

where each of subscript n, subscript p, R and $R^1$ are independently selected and described above. Alternatively, the product may comprise a polyfunctional organohydrogensiloxane of unit formula a-3): $[(HRSiO_{2/2})_{v-1}(—RSiO_{2/2})]_2[O—(R^1{}_2SiO_{2/2})_n]_{n'}[(HRSiO_{2/2})_{v-2}(—RSiO_{2/2})_2]_{o'}$, where subscripts v and n and groups R and $R^1$ are as described above, subscript o' is 0 to 100 and subscript n'=(o'+1). One skilled in the art would recognize that depending on various factors including the relative amounts of starting materials B) and C), the product may comprise more than one polyfunctional organohydrogensiloxane species. The polyfunctional organohydrogensiloxane may have an average of more than two cyclic moieties and more than two linear moieties per molecule (when o'≥0). Alternatively, subscript v may have an average value of 5, subscript n may have an average value of 10, subscript n' may be 1 to 2, and subscript o' may be 0 to 1. Alternatively, subscript v may be 5, subscript n may be 10, subscript n' may be 2 and subscript o' may be 1. Alternatively, when subscript o'=0, then in the product comprises a polyfunctional organohydrogensiloxane of formula a-4):

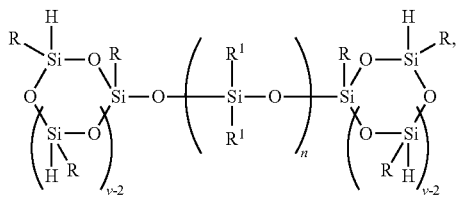

where subscripts n and v, and groups R and $R^1$ are as described above.

One skilled in the art would recognize that polyfunctional organohydrogensiloxanes having two or more linear backbone chains, and three or more cyclic groups, per molecule may also be formed and be present in the product, depending on various factors including the molar ratio of starting material B) and starting material C) selected for the method. The method described herein provides the benefit of allowing control of the polyfunctional organohydrogensiloxane architecture to minimize crosslinking when desired. For example, controlling the ratio of cyclic polyorganohydrogensiloxane and hydroxyl-functional organosilicon compound can maximize the amount of polyfunctional organohydrogensiloxane of formula a-1) where subscript o'=0, i.e., with two cyclic moieties linked via oxygen atom at the ends of a linear polydiorganosiloxane. For example, when the ratio of C) cyclic polyorganohydrogensiloxane and B) hydroxyl-functional organosilicon compound decreases, there are more chances to form crosslinked species. Therefore, starting materials B) and C) may be used in amounts such that the molar ratio of C:B is >6:1. Alternatively, starting materials B) and C) may be used in amounts such that the SiH:OH ratio is 4:1 to 40:1, alternatively 5:1 to 20:1, and alternatively 5:1 to 10:1. The method described may optionally further comprise recovering the polyfunctional organohydrogensiloxane from the product by any convenient means, such as stripping and/or distillation. The polyfunctional organohydrogensiloxane produced by the method described above may be used in hydrosilylation reaction curable compositions, such as release coating compositions, e.g., as a crosslinker or co-crosslinker.

Method for Making Clustered functional Organopolysiloxane

Alternatively, the method described above may further comprise functionalizing the polyfunctional organohydrogensiloxane to form a clustered functional organopolysiloxane. The method described above may further comprise: combining starting materials comprising
a) the polyfunctional organohydrogensiloxane; and
b) a hydrosilylation reaction catalyst; and
c) a reactive species having on average per molecule, at least one aliphatically unsaturated group capable of undergoing an addition reaction with a silicon-bonded hydrogen atom of starting material a) the polyfunctional organohydrogensiloxane, wherein starting material c) further comprises one or more curable groups per molecule. Briefly stated, this method may be performed by modifying the method described in U.S. Pat. No. 9,593,209. Starting material a) described hereinabove may be combined with the reactive species and the hydrosilylation reaction catalyst (described as components c) and d), respectively) in the amounts and under conditions described in U.S. Pat. No. 9,593,209 at col. 8, line 44 to col. 10, line 47.

Starting Material b) Hydrosilylation Reaction Catalyst

Hydrosilylation reaction catalysts suitable for starting material b) in the method for functionalizing the polyfunctional organohydrogensiloxane to form a clustered functional organopolysiloxane are known in the art and are commercially available. Hydrosilylation reaction catalysts include platinum group metal catalysts. Such hydrosilylation catalysts can be a metal selected from platinum, rhodium, ruthenium, palladium, osmium, and iridium. Alternatively, the hydrosilylation catalyst may be a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane] dichlorodirhodium, chloroplatinic acid (Speier's Catalyst), chloroplatinic acid hexahydrate, platinum dichloride, and complexes of said compounds with low molecular weight organopolysiloxanes or platinum compounds microencapsulated in a matrix or coreshell-type structure. Complexes of platinum with low molecular weight organopolysiloxanes include 1,3-diethenyl-1,1,3,3-tetramethyldisiloxane complexes with platinum (Karstedt's Catalyst) and methylvinylcyclosiloxane complexes with platinum (Ashby's Catalyst). These complexes may be microencapsulated in a resin matrix. Alternatively, a hydrosilylation catalyst may comprise 1,3-diethenyl-1,1,3,3-tetramethyldisiloxane complex with platinum. Exemplary hydrosilylation catalysts are described in U.S. Pat. Nos. 3,159,601; 3,220,972; 3,296,291; 3,419,593; 3,516,946; 3,814,730; 3,989,668; 4,784,879; 5,036,117; and 5,175,325; and EP 0 347 895 B. Microencapsulated hydrosilylation catalysts and methods of preparing them are known in the art, as exemplified in U.S. Pat. Nos. 4,766,176 and 5,017,654. The amount used may be sufficient to provide 1 ppm to 1,000 ppm of platinum group metal based on combined weights of starting materials a), b), and c).

Starting Material c) Reactive Species

Starting material c) the reactive species described above for functionalizing the polyfunctional organohydrogensiloxane to form the clustered functional organopolysiloxane may comprise a silane of formula c-1): $R^4{}_y SiR^5{}_{(4-y)}$, where subscript y is 1 to 3, each $R^4$ is the aliphatically unsaturated group capable of undergoing an addition reaction, and each $R^5$ is an organic group containing a curable functionality. Alternatively, subscript y may be 1 to 2. Alternatively, subscript y may be 1. Each $R^4$ may be independently selected from the group consisting of alkenyl (such as vinyl, allyl, and hexenyl) and alkynyl (such as propynyl or hexynyl). Each $R^5$ may be independently selected from the group consisting of an organic group containing an acrylate group, an alcohol group, an alkoxy group, an epoxy group, an isocyanate group, a methacrylate group, or a urethane group. Alternatively, each $R^5$ may be independently selected from the group consisting of an organic group containing an acrylate group, an organic group containing an epoxy group, and an organic group containing a methacrylate group. Alternatively, each $R^5$ may be an organic group containing an epoxy group. Suitable silanes are known in the art and are commercially available, e.g., from Dow Silicones Corporation of Midland, Michigan, USA or Gelest, Inc. Exemplary silanes include allyltrimethoxysilane, allyltriethoxysilane, or a combination thereof.

Alternatively, starting material c) may comprise an organic compound that does not contain a silicon atom, e.g., of formula c-2): $R^6R^7$, where each $R^6$ is an aliphatically unsaturated group capable of undergoing an addition reaction, and each $R^7$ is the curable group. Each $R^6$ may be independently selected from the group consisting of alkenyl (such as vinyl, allyl, and hexenyl) and alkynyl (such as propynyl or hexynyl). Each $R^7$ may be independently selected from the group consisting of an organic group containing an acrylate group, alcohol group, alkoxy group, epoxy group, isocyanate group, methacrylate group, and urethane group. Alternatively, each $R^7$ may be selected from the group consisting of an organic group containing an acrylate group, epoxy group, and methacrylate group. Alternatively, each $R^7$ may be an organic group containing an epoxy group. Examples of suitable compounds of formula c-2) include allyl acrylate, allyl glycidyl ether, allyl methacrylate, and combinations thereof. Alternatively, c-2) may be allyl glycidyl ether. Alternatively, c-2) may be allyl methacrylate. Suitable compounds of formula c-2) are known in the art and are commercially available, e.g., from Millipore Sigma of St. Louis, Missouri, U.S.A.

The starting materials used in the method for making the clustered functional organosiloxane may optionally further comprise one or more additional starting materials. The additional starting materials may be those additional ingredients disclosed in U.S. Pat. No. 9,593,209 at col. 10, line 48 to col. 16, line 17. The additional starting materials selected from the group consisting of filler, with or without treating agent, non-reactive resin, chain extender, endcapper, and catalyst inhibitor.

The method described above produces a product comprising a') a clustered functional organopolysiloxane, or masterbatch of clustered functional organopolysiloxane with the filler and/or non-reactive resin. The clustered functional organosiloxane may have general formula a'-1):

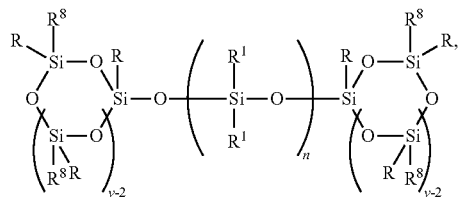

where subscript v, subscript n, R, and $R^1$ are as described above, and where each $R^8$ is independently selected from the group consisting of H and a curable group, and with the proviso that one or more of $R^8$ may be replaced with a group of formula a'-2):

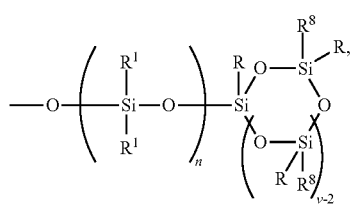

where subscript n, subscript v, R, $R^1$, and $R^8$ are as described above; with the proviso that at least one $R^8$ per molecule is the curable group. Alternatively, the clustered functional organosiloxane may have unit formula a'-3): $[(R^8RSiO_{2/2})_{v-1}(-RSiO_{2/2})]_2[O-(R^1_2SiO_{2/2})_n]_{n'}[(R^8RSiO_{2/2})_{v-2}(-RSiO_{2/2})_2]_{o'}$, where subscripts v, n, n' and o', and groups R, $R^1$, and $R^8$ are as described above. Alternatively, 1 to 4 instances of $R^8$ per molecule are curable groups (other than hydrogen). Alternatively 1 to 3, alternatively 1 to 2, and alternatively an average of two $R^8$ per molecule are curable groups (other than hydrogen). The curable group for $R^8$ is derived from starting material c) the reactive species described above. The curable group for $R^8$ may be independently selected from the group consisting of $R^{4'}_y SiR^5_{(4-y)}$, and $R^{6'}R^7$, where $R^{4'}$ and $R^{6'}$ are divalent hydrocarbon groups produced via hydrosilylation reaction of the aliphatically unsaturated group of starting material c) and a silicon bonded hydrogen atom of starting material a). Alternatively, subscript v may have an average value of 5, subscript n may have an average value of 10, subscript n' may be 1 to 2, and subscript o' may be 0 to 1. Alternatively, subscript v may be 5, subscript n may be 10, subscript n' may be 2 and subscript o' may be 1. One skilled in the art would recognize that depending on various factors including the relative amounts of starting materials B) and C) used to make the organohydrogensiloxane, the product may comprise more than one clustered functional organosiloxane species. The clustered functional organosiloxane may have an average of more than two cyclic moieties and more than two linear moieties per molecule (when o'≥0). Alternatively, when subscript o'=0, then in the product comprises a clustered functional organopolysiloxane of formula a'-2):

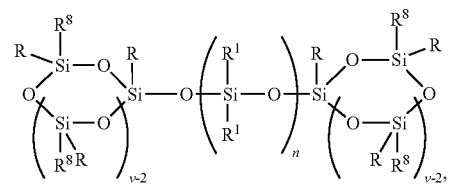

where R, $R^1$, $R^8$, and subscript n and subscript v are as described above.

The clustered functional organosiloxane may optionally be recovered from the product by any convenient means, such as stripping and/or distillation. The clustered functional organosiloxane prepared as described above may be used in an adhesive composition, such as a thermal radical curable adhesive composition as, e.g., an additive.

Without wishing to be bound by theory, it is thought that a') the clustered functional organosiloxane may provide one or more benefits of 1) faster cure to the adhesive composition (as compared to a comparable adhesive composition not containing a') the clustered functional organosiloxane described above), and 2) improved tensile and elongation properties of an adhesive prepared by curing the adhesive composition, and/or 3) improved crosslinking of the adhesive composition.

Curable Composition

The a) the polyfunctional organohydrogensiloxane and a') the clustered functional organopolysiloxane are useful in curable compositions. The curable composition may comprise:

(I) a) the polyfunctional organohydrogensiloxane, and/or a') the clustered functional organopolysiloxane; and (II) a curing agent.

The curing agent selected will depend on the type and amount of curable substituents on starting material (I). For example, the curable substituent may be the SiH e.g., when a) the polyfunctional organohydrogensiloxane is included in the curable composition and/or when a') the clustered functional organosiloxane has SiH functionality in addition to the curable group introduced by starting material c) in the method described above. Alternatively, the curable substituent may be the curable group introduced by starting material c) the reactive species used to make a') the clustered functional organosiloxane, as described above.

For example, when starting material (I) has SiH functionality, (II) the curing agent may be a hydrosilylation reaction catalyst, as exemplified by those described above for starting material b) in the method for functionalizing the polyfunctional organohydrogensiloxane described above.

For example, when starting material (I) comprises the a') clustered functional organosiloxane with radical curable groups (such as organic groups containing epoxy, acrylate, or methacrylate functionality, the curing agent may comprise a radical initiator as (II) the curing agent. The radical initiator may be a thermal radical initiator, a radiation radical initiator, or a redox reagent. Thermal radical initiators include peroxides, which are known in the art and are commercially available as disclosed in U.S. Pat. No. 9,593, 209 at col. 16, line 49 to col. 17, line 26. Thermal radical initiators may be used in an amount of 0.01% to 15%, alternatively 0.1% to 5% and alternatively 0.1% to 2% based on combined weights of all starting materials in the curable composition.

Alternatively, the radical initiator may be a radiation photoinitiator. Radiation photoinitiators are known in the art and include cationic photoinitiators such as onium salts, and radiation photoinitiators are disclosed in U.S. Pat. No. 9,593,209 at col. 17, line 27 to col. 18, line 40. Suitable radiation photoinitiators may be used in the curable composition in an amount of 0.01% to 15%, alternatively 0.1% to 10%, alternatively 0.1% to 5% and alternatively 0.1% to 2% based on combined weights of all starting materials in the curable composition.

Alternatively, the radical initiator may be a redox reagent, such as those disclosed in U.S. Pat. No. 9,593,209 at col. 21, lines 33 to 53.

Alternatively, when starting material (I) comprises the a') clustered functional organosiloxane with organic groups having OH, alkoxy, or other hydrolyzable groups, (II) the curing agent may comprise a condensation reaction catalyst, in an amount of 0.001% to 5% based on combined weights of all starting materials in the curable composition. Exemplary condensation reaction catalysts are those disclosed in U.S. Pat. No. 9,593,209 at col. 18, line 41 to 19, line 15.

Alternatively, when starting material (I) comprises the a') clustered functional organosiloxane, (II) the curing agent may comprise an organoborane amine complex. Suitable organoborane amine complexes are disclosed, for example, in U.S. Pat. No. 9,593,209 at col. 19, line 16 to col. 21, line 33.

Alternatively, when starting material (I) comprises the a') clustered functional organosiloxane with organic groups having isocyanate functionality or urethane functionality, (II) the curing agent may comprise a compound having two or more carbinol groups, such as a polyol, or an amine functional compound. Examples of such curing agents are disclosed at col. 21, lines 54 to 63.

Alternatively, when starting material (I) has more than one type of curable substituent, more than one type of curing agent may be used as starting material (II) in the curable composition. For example, a combination of a radical initiator and a condensation reaction catalyst may be used when starting material (I) has both radical curable groups and condensation reaction curable groups, such as epoxy and alkoxy. Alternatively, the combination of a hydrosilylation reaction catalyst and a condensation reaction catalyst may be used when starting material (I) has both SiH functionality and condensation reaction curable groups, such as alkoxy.

The curable composition may optionally further comprise one or more additional starting materials. These are exemplified by (III) a crosslinker, (IV) a solvent, (V) an adhesion promoter, (VI) a colorant, (VII) a reactive diluent, (VIII) a corrosion inhibitor, (IX) a polymerization inhibitor, (X) a filler, (XI) a filler treating agent, (XII) an acid acceptor, and a combination thereof. Suitable additional starting materials are described and exemplified as other optional ingredients in U.S. Pat. No. 9,592,209 at col. 22, line 5 to col. 29, line 8. Other additional starting materials may be added. For example, the curable composition may optionally further comprise (XIII) a reactive resin and polymer, (XIV) a dual cure compound, or both. The reactive resin and polymer for starting material (XIII) are known in the art, for example, see U.S. Pat. No. 9,670,392 at col. 16, line 21 to col. 18, line 35.

Thermal Radical Curable Composition

The curable composition may be a thermal radical curable composition. The thermal radical curable composition may be made as described in U.S. Pat. No. 9,670,392 by replacing the clustered functional organosiloxane described therein as component (I) with the clustered functional organopolysiloxane prepared as described for starting material a') hereinabove. The thermal radical curable composition may comprise:

(I) the clustered functional organopolysiloxane described above as starting material a'),
(II) the curing agent comprising
  (a) the radical initiator, and
  (b) the condensation reaction catalyst,
(III) the crosslinker, and
(XIII) the reactive resin and polymer.

The thermal radical cure composition may further comprise (XIV) the dual cure compound (which is an organosilicon compound having both hydrolyzable and free radical reactive groups), (VIII) the corrosion inhibitor, and (V) the adhesion promoter, all of which starting materials are as described above.

Adhesive Composition

Alternatively, the curable composition may be an adhesive composition. The adhesive composition may comprise:

A) the clustered functional organopolysiloxane described above as starting material a'), where the clustered functional organopolysiloxane has acrylate functional groups, epoxy functional groups, and/or methacrylate functional groups,
B) a reactive resin and polymer,
C) a condensation reaction catalyst, and
D) a free radical initiator.

Starting Material B) Reactive Resin and Polymer

Starting material B) in the adhesive composition is a reactive resin and polymer. The reactive resin and polymer may be (XIII) the reactive resin and polymer described above as starting material (XIII), see U.S. Pat. No. 9,670, 392. Alternatively, the reactive resin and polymer may be a poly-alkoxy endblocked resin-polymer blend prepared as described in U.S. Provisional Patent Application Ser. No.

62/548,558 filed on 22 Aug. 2017. The poly-alkoxy endblocked resin-polymer blend comprises a reaction product of
  i) a siloxane resin comprising units of formulae $(R^{2'}_3SiO_{1/2})$ and $(SiO_{4/2})$, where each $R^{2'}$ is independently a monovalent hydrocarbon group, with the proviso that at least one $R^{2'}$ per molecule has aliphatic unsaturation, wherein the siloxane resin has a molar ratio of $(R^{2'}_3SiO_{1/2})$ units (M units) to $(SiO_{4/2})$ units (Q units) ranging from 0.5:1 to 1.5:1 (M:Q ratio),
  ii) a polydiorganosiloxane comprising units of formulae $(R^{2'}_3SiO_{1/2})ii$ and $(R^{2'}_2SiO_{2/2})_{hh}$ (D units), where subscript hh is 20 to 1000 and subscript ii has an average value of 2, and
  iii) an alkoxy-functional organohydrogensiloxane oligomer. The alkoxy-functional organohydrogensiloxane oligomer has unit formula

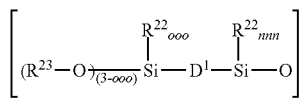

$^{mmm}(HR^{22}_2SiO_{1/2})_{ppp}(R^{22}_3SiO_{1/2})_{qqq}(HR^{22}SiO_{2/2})_{rrr}$ $(R^{22}_2SiO_{2/2})_{sss}(R^{22}SiO_{3/2})_{ttt}(HSiO_{3/2})_{uuu}(SiO_{4/2})_{kk}$, where each $D^1$ independently represents a divalent hydrocarbon group of 2 to 18 carbon atoms; each $R^{22}$ independently represents a monovalent hydrocarbon group of 1 to 18 carbon atoms or a monovalent halogenated hydrocarbon group of 1 to 18 carbon atoms (such as those described above for $R^1$), each $R^{23}$ is independently a monovalent hydrocarbon group of 1 to 18 carbon atoms (such as those described above for $R^1$), subscript nnn is 0 or 1, subscript ooo is 0, subscripts qqq, sss, and ttt have values such that $5 \geq qqq \geq 0$, $5 \geq sss \geq 0$, subscript ttt is 0 or 1, subscript kk is 0 or 1, subscript nnn$\geq 0$, and a quantity (mmm+ppp+qqq+rrr+sss+ttt+uuu+kk)$\leq 50$, with the proviso that >90 mol % of all $D^1$ groups in the endblocker are linear; and
    iv) a hydrosilylation reaction catalyst. Each $D^1$ may be exemplified by an alkylene group such as ethylene, propylene, butylene, or hexylene; an arylene group such as phenylene, or an alkylarylene group such as:

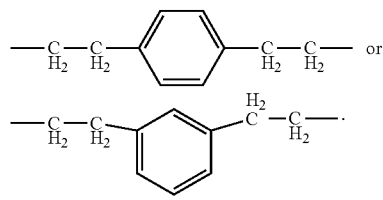

Alternatively, each $D^1$ is an alkylene group such as ethylene or propylene; alternatively ethylene.

Starting Material C)—Condensation Reaction Catalyst

Starting material C) in the adhesive composition described above is a condensation reaction catalyst. The condensation reaction catalyst may be selected from common condensation catalysts that are effective for silanol-silanol condensation reaction, which include organometallic compounds, amines, and a wide range of organic and inorganic bases and acids. Organometallic compounds include organic compounds of tin, titanium, zinc, zirconium, hafnium, and others. The condensation reaction catalysts can be an organotin compound and an organotitanium compound. Exemplary organotin compounds include i) dibutyl tin dilaurate, ii) dimethyl tin dilaurate, iii) di-(n-butyl)tin bis-ketonate, iv) dibutyl tin diacetate, v) dibutyl tin maleate, vi) dibutyl tin diacetylacetonate, vii) dibutyl tin dimethoxide, viii) dibutyl tin dioctanoate, ix) dibutyl tin diformate, x) dimethyl tin dibutyrate, xi) dimethyl tin di-neodecanoate, xii) dibutyl tin di-neodecanoate, xiii) triethyl tin tartrate, xiv) dibutyl tin dibenzoate, xv) butyltintri-2-ethylhexanoate, xvi) dioctyl tin diacetate, xvii) tin octylate, xviii) tin oleate, xix) tin butyrate, xx) tin naphthenate, xxi) dimethyl tin dichloride; xxii) tin (II) diacetate, xxiii) tin (II) dioctanoate, xxiv) tin (II) diethylhexanoate, xxv) tin (II) dilaurate, such as xxvi) stannous octoate, xxvii) stannous oleate, xxviii) stannous acetate, xxix) stannous laurate, xxx) stannous stearate, xxxi) stannous hexanoate, xxxii) stannous succinate, xxxiii) stannous caprylate, and xxxiv) a combination of two or more of i) to xxxiii). Exemplary organotitanium compounds may be selected from the group consisting of: i) tetra-n-butyl titanate, ii) tetraisopropyl titanate, iii) tetra-t-butyl titanate, iv) tetrakis(2-ethylhexyl) titanate, v) acetylacetonate titanate chelate, vi) ethyl acetoacetate titanate chelate, vii) triethanolamine titanate chelate, viii) tri-n-butyl titanate, and ix) a combination of two or more of i), ii), iii), iv), v), vi), vii), and viii).

The amount of condensation reaction catalyst in the adhesive composition depends on various factors including the selection of the other starting materials, whether any additional starting materials are added, and the end use of the adhesive composition. However, the condensation reaction catalyst may be present in an amount ranging from 0.01% to 25% based on combined weights of all starting materials in the adhesive composition. Alternatively, the condensation reaction catalyst may be present in an amount of 0.1% to 25%, alternatively 0.1% to 15%, alternatively 0.5% to 15%, alternatively 0.5% to 10%, alternatively 0.1% to 5%.

Starting Material D)—Free Radical Initiator

Starting material D) in the adhesive composition described above is a free radical initiator. The free radical initiator may comprise an azo compound or an organic peroxide compound. Suitable azo compounds include azobenzene, azobenzene-p-sulfonic acid, azobisdimethylvaleronitrile, azobisisobutyronitrile, and combinations thereof. Suitable organic peroxide compounds include dialkyl peroxides, diaryl peroxides, diacyl peroxides, alkyl hydroperoxides, and aryl hydroperoxides. Specific organic peroxide compounds are as described above for starting material (II). Alternatively, the organic peroxide may be exemplified by benzoyl peroxide; dibenzoyl peroxide; 4-monochlorobenzoyl peroxide; dicumyl peroxide; tert-butylperoxybenzoate; tert-butyl cumyl peroxide; tert-butyloxide 2,5-dimethyl-2,5-di-tert-butylperoxyhexane; 2,4-dichlorobenzoyl peroxide; di-tert-butylperoxy-diisopropyl benzene; 1,1-bis(tert-butylperoxy)-3,3,5-trimethylcyclohexane; 2,5-di-tert-butylperoxyhexane-3,2,5-dimethyl-2,5-bis(tert-butylperoxy)hexane; or combinations of two or more thereof.

The amount of free radical initiator added to the adhesive composition depends on various factors including the type and amount of condensation reaction catalyst selected and the selection of other starting materials in the adhesive composition, however, the free radical initiator may be present in an amount of 0.1% to 5%, alternatively 0.2% to 3%, alternatively 0.5% to 2%, based on the combined weights of all starting materials in the adhesive composition.

Additional Starting Materials in the Adhesive Composition

The adhesive composition described above may further comprise one or more additional starting materials (distinct from and added in addition to starting materials A), B), C) and D) described above). The additional starting materials may be selected from the group consisting of E) a dual cure compound, F) an adhesion promoter, G) a corrosion inhibitor, H) a rheology modifier, I) a drying agent, J) a crosslinker, K) a filler, L) a spacer, M) an acid scavenger, N) a silanol functional polydiorganosiloxane, O) a fluorescent optical brightener, P) a chain transfer agent, Q) a (meth) acrylate monomer, R) a poly-alkoxy terminated polydiorganosiloxane, S) a colorant, and two or more of E), F), G), H), I), J), K), L), M), N), O), P), Q), R), and S).

Starting Material E)—Dual Cure Compound

The adhesive composition described above may optionally further comprise starting material E) a dual cure compound. The dual cure compound is an organosilicon compound having, per molecule, at least one hydrolyzable group and at least one free radical reactive group. The organosilicon compound for starting material E) may comprise a silane of formula $R^{14}_{mm}R^{22}_{nn}SiX_{4-(mm+nn)}$, where $R^{22}$ is as described above, $R^{14}$ is a curable group (such as an acrylate functional group, an epoxy functional group or a methacrylate functional group), X is a hydrolysable group, subscript mm is 1 to 2, subscript nn is 0 to 2, and a quantity (mm+nn) is 2 to 3.

Each X independently represents a hydrolyzable group, which may be selected from an acetamido group, an acyloxy group such as acetoxy, an alkoxy group, an amido group, an amino group, an aminoxy group, an oximo group, a ketoximo group, and a methylacetamido group. X is not a hydroxyl group. Alternatively, each X may be an acetoxy group or an alkoxy group. Alternatively, each X is an alkoxy group, such as methoxy, ethoxy, propoxy or butoxy; alternatively methoxy.

Alternatively, the organosilicon compound for starting material E) may comprise a polyorganosiloxane of unit formula:

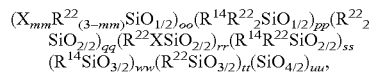

where $R^{22}$, $R^{14}$, and X and subscript mm are as described above, subscript oo≥0, subscript pp≥0, subscript qq≥0, subscript rr≥0, subscript ss≥0, subscript ww≥0, subscript tt≥0, and subscript uu≥0, with the provisos that a quantity (oo+rr)≥1, a quantity (pp+ss+ww)≥1, and a quantity (oo+pp+qq+rr+ss+ww+tt+uu)≥2. Alternatively, subscript oo is 0 to 100, alternatively 0 to 50, alternatively 0 to 20, alternatively 0 to 10, alternatively, 1 to 50, alternatively, 1 to 20, and alternatively 1 to 10. Alternatively, subscript pp may be 0 to 100, alternatively 0 to 50, alternatively 0 to 20, alternatively 0 to 10, alternatively 1 to 50, alternatively 1 to 20, and alternatively 1 to 10. Alternatively, subscript qq is 0 to 1,000, alternatively 0 to 500, alternatively 0 to 200, alternatively 0 to 100, alternatively 1 to 500, alternatively 1 to 200, and alternatively 1 to 100. Alternatively, subscript rr is 0 to 100, alternatively 0 to 50, alternatively 0 to 20; alternatively 0 to 10, alternatively 1 to 50, alternatively 1 to 20, and alternatively 1 to 10. Alternatively, subscript ss is 0 to 100, alternatively 0 to 50, alternatively 0 to 20, alternatively 0 to 10, alternatively 1 to 50, alternatively 1 to 20, and alternatively 1 to 10. Alternatively, subscript ww is 0 to 100, alternatively 0 to 50, alternatively 0 to 20, alternatively 0 to 10, alternatively 1 to 50, alternatively 1 to 20, and alternatively 1 to 10. Alternatively, subscript tt is 0 to 1,000, alternatively 0 to 500, alternatively 0 to 200, alternatively 0 to 100, alternatively 1 to 500, alternatively 1 to 200, and alternatively 1 to 100. Alternatively, subscript uu is 0 to 1,000, alternatively 0 to 500, alternatively 0 to 200, alternatively 0 to 100, alternatively 1 to 500, alternatively 1 to 200, and alternatively 1 to 100.

Examples of starting material E) include silanes, such as methacryloxypropyltrimethoxysilane, acryloxypropyltrimethoxysilane, acryloxypropyltriethoxysilane, methacryloxypropyltriethoxysilane, methacryloxypropylmethyldimethoxysilane, acryloxypropylmethyldimethoxysilane, acryloxypropyldimethylmethoxysilane, and methacryloxypropyldimethylmethoxysilane.

The amount of dual cure compound in the adhesive composition depends on various factors including the selection of the other starting materials, whether any additional starting materials are added, and the end use of the composition. However, the dual cure compound may be present in an amount ranging from 0.01% to 25% based on combined weights of all starting materials in the adhesive composition. Alternatively, the dual cure compound may be present in an amount of 0.1% to 25%, alternatively 0.1% to 15%, alternatively 0.5% to 15%, alternatively 0.5% to 10%, alternatively 0.1% to 5%.

Starting Material F)—Adhesion Promoter

The adhesive composition described above may optionally further comprise F) an adhesion promoter. Suitable adhesion promoters may comprise a transition metal chelate, a hydrocarbonoxysilane such as an alkoxysilane, a combination of an alkoxysilane and a hydroxy-functional polyorganosiloxane, an aminofunctional silane, or a combination thereof. Adhesion promoters may comprise silanes having the formula $R^{15}_{aaa}R^{16}_{bbb}Si(OR^{17})_{4-(aaa+bbb)}$ where each $R^{15}$ is independently a monovalent organic group having at least 3 carbon atoms; $R^{16}$ contains at least one SiC bonded substituent having an adhesion-promoting group, such as amino, epoxy, mercapto or acrylate groups; each $R^{17}$ is independently a saturated hydrocarbon group such as an alkyl group of 1 to 4 carbon atoms; subscript aaa has a value ranging from 0 to 2; subscript bbb is either 1 or 2; and a quantity (aaa+bbb) is not greater than 3. Alternatively, the adhesion promoter may comprise a partial condensate of the above silane. Alternatively, the adhesion promoter may comprise a combination of an alkoxysilane and a hydroxy-functional polyorganosiloxane, such as trimethoxysilyl-terminated polydimethylsiloxane, which is commercially available from Dow Silicones Corporation of Midland, Michigan, USA.

Alternatively, the adhesion promoter may comprise an unsaturated or epoxy-functional compound. The adhesion promoter may comprise an unsaturated or epoxy-functional alkoxysilane. For example, the functional alkoxysilane can have the formula $R^{18}_{ccc}Si(OR^{19})_{(4-ccc)}$, where subscript ccc is 1, 2, or 3, alternatively subscript ccc is 1. Each $R^{18}$ is independently a monovalent organic group with the proviso that at least one $R^{18}$ is an unsaturated organic group or an epoxy-functional organic group. Epoxy-functional organic groups for $R^{18}$ are exemplified by 3-glycidoxypropyl and (epoxycyclohexyl)ethyl. Unsaturated organic groups for $R^{18}$ are exemplified by 3-methacryloyloxypropyl, 3-acryloyloxypropyl, and unsaturated monovalent hydrocarbon groups such as vinyl, allyl, hexenyl, undecylenyl. Each $R^{19}$ is independently a saturated hydrocarbon group of 1 to 4 carbon atoms, alternatively 1 to 2 carbon atoms. $R^{19}$ is exemplified by methyl, ethyl, propyl, and butyl.

Examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane, (epoxycyclohexyl)ethyltrimethoxysilane, (epoxycyclohexyl)

ethyltriethoxysilane, and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

Alternatively, the adhesion promoter may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

Alternatively, the adhesion promoter may comprise an aminofunctional silane, such as an aminofunctional alkoxysilane exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and a combination of two or more thereof.

Alternatively, the adhesion promoter may comprise a transition metal chelate. Suitable transition metal chelates include titanates, zirconates such as zirconium acetylacetonate, aluminum chelates such as aluminum acetylacetonate, and combinations thereof.

Alternatively, the adhesion promoter may comprise a triazine-based compound that bears functionality to react with starting material A), starting material B), or, when present, starting material E), or two or more thereof. The triazine ring can be mono-, di-, or tri-substituted and at least one of the substitute groups is the functionality to react. The functionality can be a free radical reactive one or a condensation reactive one. Examples of triazine compounds with free radical reactive functional groups include triallylisocyanurate, diallylpropylisocyanurate, tri-(methacryloxypropyl)isocyanurate, triallyloxytriazine, trimethacryloxytriazine, triacryloylhexahydrotriazine, and tris[2-(acryloyloxy)ethyl] isocyanurate. Examples of triazine compounds with condensation reactive groups include 2,4,6-tris(methyldimethoxysilyl)triazine, and tris[3-(trimethoxysilyl)propyl]isocyanurate.

The exact amount of adhesion promoter depends on various factors including the selection and amounts of other starting materials in the adhesive composition. However, the adhesion promoter, when present, may be added to the adhesive composition in an amount of 0.01 to 50 weight parts based on the combined weight of all starting materials in the composition, alternatively 0.01 to 10 weight parts, and alternatively 0.01 to 5 weight parts. Examples of suitable adhesion promoters are described in U.S. Pat. No. 9,156,948.

Starting Material G)—Corrosion Inhibitor

The adhesive composition may optionally further comprise starting material G), a corrosion inhibitor. Examples of suitable corrosion inhibitors include benzotriazole, mercaptobenzothiazole, mercaptabenzotriazole and commercially available corrosion inhibitors such as 2-mercaptobenzothiazole from Millipore Sigma, 2,5-dimercapto-1,3,4-thiadiazole derivative (CUVAN™ 826) and alkylthiadiazole (CUVAN™ 484) from R. T. Vanderbilt of Norwalk, Connecticut, U.S.A. Examples of suitable corrosion inhibitors are exemplified by those described in U.S. Pat. No. 9,156,948. When present, the amount of corrosion inhibitor) may be 0.05% to 0.5% based on combined weights of all starting materials in the adhesive composition.

Starting Material H)—Rheology Modifier

The adhesive composition may optionally further comprise up to 5%, alternatively 1% to 2% based on combined weights of all starting materials in the composition, of starting material H) a rheology modifier. Rheology modifiers are commercially available. Examples of suitable rheology modifiers include polyamides, hydrogenated castor oil derivatives, metal soaps, microcrystalline waxes, and combinations thereof. Examples of suitable rheology modifiers are exemplified by those described in U.S. Pat. No. 9,156,948. The amount of rheology modifier depends on various factors including the specific rheology modifier selected and the selections of the other starting materials used in the composition. However, the amount of rheology modifier may be 0 parts to 20 parts, alternatively 1 part to 15 parts, and alternatively 1 part to 5 parts based on combined weights of all starting materials in the adhesive composition.

Starting Material I)—Drying Agent

The composition described above may optionally further comprise starting material I) a drying agent. The drying agent binds water from various sources. For example, the drying agent may bind by-products of the condensation reaction, such as water and alcohols. Examples of suitable drying agents are disclosed, for example, in U.S. Pat. No. 9,156,948. Examples of suitable adsorbents for the drying agent may be inorganic particulates, e.g., zeolites such as chabasite, mordenite, and analcite; molecular sieves such as alkali metal aluminosilicates, silica gel, silica-magnesia gel, activated carbon, activated alumina, calcium oxide, and combinations thereof. The adsorbent may have a particle size of 10 μm or less. The adsorbent may have average pore size sufficient to adsorb water and alcohols, for example 10 Å (Angstroms) or less.

Alternatively, the drying agent may bind the water and/or other by-products by chemical means. An amount of a silane crosslinker added to the composition (in addition to any silane crosslinker used as starting material J)) may function as a chemical drying agent. Without wishing to be bound by theory, it is thought that the chemical drying agent may be added to the dry part of a multiple part composition to keep the composition free from water after the parts of the composition are mixed together. For example, alkoxysilanes suitable as drying agents include vinyltrimethoxysilane, vinyltriethoxysilane, methyltrimethoxysilane, isobutyltrimethoxysilane, and combinations thereof. The amount of drying agent depends on the specific drying agent selected. However, when starting material I) is a chemical drying agent, the amount may range from 0 parts to 15 parts, alternatively 0 parts to 10 parts, alternatively 0 parts to 5 parts, alternatively 0.1 parts to 0.5 parts, based on combined weights of all starting materials in the composition.

Starting Material J)—Crosslinker

The composition described above may optionally further comprise starting material J), a crosslinker. The crosslinker may comprise a silane crosslinker having hydrolyzable groups or partial or full hydrolysis products thereof. The crosslinker has an average, per molecule, of greater than two substituents reactive with the hydrolyzable groups on starting material B). Examples of suitable silane crosslinkers may have the general formula $R^{20}_{ddd}Si(R^{21})_{(4-ddd)}$, where each $R^{20}$ is independently a monovalent hydrocarbon group such as an alkyl group; each $R^{21}$ is a hydrolyzable substituent, which may be a group which is the same as X described above. Alternatively, each $R^{21}$ may be, for example, a hydrogen atom, a halogen atom, an acetamido group, an acyloxy group such as acetoxy, an alkoxy group, an amido group, an amino group, an aminoxy group, a hydroxyl group, an oximo group, a ketoximo group, or a methylacetamido group; and each instance of subscript ii may be 0, 1, 2, or 3. For the silane crosslinker, subscript ddd has an average value greater than 2. Alternatively, subscript ddd may have a value ranging from 3 to 4. Alternatively, each $R^{21}$ may be independently selected from hydroxyl, alkoxy, acetoxy, amide, or oxime. Alternatively, the silane crosslinker may be selected from an acyloxysilane, an alkoxysilane, a ketoximosilane, and an oximosilane.

The silane crosslinker may comprise an alkoxysilane exemplified by a dialkoxysilane, such as a dialkyldialkoxysilane; a trialkoxysilane, such as an alkyltrialkoxysilane; a tetraalkoxysilane; or partial or full hydrolysis products thereof, or another combination thereof. Examples of suitable trialkoxysilanes include methyltrimethoxysilane, methyltriethoxysilane, ethyltrimethoxysilane, ethyltriethoxysilane, isobutyltrimethoxysilane, isobutyltriethoxysilane, and combinations thereof, and alternatively methyltrimethoxysilane. Examples of suitable tetraalkoxysilanes include tetraethoxysilane. Alternatively, the silane crosslinker may comprise an acyloxysilane, such as an acetoxysilane. Acetoxysilanes include a tetraacetoxysilane, an organotriacetoxysilane, a diorganodiacetoxysilane, or a combination thereof. Exemplary acetoxysilanes include, but are not limited to, tetraacetoxysilane, methyltriacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenylmethyldiacetoxysilane, vinylmethyldiacetoxysilane, diphenyldiacetoxysilane, tetraacetoxysilane, and combinations thereof. Alternatively, the crosslinker may comprise organotriacetoxysilanes, for example mixtures comprising methyltriacetoxysilane and ethyltriacetoxysilane. Examples of silanes suitable for starting material J) containing both alkoxy and acetoxy groups that may be used in the composition include methyldiacetoxymethoxysilane, methylacetoxydimethoxysilane, vinyldiacetoxymethoxysilane, vinylacetoxydimethoxysilane, methyldiacetoxyethoxysilane, methylacetoxydiethoxysilane, and combinations thereof.

Alternatively, the crosslinker may comprise an aminofunctional compound such as $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, or a combination thereof. Examples of suitable silane crosslinkers are disclosed in U.S. Pat. No. 9,156,948.

Alternatively, the crosslinker may comprise a multifunctional (meth)acrylate crosslinker, such as a di(meth)acrylate exemplified Such crosslinkers are exemplified by ethylene glycol dimethacrylate, ethylene glycol diacrylate, triethylene glycol dimethacrylate, diethylene glycol bismethacryloxy carbonate, polyethylene glycol diacrylate, tetraethylene glycol dimethacrylate, diglycerol diacrylate, diethylene glycol dimethacrylate, pentaerythritol triacrylate, trimethylolpropane triglycidyl ether, trimethylolpropane tris(2-methyl-1-aziridine)propionate, trimethylol propane trimethacrylate, acrylate-tipped urethane-containing prepolymers, polyether diacrylates, and dimethacrylates, and combinations of two or more thereof. Suitable multifunctional (meth)acrylate crosslinkers are disclosed, for example, in U.S. Pat. No. 8,304,543 at col. 11 lines 46-65.

When present, the crosslinker may be added in an amount ranging from 0.1% to 10% based on the combined weights of all starting materials in the adhesive composition.

Starting Material K)—Filler

The composition described above may optionally further comprise K) a filler. The filler may comprise a reinforcing filler, an extending filler, a conductive filler, or a combination thereof. For example, the composition may optionally further comprise starting material (K1), a reinforcing filler, which when present may be added in an amount of 0.1% to 95%, alternatively 1% to 60%, based on combined weights of all starting materials in the adhesive composition. The exact amount of starting material (K1) depends on various factors including the form of the reaction product of the composition and whether any other fillers are added. Examples of suitable reinforcing fillers include reinforcing silica fillers such as fumed silica, silica aerogel, silica xerogel, and precipitated silica. Fumed silicas are known in the art and commercially available; e.g., fumed silica sold under the name CAB-O-SIL by Cabot Corporation of Massachusetts, U.S.A.

The adhesive composition may optionally further comprise starting material (K2) an extending filler in an amount ranging from 0.1% to 95%, alternatively 1% to 60%, and alternatively 1% to 20%, based on combined weights of all starting materials in the adhesive composition. Examples of extending fillers include crushed quartz, aluminum oxide, magnesium oxide, calcium carbonate such as precipitated calcium carbonate, zinc oxide, talc, diatomaceous earth, iron oxide, clays, mica, chalk, titanium dioxide, zirconia, sand, carbon black, graphite, or a combination thereof. Extending fillers are known in the art and commercially available; such as a ground silica sold under the name MIN-U-SIL by U.S. Silica of Berkeley Springs, WV. Suitable precipitated calcium carbonates included Winnofil™ SPM from Solvay and Ultraflex™ and Ultraflex™ 100 from SMI. Examples of suitable fillers are disclosed in U.S. Pat. No. 9,156,948.

Starting Material L)—Spacer

The adhesive composition described above may optionally further comprise L) a spacer. Spacers can comprise organic particles, inorganic particles, or a combination thereof. Spacers can be thermally conductive, electrically conductive, or both. Spacers can have a desired particle size, for example, particle size may range from 25 µm to 125 µm. Spacers can comprise monodisperse beads, such as glass or polymer (e.g., polystyrene) beads. Spacers can comprise thermally conductive fillers such as alumina, aluminum nitride, atomized metal powders, boron nitride, copper, and silver. The amount of spacer depends on various factors including the particle size distribution, pressure to be applied during use of the composition prepared by mixing the parts, or the cured product prepared therefrom, temperature during use, and desired thickness of the mixed composition or the cured product prepared therefrom. However, the composition may contain an amount of spacer of 0.05% to 2%, alternatively 0.1% to 1% based on combined weights of all starting materials in the composition.

Starting Material M)—Acid Scavenger

The composition described above may optionally further comprise M) an acid scavenger. Suitable acid scavengers include various inorganic and organic compounds that are basic in nature, such as magnesium oxide, calcium oxide, and combinations thereof. The composition may comprise 0% to 10% of acid scavenger based on the combined weights of all starting materials in the composition.

Starting Material N)—Silanol Functional Polydiorganosiloxane

The composition described above may optionally further comprise N) a silanol functional polydiorganosiloxane. Starting material N) may comprise a polydiorganosiloxane of the formula $HOR^{22}_2SiO(R^{22}_2SiO)_{eee}((HO)R^{22}SiO)_{fff}SiR^{22}_2OH$, the formula $R^3SiO(R^2SiO)_{ggg}((HO)RSiO)_{hhh}SiR_3$, or a combination thereof, where $R^{22}$ is as described above. Subscript eee may be 0 or a positive number. Alternatively, subscript eee has an average value of at least 2. Alternatively subscript eee may be 2 to 2000. Subscript fff may be 0 or a positive number. Alternatively, subscript fff may have an average value of 0 to 2000. Subscript ggg may be 0 or a positive number. Alternatively, subscript ggg may have an average value of 0 to 2000. Subscript hhh has an average value of at least 2. Alternatively subscript hhh may have an average value ranging from 2 to 2000.

Starting material N) may comprise a polydiorganosiloxane such as i) hydroxy-terminated polydimethylsiloxane,
ii) hydroxy-terminated poly(dimethylsiloxane/methylphenylsiloxane),
iii) trimethylsiloxy-terminated poly(dimethylsiloxane/methylhydroxysiloxane), and
iv) a combination of two or more of i), ii) and iii).

Hydroxyl-endblocked polydiorganosiloxanes suitable for use as starting material N) may be prepared by methods known in the art, such as hydrolysis and condensation of the corresponding organohalosilanes or equilibration of cyclic polydiorganosiloxanes. When added to the adhesive composition, starting material N) may be present in an amount of 0.1% to 20%, alternatively 0.1% to 10%, and alternatively 0.1% to 5% based on combined weights of all starting materials in the adhesive composition.

Starting Material O)—Optical Brightener

The adhesive composition described above may optionally further comprise starting material 0), an optical brightener. Suitable optical brighteners are commercially available, such as 2,5-thiophenediylbis(5-tert-butyl-1,3-benzoxazole), commercially available as TINOPAL™ OB. When added to the composition, the optical brightener may be present in an amount of 0.1% to 2% based on combined weights of all starting materials in the adhesive composition.

Starting Material P)—Chain Transfer Agent

The adhesive composition described above may optionally further comprise a P) chain transfer agent. When added to the adhesive composition, the chain transfer agent may be present in an amount of 0.01% to 5%, alternatively 0.01% to 2%, and alternatively 0.1 to 2%, based on combined weights of all starting materials in the composition.

Starting Material Q)—(Meth)acrylate Monomer

The adhesive composition described above may optionally further comprise starting material Q), a (meth)acrylate monomer. The (meth)acrylate monomer is exemplified by methyl acrylate, butyl acrylate, 2-ethylhexyl acrylate, isobornyl acrylate, tetrahydrofurfuryl acrylate, cyclohexylmethyl acrylate methyl methacrylate, butyl methacrylate, 2-ethylhexyl methacrylate, isobornyl methacrylate, tetrahydrofurfuryl methacrylate, and cyclohexylmethyl methacrylate. When added to the adhesive composition, the (meth)acrylate monomer may be present in an amount of 0.1% to 35%, alternatively 0.1% to 25%, alternatively 0.1 to 15%, and alternatively 0.1% to 10%, based on combined weights of all starting materials in the adhesive composition.

Starting Material R)—Poly-Alkoxy-Terminated Polydiorganosiloxane

Starting material R) is a poly-alkoxy-terminated polydiorganosiloxane, in addition to any that would be prepared via preparation of starting material B), described above. Starting material R) may be a poly-alkoxy-terminated polydiorganosiloxane prepared as described above for starting material B), except without including the siloxane resin. Alternatively, starting material R) may be a poly-alkoxy-terminated polydiorganosiloxane prepared via a platinum-catalyzed hydrosilylation reaction.

Starting Material S)—Colorant

The adhesive composition described above may optionally further comprise starting material S), a colorant. The colorant may be a dye or pigment, such as carbon black.

When selecting starting materials for the adhesive composition described above, there may be overlap between types of starting materials because certain starting materials described herein may have more than one function. For example, certain alkoxysilanes may be useful as crosslinkers and/or adhesion promoters and/or drying agents. Certain particulates may be useful as fillers and spacers. When adding additional starting materials to the adhesive composition, the additional starting materials are distinct from one another.

Method for Preparing the Adhesive Composition

The adhesive composition described above may be prepared by 1) combining starting materials B) i) the organosiloxane resin and B) ii) the polydiorganosiloxane to form B) the resin polymer blend (RPB). Solvent may optionally be used to homogenize the RPB. One or more of the starting materials, such as the organosiloxane resin may be dissolved or dispersed in a solvent, such as those described above, e.g., an aromatic hydrocarbon such as benzene, toluene or xylene. The amount of solvent may be 0 to 60%, alternatively 10% to 50%, and alternatively 20% to 40% based on combined weights of all starting materials in the adhesive composition. Starting materials B) iii) and B) iv) as described above, may be combined with the RPB to form a converted RPB. The method may further comprise: 2) combining the converted RPB and starting materials A), C), and D) by any convenient means, such as mixing. One or more additional starting materials E) to S) as described above may be added during step 1), step 2) or both. The starting materials may be combined at 20° C. to 150° C. The method may further comprise heating the starting materials at a temperature of 50° C. to 150° C., alternatively 60° C. to 120° C. in step 1), step 2) or both. The pressure is not critical; the method may be performed at ambient pressure.

Release Coating Composition

Alternatively, the curable composition may be a release coating composition. The release coating composition comprises:
(i) the a) polyfunctional organohydrogensiloxane prepared by the method described above;
(ii) a polyorganosiloxane having an average, per molecule, of at least two silicon-bonded aliphatically unsaturated groups capable of undergoing hydrosilylation reaction,
(iii) a hydrosilylation reaction catalyst, and
(iv) a hydrosilylation reaction inhibitor.

Starting Material (ii) Polyorganosiloxane having Aliphatically Unsaturated Groups Starting material (ii) in the release coating composition is a polyorganosiloxane having an average, per molecule, of at least two silicon-bonded aliphatically unsaturated groups capable of undergoing hydrosilylation reaction; alternatively a polyorganosiloxane having an average, per molecule, of at least two silicon-bonded groups having terminal aliphatic unsaturation. This polyorganosiloxane may be linear, branched, partly branched, cyclic, resinous (i.e., have a three-dimensional network), or may comprise a combination of different structures. The polyorganosiloxane may have average formula: $R^{13}_a SiO_{(4-a)/2}$, where each $R^{13}$ is independently selected from a monovalent hydrocarbon group or a monovalent halogenated hydrocarbon group, with the proviso that in each molecule, at least two of $R^{13}$ include aliphatic unsaturation, and where subscript a is selected such that $0 < a \leq 3.2$. Suitable monovalent hydrocarbon groups and monovalent halogenated hydrocarbon groups for $R^{13}$ are as described above for $R^1$. The average formula above for the polyorganosiloxane may be alternatively written as $(R^{13}_3 SiO_{1/2})_b (R^{13}_2 SiO_{2/2})_c (R^{13} SiO_{3/2})_d (SiO_{4/2})_e$, where $R^{13}$ is defined above, and subscripts b, c, d, and e are each independently from $\geq 0$ to $\leq 1$, with the proviso that a quantity (b+c+d+e)=1. One of skill in the art understands how such M, D, T, and Q units and their molar fractions influence subscript a in the average formula above. T units (indicated by subscript d), Q units (indicated by subscript e) or both, are typically present in polyorganosiloxane resins, whereas D units, indicated by subscript c, are typically present in polyorganosiloxane polymers (and may also be present in polyorganosiloxane resins or branched polyorganosiloxanes).

Alternatively, starting material (i) may comprise a polyorganosiloxane that is substantially linear, alternatively is linear. The substantially linear polyorganosiloxane may have the average formula: $R^{13}_{a'} SiO_{(4-a')/2}$, where each $R^{13}$ and is as defined above, and where subscript a' is selected such that $1.9 \leq a' \leq 2.2$.

At RT, the substantially linear polyorganosiloxane may be a flowable liquid or may have the form of an uncured rubber. The substantially linear polyorganosiloxane may have a viscosity of 10 mPa·s to 30,000,000 mPa·s, alternatively 10 mPa·s to 10,000 mPa·s, alternatively 100 mPa·s to 1,000,000 mPa·s, and alternatively 100 mPa·s to 100,000 mPa·s at 25° C. Viscosity may be measured at RT via a Brookfield LV DV-E viscometer with a spindle selected as appropriate to the viscosity of the substantially linear polyorganosiloxane, i.e., RV-1 to RV-7.

Alternatively, when (ii) the polyorganosiloxane is substantially linear or linear, the polyorganosiloxane may have the average unit formula: $(R^{10} R^9_2 SiO_{1/2})_{aa} (R^{10} R^9 SiO_{2/2})_{bb} (R^{10}_2 SiO_{2/2})_{cc} (R^9_3 SiO_{1/2})_{dd}$, where each $R^9$ is an independently selected monovalent hydrocarbon group that is free of aliphatic unsaturation or a monovalent halogenated hydrocarbon group that is free of aliphatic unsaturation; each $R^{10}$ is independently selected from the group consisting of alkenyl and alkynyl; subscript aa is 0, 1, or 2, subscript bb is 0 or more, subscript cc is 1 or more, subscript dd is 0, 1, or 2, with the provisos that a quantity (aa+dd)$\geq$2, and (aa+dd)=2, with the proviso that a quantity (aa+bb+cc+dd) is 3 to 2,000. Alternatively, subscript cc$\geq$0. Alternatively, subscript bb$\geq$2. Alternatively, the quantity (aa+dd) is 2 to 10, alternatively 2 to 8, and alternatively 2 to 6. Alternatively, subscript cc is 0 to 1,000, alternatively 1 to 500, and alternatively 1 to 200. Alternatively, subscript bb is 2 to 500, alternatively 2 to 200, and alternatively 2 to 100.

The monovalent hydrocarbon group for $R^9$ is exemplified by an alkyl group of 1 to 6 carbon atoms, an aryl group of 6 to 10 carbon atoms, a halogenated alkyl group of 1 to 6 carbon atoms, a halogenated aryl group of 6 to 10 carbon atoms, an aralkyl group of 7 to 12 carbon atoms or a halogenated aralkyl group of 7 to 12 carbon atoms, where alkyl, aryl, and halogenated alkyl are as described herein. Alternatively, each $R^9$ is independently a monovalent hydrocarbon group free of aliphatic unsaturation. Alternatively, each $R^9$ is an alkyl group. Alternatively, each $R^9$ is independently methyl, ethyl or propyl. Each instance of $R^9$ may be the same or different. Alternatively, each $R^9$ is a methyl group.

The aliphatically unsaturated monovalent hydrocarbon group for $R^{10}$ is capable of undergoing a hydrosilylation reaction. Suitable aliphatically unsaturated hydrocarbon groups for $R^{10}$ are exemplified by an alkenyl group as defined herein and exemplified by vinyl, allyl, butenyl, and hexenyl; and alkynyl groups as defined herein and exemplified by ethynyl and propynyl. Alternatively, each $R^{10}$ may be vinyl or hexenyl. Alternatively, each $R^{10}$ is a vinyl group. The subscripts in the unit formula for (ii-I) above may have values sufficient that the alkenyl or alkynyl content of the branched siloxane for (ii-I) may be 0.1% to 1%, alternatively 0.2% to 0.5%, based on the weight of branched siloxane (ii-I).

When (ii) the polyorganosiloxane is substantially linear, alternatively is linear, the at least two aliphatically unsaturated groups may be bonded to silicon atoms in pendent positions, terminal positions, or in both pendent and terminal locations. As a specific example of the polyorganosiloxane having pendent silicon-bonded aliphatically unsaturated groups, starting material A) may have the average unit formula: $[(CH_3)_3 SiO_{1/2}]_2 [(CH_3)_2 SiO_{2/2}]cc[(CH_3) ViSiO_{2/2}]_{bb}$, where subscripts bb and cc are defined above, and Vi indicates a vinyl group. With regard to this average formula, any methyl group may be replaced with a different monovalent hydrocarbon group (such as alkyl or aryl), and any vinyl group may be replaced with a different aliphatically unsaturated monovalent hydrocarbon group (such as allyl or hexenyl). Alternatively, as a specific example of the polyorganosiloxane having an average, per molecule, of at least two silicon-bonded aliphatically unsaturated groups, starting material (ii) may have the average formula: $Vi(CH_3)_2 SiO[(CH_3)_2 SiO]_{cc} Si(CH_3)_2 Vi$, where subscript cc and Vi are defined above. The dimethyl polysiloxane terminated with silicon-bonded vinyl groups may be used alone or in combination with the dimethyl, methyl-vinyl polysiloxane disclosed immediately above. With regard to this average formula, any methyl group may be replaced with a different monovalent hydrocarbon group, and any vinyl group may be replaced with any terminally aliphatically unsaturated monovalent hydrocarbon group. Because the at least two silicon-bonded aliphatically unsaturated groups may be both pendent and terminal, (ii) the polyorganosiloxane may alternatively have the average unit formula: $[Vi(CH_3)_2SiO_{1/2}]_2[(CH_3)_2SiO_{2/2}]_{cc}[(CH_3)ViSiO_{2/2}]_{bb}$, where subscripts bb and cc and Vi are defined above.

The substantially linear polyorganosiloxane can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

Alternatively, starting material (ii) may comprise a substantially linear, alternatively linear, polyorganosiloxane selected from the group consisting of:
i) dimethylvinylsiloxy-terminated polydimethylsiloxane,
ii) dimethylvinylsiloxy-terminated poly(dimethylsiloxane/methylvinylsiloxane),
iii) dimethylvinylsiloxy-terminated polymethylvinylsiloxane,
iv) trimethylsiloxy-terminated poly(dimethylsiloxane/methylvinylsiloxane),
v) trimethylsiloxy-terminated polymethylvinylsiloxane,
vi) dimethylvinylsiloxy-terminated poly(dimethylsiloxane/methylvinylsiloxane),
vii) dimethylvinylsiloxy-terminated poly(dimethylsiloxane/methylphenylsiloxane),
viii) dimethylvinylsiloxy-terminated poly(dimethylsiloxane/diphenylsiloxane),
ix) phenyl,methyl,vinyl-siloxy-terminated polydimethylsiloxane,
x) dimethylhexenylsiloxy-terminated polydimethylsiloxane,
xi) dimethylhexenylsiloxy-terminated poly(dimethylsiloxane/methylhexenylsiloxane),
xii) dimethylhexenylsiloxy-terminated polymethylhexenylsiloxane,
xiii) trimethylsiloxy-terminated poly(dimethylsiloxane/methylhexenylsiloxane),
xiv) trimethylsiloxy-terminated polymethylhexenylsiloxane
xv) dimethylhexenyl-siloxy terminated poly(dimethylsiloxane/methylhexenylsiloxane),
xvi) dimethylvinylsiloxy-terminated poly(dimethylsiloxane/methylhexenylsiloxane), and
xvii) a combination thereof.

Alternatively, A) the polyorganosiloxane may be a resinous polyorganosiloxane. The resinous polyorganosiloxane may have the average formula: $R^{13}_{a''}SiO_{(4-a'')/2}$, where each $R^{13}$ is as defined above, and where subscript a" is selected such that $0.5 \leq a'' \leq 1.7$.

The resinous polyorganosiloxane has a branched or a three-dimensional network molecular structure. At 25° C., the resinous polyorganosiloxane may be in a liquid or in a solid form. Alternatively, the resinous polyorganosiloxane may be exemplified by a polyorganosiloxane that comprises only T units, a polyorganosiloxane that comprises T units in combination with other siloxy units (e.g., M, D, and/or Q siloxy units), or a polyorganosiloxane comprising Q units in combination with other siloxy units (i.e., M, D, and/or T siloxy units). Typically, the resinous polyorganosiloxane comprises T and/or Q units. Specific example of the resinous polyorganosiloxane include a vinyl-terminated silsesquioxane and a vinyl terminated MDQ resin.

Alternatively, starting material (ii) may comprise (ii-I) a branched siloxane, (ii-II) a silsesquioxane or both (ii-I) and (ii-II). Starting materials (ii-I) and (ii-II) may be particularly useful when the composition will be used for release coating applications.

Starting material (ii) may be a combination of the (ii-I) branched siloxane and (ii-II) the silsesquioxane. The combination may be a physical blend or mixture. The branched siloxane and the silsesquioxane are present in amounts relative to one another such that the amount of (ii-I) the branched siloxane and the amount of (ii-II) the silsesquioxane combined total 100 weight parts, based on combined weights of all starting materials in the release coating composition. The branched siloxane may be present in an amount of 50 to 100 parts by weight, and the silsesquioxane may be present in an amount of 0 to 50 parts by weight. Alternatively, the branched siloxane may be present in an amount 50 to 90 parts by weight and the silsesquioxane may be present in an amount of 10 to 50 parts by weight. Alternatively, the branched siloxane may be present in an amount of 50 to 80 parts by weight and the silsesquioxane may be present in an amount of 20 to 50 parts by weight. Alternatively, the branched siloxane may be present in an amount of 50 to 76 parts by weight and the silsesquioxane may be present in an amount of 24 to 50 parts by weight. Alternatively, the branched siloxane may be present in an amount of 50 to 70 parts by weight and the silsesquioxane may be present in an amount of 30 to 50 parts by weight. Without wishing to be bound by theory, it is thought that if the amount of silsesquioxane (ii-II) exceeds 50 weight parts, per 100 weight parts the combined amounts of (ii-I) the branched siloxane and (ii-II) the silsesquioxane, the release coating formed from the composition may suffer from the drawback of migration, where silsesquioxane can migrate and contaminate an adherend such as a pressure sensitive adhesive in contact with the release coating.

Starting material (ii-I) the branched siloxane may have unit formula (ii-I): $(R^9_3SiO_{1/2})_p(R^{10}R^9_2SiO_{1/2})_q(R^9_2SiO_{2/2})_r(SiO_{4/2})_s$, where each $R^9$ is independently a monovalent hydrocarbon group free of aliphatic unsaturation or a monovalent halogenated hydrocarbon group free of aliphatic unsaturation and each $R^{10}$ is an alkenyl group or an alkynyl group, both of which are as described above, subscript $p \geq 0$, subscript $q > 0$, $15 \geq r \geq 995$, and subscript s is $>0$.

In the unit formula for (ii-I), subscript $p \geq 0$. Subscript $q > 0$. Alternatively, subscript $q \geq 3$. Subscript r is 15 to 995. Subscript s is $>0$. Alternatively, subscript $s \geq 1$. Alternatively, for subscript p: $22 \geq p \geq 0$; alternatively $20 \geq p \geq 0$; alternatively $15 \geq p \geq 0$; alternatively $10 \geq p \geq 0$; and alternatively $5 \geq p \geq 0$. Alternatively, for subscript q: $22 \geq q > 0$; alternatively $22 \geq q \geq 4$; alternatively $20 \geq q > 0$; alternatively $15 \geq q > 1$; alternatively $10 \geq q \geq 2$; and alternatively $15 \geq q \geq 4$. Alternatively, for subscript r: $800 \geq r \geq 15$; and alternatively $400 \geq r \geq 15$. Alternatively, for subscript s: $10 \geq s > 0$; alternatively, $10 \geq s \geq 1$; alternatively $5 \geq s > 0$; and alternatively $s=1$. Alternatively, subscript s is 1 or 2. Alternatively, when subscript $s=1$, subscript p may be 0 and subscript q may be 4.

The branched siloxane may contain at least two polydiorganosiloxane chains of formula $(R^9_2SiO_{2/2})_m$, where each subscript m is independently 2 to 100. Alternatively, the branched siloxane may comprise at least one unit of formula $(SiO_{4/2})$ bonded to four polydiorganosiloxane chains of formula $(R^9_2SiO_{2/2})_o$, where each subscript o is independently 1 to 100. Alternatively, the branched siloxane may have formula:

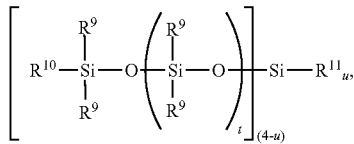

where subscript u is 0 or 1, each subscript t is independently 0 to 995, alternatively 15 to 995, and alternatively 0 to 100; each $R^{11}$ is an independently selected monovalent hydrocarbon group, each $R^9$ is an independently selected monovalent hydrocarbon group that is free of aliphatic unsaturation or a monovalent halogenated hydrocarbon group that is free of aliphatic unsaturation as described above, and each $R^{10}$ is independently selected from the group consisting of alkenyl and alkynyl as described above. Suitable branched siloxanes for starting material (ii-I) are exemplified by those disclosed in U.S. Pat. No. 6,806,339 and U.S. Patent Publication 2007/0289495.

The silsesquioxane has unit formula (ii-II): $(R^9_3SiO_{1/2})_i (R^{10}R^9_2SiO_{1/2})_f(R^9_2SiO_{2/2})_g(R^9SiO_{3/2})_h$, where $R^9$ and $R^{10}$ are as described above, subscript $i \geq 0$, subscript $f > 0$, subscript g is 15 to 995, and subscript $h > 0$. Subscript i may be 0 to 10. Alternatively, for subscript i: $12 \geq i \geq 0$; alternatively $10 \geq i \geq 0$; alternatively $7 \geq i \geq 0$; alternatively $5 \geq i \geq 0$; and alternatively $3 \geq i \geq 0$.

Alternatively, subscript $f \geq 1$. Alternatively, subscript $f \geq 3$. Alternatively, for subscript f: $12 \geq f > 0$; alternatively $12 \geq f \geq 3$; alternatively $10 \geq f > 0$; alternatively $7 \geq f > 1$; alternatively $5 \geq f \geq 2$; and alternatively $7 \geq f \geq 3$. Alternatively, for subscript g: $800 \geq g \geq 15$; and alternatively $400 \geq g \geq 15$. Alternatively, subscript $h \geq 1$. Alternatively, subscript h is 1 to 10. Alternatively, for subscript h: $10 \geq h > 0$; alternatively $5 \geq h > 0$; and alternatively $h=1$. Alternatively, subscript h is 1 to 10, alternatively subscript h is 1 or 2. Alternatively, when subscript $h=1$, then subscript f may be 3 and subscript i may be 0. The values for subscript f may be sufficient to provide the silsesquioxane of unit formula (ii-II) with an alkenyl content of 0.1% to 1%, alternatively 0.2% to 0.6%, based on the weight of the silsesquioxane. Suitable silsesquioxanes for starting material (ii) are exemplified by those disclosed in U.S. Pat. No. 4,374,967.

Starting material (ii) may comprise a combination or two or more different polyorganosiloxanes that differ in at least one property such as structure, molecular weight, monovalent groups bonded to silicon atoms and content of aliphatically unsaturated groups. The release coating composition may contain 60% to 98%, alternatively 60% to 95% of starting material (ii), based on combined weights of all starting materials in the release coating composition.

Starting Material (iii) Hydrosilylation Reaction Catalyst

The hydrosilylation reaction catalyst used as starting material (iii) in the release coating composition may be as described and exemplified above for starting material b). Alternatively, the hydrosilylation reaction catalyst for use in the release coating composition may be selected from the group consisting of Karstedt's catalyst and Ashby's catalyst. The (iii) hydrosilylation-reaction catalyst is present in the release coating composition in a catalytic amount, i.e., an amount or quantity sufficient to promote curing thereof at desired conditions. The catalytic amount of the (iii) hydrosilylation reaction catalyst may be >0.01 ppm to 10,000 ppm; alternatively >1,000 ppm to 5,000 ppm. Alternatively, the typical catalytic amount of (iii) the hydrosilylation reaction catalyst is 0.1 ppm to 5,000 ppm, alternatively 1 ppm to 2,000 ppm, alternatively >0 to 1,000 ppm. Alternatively, the catalytic amount of the (iii) hydrosilylation reaction catalyst may be 0.01 ppm to 1,000 ppm, alternatively 0.01 ppm to 100 ppm, alternatively 20 ppm to 200 ppm, and alternatively 0.01 ppm to 50 ppm of platinum group metal; based on combined weights of all starting materials in the release coating composition.

Starting Material (iv) Hydrosilylation Reaction Inhibitor

Starting material (iv) is an inhibitor that may be used for altering the reaction rate of the release coating composition, as compared to a composition containing the same starting materials, but with the inhibitor omitted. Inhibitors for hydrosilylation curable compositions are exemplified by acetylenic alcohols such as methylbutynol, ethynylcyclohexanol, dimethylhexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne; triazoles such as benzotriazole; phosphines; mercaptans; hydrazines; amines, such as tetramethyl-ethylenediamine, dialkyl fumarates, dialkenyl fumarates, dialkoxyalkyl fumarates, maleates such as diallyl maleate; nitriles; ethers; carbon monoxide; alkenes such as cyclooctadiene, divinyltetramethyldisiloxane; alcohols such as benzyl alcohol; and a combination thereof. Alternatively, the hydrosilylation reaction inhibitor may be selected from the group consisting of acetylenic alcohols (e.g., 1-ethynyl-1-cyclohexanol) and maleates (e.g., diallyl maleate, diethyl maleate, or n-propyl maleate) and a combination of two or more thereof.

Alternatively, starting material (iv) in the composition may be a silylated acetylenic compound. Without wishing to be bound by theory, it is thought that adding a silylated acetylenic compound reduces yellowing of the reaction product prepared from hydrosilylation reaction of the composition as compared to a reaction product from hydrosilylation of a composition that does not contain a silylated acetylenic compound or that contains an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy) dimethylsilane, bis(3-methyl-1-butyn-3-oxy)silanemethylvinylsilane, bis((1,1-dimethyl-2-propynyl)oxy)

dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, starting material (iv) is exemplified by methyl(tris(1,1-dimethyl-2-propynyloxy))silane, ((1,1-dimethyl-2-propynyl)oxy)trimethylsilane, or a combination thereof. The silylated acetylenic compound useful as starting material (iv) may be prepared by methods known in the art, such as silylating an acetylenic alcohol described above by reacting it with a chlorosilane in the presence of an acid receptor.

The amount of inhibitor added to the release coating composition will depend on various factors including the desired pot life of the composition, whether the composition will be a one part composition or a multiple part composition, the particular inhibitor used, and the selection and amount of starting materials (i) and (ii). However, when present, the amount of inhibitor may be 0% to 1%, alternatively 0% to 5%, alternatively 0.001% to 1%, alter natively 0.01% to 0.5%, and alternatively 0.0025% to 0.025%, based on combined weights of all starting materials in the composition.

Additional Starting Materials

The release coating composition may optionally further comprise one or more additional starting materials selected from: (v) an anchorage additive, (vi) an anti-mist additive, (vii) a release modifier, (viii) a substantially linear or linear polyorganohydrogensiloxane, and (ix) a solvent, such as that described above for starting material D).

(v) Anchorage Additive

Starting material (v) is an anchorage additive. Suitable anchorage additives are exemplified by a reaction product of a vinyl alkoxysilane and an epoxy-functional alkoxysilane; a reaction product of a vinyl acetoxysilane and epoxy-functional alkoxysilane; and a combination (e.g., physical blend and/or a reaction product) of a polyorganosiloxane having at least one aliphatically unsaturated hydrocarbon group and at least one hydrolyzable group per molecule and an epoxy-functional alkoxysilane (e.g., a combination of a hydroxy-terminated, vinyl functional polydimethylsiloxane with glycidoxypropyltrimethoxysilane). Alternatively, the anchorage additive may comprise a polyorganosilicate resin. Suitable anchorage additives and methods for their preparation are disclosed, for example, in U.S. Pat. No. 9,562,149; U.S. Patent Application Publication Numbers 2003/0088042, 2004/0254274, and 2005/0038188; and European Patent 0 556 023. The exact amount of anchorage additive depends on various factors including the type of substrate and whether a primer is used, however, the amount of anchorage additive in the release coating composition may be 0 to 2 parts by weight, per 100 parts by weight of starting material (ii). Alternatively, the amount of anchorage additive, may be 0.01 to 2 parts by weight, per 100 parts by weight of starting material (ii).

(vi) Anti-Mist Additive

Starting material (vi) is an anti-mist additive that may be added to the release coating composition to reduce or suppress silicone mist formation in coating processes, particularly with high speed coating equipment. The anti-mist additive may be a reaction product of an organohydrogensilicon compound, an oxyalkylene compound or an organoalkenylsiloxane with at least three silicon-bonded alkenyl groups per molecule, and a suitable catalyst. Suitable anti-mist additives are disclosed, for example, in U.S. Patent Application 2011/0287267; U.S. Pat. Nos. 8,722,153; 6,586,535; and 5,625,023.

The amount of anti-mist additive will depend on various factors including the amount and type of other starting materials selected for the release coating composition. However, the amount of anti-mist additive may be 0% to 10%, alternatively 0.1% to 3%, based on combined weights of all starting materials in the release coating composition.

(vii) Release Modifier

Starting material (vii) is a release modifier that may be added to the release coating composition to control (decrease) the level of release force (the adhesive force between the release coating and an adherend thereto, such as a label including a pressure sensitive adhesive). Release coating compositions having the required release force can be formulated from a modifier-free release coating composition by adjusting the level of modifier. Examples of suitable release modifiers include trimethylsiloxy-terminated dimethyl, phenylmethylsiloxane copolymers. Alternatively, the release modifier may be a condensation reaction product of an organopolysiloxane resin having hydroxyl or alkoxy groups and a diorganopolysiloxane with at least one hydroxyl or hydrolyzable group. If used, a release modifier can, for example, be used at 0 to 85 parts by weight, alternatively 25 to 85 parts, per 100 parts of starting material (ii). Examples of suitable release modifiers are disclosed, for example, in U.S. Pat. No. 8,933,177 and U.S. Patent Application Publication 2016/0053056.

(viii) Linear Polyorganohydrogensiloxane

Starting material (viii) is a substantially linear, alternatively linear, polyorganohydrogensiloxane distinct from starting material (i), which may be added as an additional crosslinker to the release coating composition. The substantially linear or linear polyorganohydrogensiloxane has unit formula:

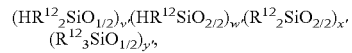

where each $R^{12}$ is an independently selected monovalent hydrocarbon group, subscript v' is 0, 1, or 2, subscript w' is 1 or more, subscript x' is 0 or more, subscript y' is 0, 1, or 2, with the provisos that a quantity (v'+y')=2, and a quantity (v'+w')≥3. The monovalent hydrocarbon group for $R^{12}$ may be as described above for the monovalent hydrocarbon group for $R^1$. A quantity (v'+w'+x'+y') may be 2 to 1,000. The polyorganohydrogensiloxane is exemplified by:
i) dimethylhydrogensiloxy-terminated poly(dimethyl/methylhydrogen)siloxane copolymer,
ii) dimethylhydrogensiloxy-terminated polymethylhydrogensiloxane,
iii) trimethylsiloxy-terminated poly(dimethyl/methylhydrogen)siloxane copolymer, and
iv) trimethylsiloxy-terminated polymethylhydrogensiloxane, and
v) a combination of two or more of i), ii), iii), iv), and v). Suitable polyorganohydrogensiloxanes are commercially available from Dow Silicones Corporation of Midland, Michigan, USA.

(ix) Solvent

Starting material (x) is a solvent. Suitable solvents include the hydrocarbons described above as starting material D) in the method for making the polyfunctional organohydrogensiloxane. Alternatively, the solvent may be selected from polyalkylsiloxanes, alcohols, ketones, glycol ethers, tetrahydrofuran, mineral spirits, naphtha, tetrahydrofuran, mineral spirits, or a combination thereof. Polyalkylsiloxanes with suitable vapor pressures may be used as the solvent, and these include hexamethyldisiloxane, octamethyltrisiloxane, hexamethylcyclotrisiloxane and other low molecular weight polyalkylsiloxanes, such as 0.5 to 1.5 cSt DOWSIL™ 200 Fluids and DOWSIL™ OS FLUIDS, which are commercially available from Dow Silicones Corporation of Midland, Michigan, U.S.A.

Alternatively, starting material (x) may comprise an organic solvent. The organic solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, tetrahydrofuran; mineral spirits; naphtha; or a combination thereof.

The amount of solvent will depend on various factors including the type of solvent selected and the amount and type of other starting materials selected for the release coating composition. However, the amount of solvent may be 0% to 99%, alternatively 2% to 50%, based on the weight of all starting materials in the release coating composition. The solvent may be added during preparation of the release coating composition, for example, to aid mixing and delivery. All or a portion of the solvent may optionally be removed after the release coating composition is prepared.

Other optional starting materials which may also be added to release coating compositions described herein include, for example, reactive diluents, fragrances, preservatives, colorants, and fillers, for example, silica, quartz or chalk.

When selecting starting materials for the release coating composition (and other curable compositions described herein), there may be overlap between types of starting materials because certain starting materials described herein may have more than one function. Certain particulates may be useful as fillers and as colorants such as pigments, and even as flame retardants, e.g., carbon black. When adding additional starting materials to the release coating composition, the additional starting materials are distinct from starting materials (i) to (iv) and from one another.

Alternatively, the release coating may be free of particulates or contains only a limited amount of particulate (e.g., filler and/or pigment), such as 0 to 30% by weight of the release coating composition. Particulates can agglomerate or otherwise stick to the coater equipment used to apply the release coating. They can hinder optical properties, for example transparency, of the release coating and of the release liner formed therewith, if optical transparency is desired. The particulates may be prejudicial to the adherence of an adherend.

Alternatively, the release coating composition of the invention may be free from fluoroorganosilicone compounds. It is believed that, during the cure, a fluorocompound, because of its low surface tension, may rapidly migrate to the interface of a coating composition and a substrate, for example a polyorganosiloxane release coating composition/PET film interface, and prevent adherence of the release coating (prepared by curing the release coating composition) to the substrate by making a fluorine-containing barrier. By making a barrier, the fluorocompound may prevent any starting material from reacting at the interface. Moreover, fluorosilicone compounds are usually expensive.

The release composition may be prepared by combining starting materials comprising (i), (ii), (iii) and (iv), described above, along with any optional additional starting materials, in any order of addition, optionally with a master batch, and optionally under shear.

Method for Coating a Substrate

A method of preparing a coated substrate with the curable composition comprises disposing the curable composition on the substrate. The method further comprises curing the curable composition on the substrate. Curing may be performed by heating at an elevated temperature, e.g., 50° C. to 180° C., alternatively 50° C. to 120° C., and alternatively 50° C. to 90° C. to give the coated substrate. One skilled in the art would be able to select an appropriate temperature depending on various factors including the selection of optional starting materials in the curable composition and the substrate material of construction.

The curable composition may be disposed or dispensed on the substrate in any suitable manner. Typically, the curable composition is applied in wet form via a wet coating technique. The curable composition may be applied by i) spin coating; ii) brush coating; iii) drop coating; iv) spray coating; v) dip coating; vi) roll coating; vii) flow coating; viii) slot coating; ix) gravure coating; x) Meyer bar coating; or xi) a combination of any two or more of i) to x). Typically, disposing the curable composition on the substrate results in a wet deposit on the substrate, which is subsequently cured to give the coated substrate, which comprises a cured film formed from the curable composition on the substrate.

The substrate is not limited and may be any substrate. The cured film may be separable from the substrate or may be physically and/or chemically bonded to the substrate depending on its selection. The substrate may have an integrated hot plate or an integrated or stand-alone furnace for curing the deposit. The substrate may optionally have a continuous or non-continuous shape, size, dimension, surface roughness, and other characteristics. Alternatively, the substrate may have a softening point temperature at the elevated temperature. However, the curable composition and method are not so limited.

Alternatively, the substrate may comprise a plastic, which maybe a thermosetting and/or thermoplastic. However, the substrate may alternatively be glass, metal, paper, wood, cardboard, paperboard, a silicone, or polymeric materials, or a combination thereof.

Specific examples of suitable substrates include paper substrates such as Kraft paper, polyethylene-coated Kraft paper (PEK coated paper), and regular papers; polymeric substrates such as polyamides (PA); polyesters such as polyethylene terephthalates (PET), polybutylene terephthalates (PET), polytrimethylene terephthalates (PTT), polyethylene naphthalates (PEN), and liquid crystalline polyesters; polyolefins such as polyethylenes (PE), polypropylenes (PP), and polybutylenes; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones; polyvinyl alcohols (PVA); polyetheretherketones (PEEK); polyetherketoneketones (PEKK); polyarylates (PAR); polyethernitriles (PEN); phenolic resins; phenoxy resins; celluloses such as triacetylcellulose, diacetylcellulose, and cellophane; fluorinated resins, such as polytetrafluoroethylenes; thermoplastic elastomers, such as polystyrene types, polyolefin types, polyurethane types, polyester types, polyamide types, polybutadiene types, polyisoprene types, and fluoro types; and copolymers, and combinations thereof.

The curable composition, or wet deposit, is typically cured at an elevated temperature for a period of time. The period of time is typically sufficient to effect curing, i.e., cross-linking, of the curable composition. The period of time may be greater than 0 to 8 hours, alternatively greater than 0 to 2 hours, alternatively greater than 0 to 1 hour, alternatively greater than 0 to 30 minutes, alternatively greater than 0 to 15 minutes, alternatively greater than 0 to 10 minutes, alternatively greater than 0 to 5 minutes, alternatively greater than 0 to 2 minutes. The period of time depends on various factors including on the elevated temperature is utilized, the temperature selected, desired film thickness, and the presence or absence of any water or carrier vehicle in the curable composition.

Curing the curable composition typically has a dwell time of 0.1 second to 50 seconds; alternatively 1 second to 10 seconds; and alternatively 0.5 second to 30 seconds. Dwell time selected may depend on the substrate selection, temperature selected, and line speed. Dwell time, as used herein, refers to the time during which the curable composition, or wet deposit, is subjected to the elevated temperature. Dwell time is distinguished from cure time, as there may be ongoing curing even after the curable composition, wet deposit, or partially cured reaction intermediary thereof is no longer subjected to the elevated temperature, which typically initiates curing. Alternatively, the coated article may be prepared on a conveyor belt in an oven, and the dwell time may be calculated by dividing a length of the oven (e.g. in meters) by a line speed of the conveyor belt (e.g. in meters/sec).

The period of time may be broken down into cure iterations, e.g. a first-cure and a post-cure, with the first-cure being, for example, one hour and the post cure being, for example, three hours. The elevated temperature may be independently selected from any temperature above room temperature in such iterations, and may be the same in each iteration.

Depending on the thickness and other dimensions of the film and coated substrate, the coated substrate can be formed via an iterative process. For example, a first deposit may be formed and subjected to a first elevated temperature for a first period of time to give a partially cured deposit. Then, a second deposit may be disposed on the partially cured deposit and subjected to a second elevated temperature for a second period of time to give a second partially cured deposit. The partially cured deposit will also further cure during exposure to the second elevated temperature for the second period of time. A third deposit may be disposed on the second partially cured deposit and subjected to a third elevated temperature for a third period of time to give a third partially cured deposit. The second partially cured deposit will also further cure during exposure to the second elevated temperature for the second period of time. This process may be repeated, for example, from 1 to 50 times, to build the coated article as desired. A composite composed of partially cured layers may be subjected to a final post-cure, e.g. at the elevated temperature and period of time above. Each elevated temperature and period of time may be independently selected and may be the same as or different from one another. When the article is formed via the iterative process, each deposit may also be independently selected and may differ in terms of starting materials selected in the curable composition, their amounts, or both. Alternatively still, each iterative layer may be fully cured, rather than only being partially cured, in such an iterative process.

Alternatively, the deposit may comprise a wet film. Alternatively, the iterative process may be wet-on-wet, depending on a cure state of the partially cured layer. Alternatively, the iterative process may be wet-on-dry.

The coated substrate, which comprises the film formed from the curable composition on the substrate, may have varying dimensions, including relative thicknesses of the film and the substrate. The film has a thickness that may vary depending upon its end-use application. The film may have a thickness of greater than 0 to 4,000 µm, alternatively greater than 0 to 3,000 µm, alternatively greater than 0 to 2,000 µm, alternatively greater than 0 to 1,000 µm, alternatively greater than 0 to 500 µm, alternatively greater than 0 to 250 µm. However, other thicknesses are contemplated, e.g. 0.1 to 200 µm. For example, the thickness of the film may be 0.2 to 175 µm; alternatively 0.5 to 150 µm; alternatively 0.75 to 100 µm; alternatively 1 to 75 µm; alternatively 2 to 60 µm; alternatively 3 to 50 µm; and alternatively 4 to 40 µm. Alternatively, when the substrate is plastic, the film may have a thickness of greater than 0 to 200, alternatively greater than 0 to 150 µm, and alternatively greater than 0 to 100 µm.

If desired, the film may be subjected to further processing depending upon its end-use application. For example, the film may be subjected to oxide deposition (e.g. $SiO_2$ deposition), resist deposition and patterning, etching, chemical, corona, or plasma stripping, metallization, or metal deposition. Such further processing techniques are generally known. Such deposition may be chemical vapor deposition (including low-pressure chemical vapor deposition, plasma-enhanced chemical vapor deposition, and plasma-assisted chemical vapor deposition), physical vapor deposition, or other vacuum deposition techniques. Many such further processing techniques involve elevated temperatures, particularly vacuum deposition, for which the film is well-suited in view of its excellent thermal stability. Depending on an end use of the film, however, the film may be utilized with such further processing.

The coated substrate may be utilized in diverse end-use applications. For example, the coated substrate may be utilized in coating applications, packaging applications, adhesive applications, fiber applications, fabric or textile applications, construction applications, transportation applications, electronics applications, or electrical applications. However, the curable composition may be utilized in end-use applications other than preparing the coated substrate, e.g. in the preparation of articles, such as silicone rubbers.

Alternatively, the coated substrate may be utilized as a release liner, e.g. for a tape or adhesive, including any pressure-sensitive adhesives, including acrylic resin-type pressure-sensitive adhesives, rubber-type pressure-sensitive adhesives, and silicone-type pressure-sensitive adhesives, as well as acrylic resin-type adhesives, synthetic rubber-type adhesives, silicone-type adhesives, epoxy resin-type adhesives, and polyurethane-type adhesives. Each major surface of the substrate may have a film disposed thereon for double-sided tapes or adhesives.

Alternatively, when the curable composition will be formulated as a release coating composition, the release coating composition may be prepared by mixing the starting materials together, for example, to prepare a one-part composition. However, it may be desirable to prepare a release coating composition as a multiple-part composition, in which starting materials having SiH functionality (e.g., starting material (i)), the hydrosilylation reaction catalyst are stored in separate parts, until the parts are combined at the time of use (e.g., shortly before application to a substrate).

For example, a multiple-part composition may comprise:
Part (A) a base part comprising (ii) the polyorganosiloxane having an average, per molecule, of at least 2 silicon-bonded aliphatically unsaturated hydrocarbon groups and (iii) the hydrosilylation reaction catalyst, and when present, one or more of, the anchorage additive, and the solvent, and Part (B) a curing agent part comprising (ii) the polyorganosiloxane having an average, per molecule, of at least 2 silicon-bonded aliphatically unsaturated hydrocarbon groups and (i) the polyfunctional organohydrogensiloxane, and when present (viii) the substantially linear or linear polyorganohydrogensiloxane, the anchorage additive, the solvent. Starting material (iv), the inhibitor, may be added to either Part (A), Part (B), or both. Part (A) and Part (B) may be combined in a weight ratio (A):(B) of 1:1 to 10:1, alternatively 1:1 to 5:1, and alternatively 1:1 to 2:1. Part (A) and Part (B) may be provided in a kit with instructions, e.g., for how to combine the parts to prepare the release coating composition, how to apply the release coating composition to a substrate, and how to cure the release coating composition.

Alternatively, when the anchorage additive is present, it can be incorporated in either of Part (A) or Part (B), or it can be added in a separate (third) part.

Alternatively, the release coating composition may be prepared by a method comprising:
1) mixing starting materials comprising (ii) the polyorganosiloxane having an average, per molecule, of at least 2 silicon-bonded aliphatically unsaturated hydrocarbon groups, (i) the polyfunctional organohydrogensiloxane, (iii) the hydrosilylation reaction catalyst, (iv) the inhibitor, and optionally one or more of (v) the anchorage additive, (vi) the anti-mist additive, (vii) the controlled release agent, (viii) the linear polyorganohydrogensiloxane, and (ix) the solvent, thereby forming a release coating composition;
2) applying the mixture on a substrate. Step 1) may be performed by mixing Part (A) and Part (B) of a multiple part composition, as described above.

The release coating composition can, for example, be applied to the substrate by any convenient means such as spraying, doctor blade, dipping, screen printing or by a roll coater, e.g. an offset web coater, kiss coater or etched cylinder coater.

The release coating composition of the invention can be applied to any substrate, such as those described above. Alternatively, the release coating composition may be applied to polymer film substrates, for example polyester, particularly polyethylene terephthalate (PET), polyethylene, polypropylene, or polystyrene films. The release coating composition can alternatively be applied to a paper substrate, including plastic-coated paper, for example paper coated with polyethylene, glassine, super calender paper, or clay coated kraft. The release coating composition can alternatively be applied to a metal foil substrate, for example aluminum foil.

The method may further comprise: 3) treating the substrate before coating the release coating composition on the substrate. Treating the substrate may be performed by any convenient means such as a plasma treatment or a corona discharge treatment. Alternatively, the substrate may be treated by applying a primer. In certain instances anchorage of the release coating may be improved if the substrate is treated before coating.

When the release coating composition includes a solvent, the method may further comprise: 4) removing solvent, which may be performed by any conventional means, such as heating at 50° C. to 100° C. for a time sufficient to remove all or a portion of the solvent. The method may further comprise 5) curing the release coating composition to form a release coating on a surface of the substrate. Curing may be performed by any conventional means such as heating at 100° C. to 200° C.

Under production coater conditions, cure can be effected in a residence time of 1 second to 6 seconds, alternatively 1.5 seconds to 3 seconds, at an air temperature of 120° C. to 150° C. Heating for steps 4) and/or 5) can be performed in an oven, e.g., an air-circulation oven or tunnel furnace or by passing the coated film around heated cylinders.

EXAMPLES

These examples are intended to illustrate the invention and should not be interpreted as limiting the scope of the invention set forth in the claims. The starting materials described in Table 1 and Reference Examples 1 and 2 were used in the examples herein.

TABLE 1

Starting Materials

| Name | Chemical Description | Supplier |
| --- | --- | --- |
| MH-1109 | Cyclic polymethylhydrogensiloxane mixture having DP = 4 to 6, crude (not purified after production) | Dow Silicones |
| PA fluid, 4-2737 | Silanol-terminated polydimethylsiloxane, average DP = 10.8 | Dow Silicones |
| FAB | Tris(pentafluorophenyl)borane | TCI |
| $Al_2O_3$ | Activated alumina, neutral | Millipore Sigma |
| Heptane | n-heptane | Millipore Sigma |
| MIBK | Methyl isobutyl ketone | Millipore Sigma |
| Allyl Glycidyl Ether | Allyl glycidyl ether | Millipore Sigma |
| THF | Tetrahydrofuran | Millipore Sigma |
| Toluene | Toluene | Millipore Sigma |
| DEE | Diethyl ether | Millipore Sigma |
| $CDCl_3$ | Deuterated chloroform | Cambridge Isotope Laboratories, Inc. |
| $CD_2Cl_2$ | Deuterated methylene chloride | Cambridge Isotope Laboratories, Inc. |
| $C_6D_6$ | Deuterated benzene | Cambridge Isotope Laboratories, Inc. |
| HTMS | Heptamethyltrisiloxane | |
| | Phenylacetylene | Sigma Aldrich |
| Q5 | Oxygen scavenger | Now known as Cu-0226 S, supplied by BASF |

Reference Example 1—General Procedures

Unless otherwise noted, all experimental procedures and manipulations of chemical substances were performed in a nitrogen-purged glove box or on a Schlenk line. All bulk reaction solvents (toluene, diethyl ether, hexane, tetrahydrofuran (THF)) were dried by passage through columns of alumina and Q5 reactive scavenger. All other solvents were purchased from Aldrich anhydrous grade and stored over activated 3 Å molecular sieves prior to use. NMR solvents ($CDCl_3$, $CD_2Cl_2$, and $C_6D_6$), obtained from Cambridge Isotope Laboratories, Inc., were dried over active 3 Å molecular sieves or, in the case of $C_6D_6$, dried using Na/K alloy. 1-Bromo-3,5-bis(trifluoromethyl)benzene, 1-bromo-2,5-bis(trifluoromethyl)benzene, 1-bromo-2,6-difluorobenzene, 1-bromo-2,4,6-trifluorobenzene, and 1-bromo-4-trifluoromethylbenzene were purchased from Oakwood Chemical. 1-Bromo-2,3,5,6-tetrafluoro-4-trifluoromethylbenzene was purchased from Alfa Aesar. FAB was purchased from TCI. All other reagents were purchased from Sigma-Aldrich and used as received. n-Butyllithium (solution in hexanes) was titrated using 1.00 M decanol in toluene with 1,10-phenanthroline as an indicator prior to use.[1]

[1] Watson, S. C.; Eastham, J. F. "Colored indicators for simple direct titration of magnesium and lithium reagents", *J. Organomet. Chem.*, 1967, 9, 165-168.

Multinuclear NMR spectra ($^1H$, $^{13}C$, $^{19}F$, $^{29}Si$, $^{11}B$) were collected on one of the following instruments: Varian MR-400 or Varian VNMRS-500. $^{11}B$ NMR spectra were collected only on the Varian VNMRS-500. The $^1H$ and $^{13}C$ NMR chemical shifts were referenced in parts per million relative to residual solvent peaks: $^1H$—5.32 ppm for $CD_2Cl_2$, 7.15 ppm for $C_6D_6$, 7.25 ppm for $CDCl_3$; $^{13}C$—54.00 ppm for $CD_2Cl_2$, 128.00 ppm for $C_6D_6$, 77.00 ppm for $CDCl_3$. $^{11}B$ NMR chemical shifts were referenced externally to $BF_3(Et_2O)$ (0 ppm), $^{19}F$ NMR chemical shifts were referenced externally to $CFCl_3$ (0 ppm). Sub-ambient reaction temperatures, except when dry ice or ice were the sole means of cooling, were measured using an Extech Instruments EasyView™10 Dual K model EA 10 thermometer with a fine JKEM sensor PTFE wire K 36INJ.

Reference Example 2—Synthetic Procedures—Preparation of Starting Materials

Preparation of lithium(diethyletherate) (3,5-bis(trifluoromethyl)phenyl)triisopropoxyborate was performed as follows:

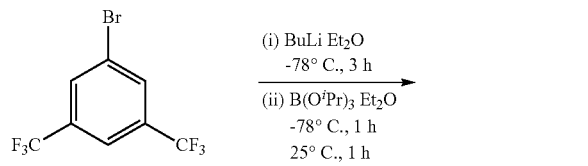

To a cold (−78° C., $CO_2(s)$ bath) solution of 1-bromo-3,5-bis(trifluoromethyl)benzene (18.52 g, 63.19 mmol) in diethyl ether (200 mL) was added n-butyllithium (23.0 mL, 2.61 M in hexanes, 60.03 mmol) with stirring. The reaction mixture was stirred for 3 hours at −78° C. with formation of precipitate. Triisopropylborate (11.86 g, 63.06 mmol) in ether (20 mL) was added slowly. The reaction mixture was stirred for 1 hour at −78° C., then was allowed to warm to ambient temperature and was stirred for 1 hour to give a slightly cloudy solution. The reaction mixture was filtered and the volatiles were removed under reduced pressure to give a solid. The solid was triturated with hexane, filtered, and the volatiles were removed under reduced pressure to give the product as a colorless powder. Yield: 23.16 g, 94.53%. The compound was initially isolated as its ether adduct.

$^1H$ NMR (500 MHz, THF-$d_8$) δ 8.15 (s, 2H), 7.57 (s, 1H), 3.79 (p, J=6.1 Hz, 3H), 0.95 (d, J=6.1 Hz, 18H). $^{13}C$ NMR (126 MHz, THF-$d_8$) δ 159.12, 134.71, 128.90 (q, J=31.3 Hz), 125.91 (q, J=271.8 Hz), 118.70, 67.41 (dtd, J=44.2, 22.2, 2.9 Hz), 61.67, 26.53 (d, J=17.7 Hz), 25.28 (dtd, J=40.4, 20.1, 3.0 Hz). $^{19}F$ NMR (470 MHz, THF-$d_8$) δ −63.02. $^{11}B$ NMR (160 MHz, THF-$d_8$) δ 3.84.

Preparation of (3,5-bis(trifluoromethyl)phenyl)diisopropoxyborane was performed as follows:

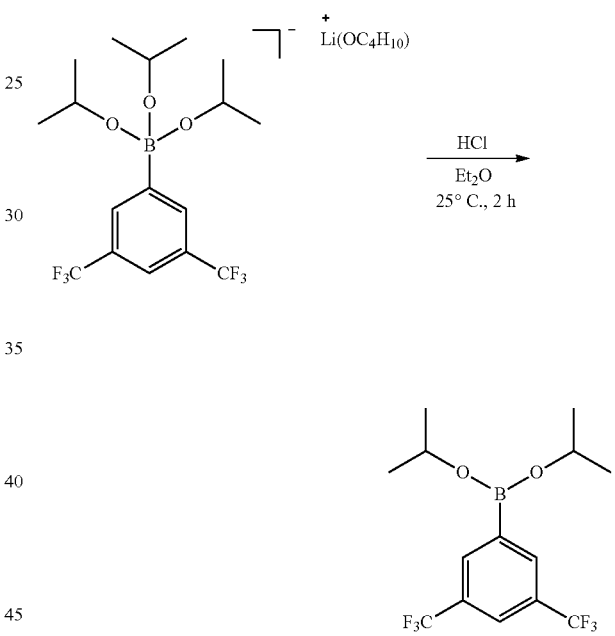

To a solution of lithium(diethyletherate) (3,5-bis(trifluoromethyl)phenyl)triisopropoxyborate (8.00 g, 19.6 mmol) in diethyl ether (100 mL) was added hydrogen chloride solution (12.3 mL, 2 M in ether, 24.6 mmol) with immediate formation of precipitate. The reaction mixture was stirred for two hours, filtered, and the volatiles were removed under reduced pressure. The resultant residue was extracted with hexane, filtered, and the volatiles were removed under reduced pressure to give the product as an oil. Yield: 5.10 g, 76.1%.

$^1H$ NMR (500 MHz, Chloroform-d) δ 8.01 (d, J=1.9 Hz, 2H), 7.89 (dt, J=2.0, 1.0 Hz, 1H), 4.59 (hept, J=6.1 Hz, 1H), 1.27 (d, J=6.2 Hz, 6H). $^{13}C$ NMR (126 MHz, Chloroform-d) δ 134.19, 132.85 (td, J=3.7, 1.9 Hz), 130.85 (q, J=32.9 Hz), 123.67 (d, J=272.6 Hz), 123.04 (hept, J=3.9 Hz), 67.00, 24.58. $^{19}F$ NMR (470 MHz, Chloroform-d) δ −63.34. $^{11}B$ NMR (160 MHz, Chloroform-d) δ 26.66.

Preparation of lithium(diethyletherate) bis(3,5-bis(trifluoromethyl)phenyl)diisopropoxyborane was performed as follows:

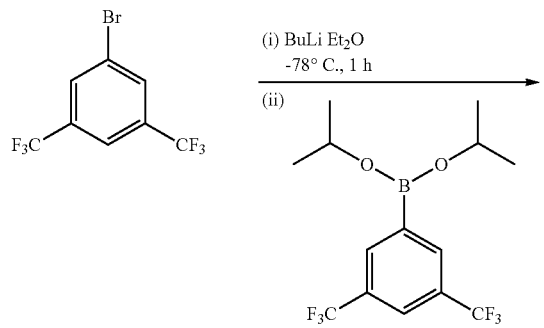

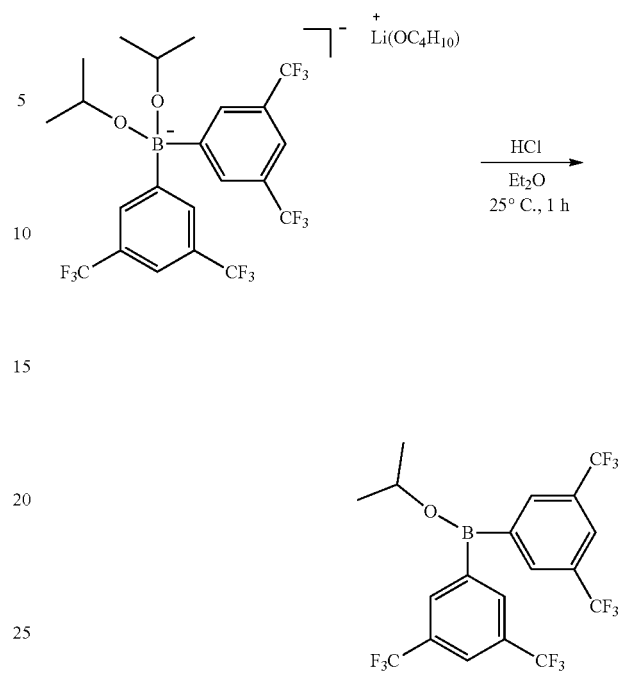

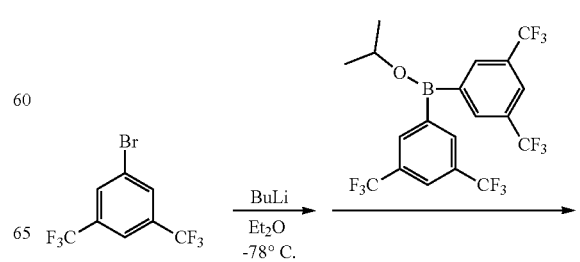

To a cold (−78° C., CO$_2$(s) bath) solution of 1-bromo-3,5-bis(trifluoromethyl)benzene (4.26 g, 14.5 mmol) in diethyl ether (200 mL) was added n-butyllithium (5.30 mL, 2.61 M in hexanes, 60.0 mmol) with stirring. The reaction mixture was stirred for 1 hour at −78° C. with formation of precipitate. (3,5-Bis(trifluoromethyl)phenyl)diisopropoxyborane (4.82 g, 14.1 mmol) in ether (15 mL) was added slowly. The reaction mixture was stirred for 1 hour at −78° C. (some solids visible), then was allowed to warm to ambient temperature and was stirred overnight to give a clear solution. The volatiles were removed under reduced pressure to give a crystalline-appearing solid. The solid was dissolved in hexane, the solution was filtered and placed in the freezer over the weekend. A large amount of crystalline material formed. The supernatant was decanted and the volatiles were removed under reduced pressure to give a colorless crystalline material. Yield of material: 8.23 g, 93.5%.

$^1$H NMR (400 MHz, Chloroform-d) δ 7.99 (d, J=1.9 Hz, 2H), 7.74 (dt, J=1.8, 1.0 Hz, 1H), 3.81 (q, J=7.1 Hz, 2H), 3.35 (hept, J=6.1 Hz, 1H), 1.45 (t, J=7.1 Hz, 3H), 0.78 (d, J=6.1 Hz, 6H). $^{13}$C NMR (101 MHz, Chloroform-d) δ 153.43, 134.19-133.42 (m), 129.51 (q, J=31.9 Hz), 124.42 (q, J=272.4 Hz), 119.68 (hept, J=4.0 Hz), 66.83, 63.03, 25.48, 14.66. $^{19}$F NMR (376 MHz, Chloroform-d) 5-63.05. $^{11}$B NMR (160 MHz, Chloroform-d) δ 5.12.

Preparation of bis(3,5-bis(trifluoromethyl)phenyl)isopropoxy borane was performed as follows:

To a solution of lithium(diethyletherate) bis(3,5-bis(trifluoromethyl)phenyl)diisopropoxyborate (5.00 g, 7.86 mmol) in diethyl ether (100 mL) was added hydrogen chloride solution (5.5 mL, 2 M in ether, 11 mmol) with immediate formation of precipitate. The reaction mixture was stirred for one hour and the volatiles were removed under reduced pressure. The residue was extracted with hexane, filtered, and the volatiles were removed under reduced pressure to give the product as a colorless powder. Yield: 3.98 g, 102% (some residual solvent present).

$^1$H NMR (400 MHz, Chloroform-d) δ 8.00 (ddd, J=2.2, 1.4, 0.7 Hz, 2H), 7.98 (dq, J=1.9, 0.6 Hz, 4H), 4.54 (hept, J=6.1 Hz, 1H), 1.37 (d, J=6.1 Hz, 6H). $^{13}$C NMR (101 MHz, Chloroform-d) δ 138.42, 133.32, 131.36 (q, J=33.2 Hz), 124.39 (p, J=3.8 Hz), 123.39 (d, J=272.8 Hz), 71.74, 24.62. $^{19}$F NMR (376 MHz, Chloroform-d) δ −63.33. $^{11}$B NMR (160 MHz, Chloroform-d) δ 41.80.

Synthetic Procedures—Preparation of Catalysts

Catalyst Sample C1, tris(3,5-bis(trifluoromethyl)phenyl)borane THF adduct, was prepared as follows:

Preparation of lithium isopropoxytris(3,5-bis(trifluoromethyl)phenyl)borate

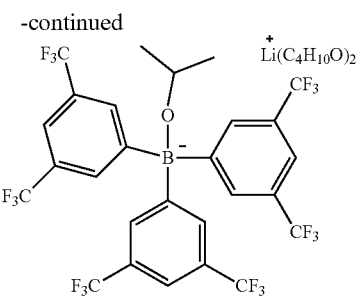

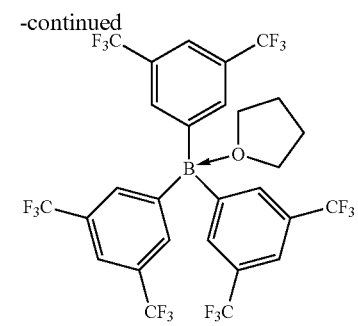

n-Butyllithium (5.00 mL, 2.5 M in hexanes, 12.7 mmol) was added slowly dropwise to a cold (−78° C., CO$_2$(s) bath) solution of 1-bromo-3,5-bis(trifluoromethyl)benzene (3.76 g, 12.8 mmol) in diethyl ether (150 mL). The reaction mixture was stirred for 1 hour at −78° C. Isopropoxy-bis(3,5-bis(trifluoromethyl)phenyl)borane (6.29 g, 12.7 mmol) in ether (10 mL) was added slowly. The reaction mixture was stirred overnight while warming to ambient temperature to give a clear very pale-yellow solution. The volatiles were removed under reduced pressure to give a crystalline solid. The solid was dissolved in a minimum of boiling ether and the solution was placed in the freezer. After cooling overnight, the supernatant was decanted from the crystals which had formed and the crystals were dried under reduced pressure to give 6.74 g. A second crop of crystalline material (1.54 g) was obtained from concentrating the supernatant solution and cooling in the freezer overnight. Total Yield: 8.28 g, 75.6%.

$^1$H NMR (400 MHz, Benzene-d$_6$) δ 8.09 (s, 6H), 7.74 (s, 3H), 3.71 (p, J=6.1 Hz, 1H), 2.97 (q, J=7.0 Hz, 10H), 0.70 (t, J=7.1 Hz, 15H), 0.67 (d, J=6.2 Hz, 6H). $^{13}$C NMR (101 MHz, Benzene-d$_6$) δ 157.09, 133.79, 130.75 (q, J=32.0 Hz), 124.71 (q, J=272.8 Hz), 119.91 (p, J=4.2 Hz), 65.91, 65.00, 25.47, 14.11. $^{19}$F NMR (376 MHz, Benzene-d$_6$) δ −62.76. $^{11}$B NMR (160 MHz, Benzene-d$_6$) δ 1.56.

Preparation of tris(3,5-bis(trifluoromethyl)phenyl)borane THF Adduct

To a solution of lithium isopropoxytris(3,5-bis(trifluoromethyl)phenyl)borate (6.700 g, 7.75 mmol) in ether (100 mL) was added chlorotrimethylsilane (2.0 mL, 1.71 g, 15.8 mmol). The reaction mixture was stirred over the weekend. The reaction mixture was filtered and the volatiles were removed under reduced pressure to give the product as a colorless solid, 4.80 g, 95.2%.

Part of the solid (4.041 g) was dissolved in ether (100 mL) and THF (5 mL) was added. The volatiles were removed from the reaction mixture under reduced pressure. The residue was extracted with benzene, filtered, and the volatiles were removed from the reaction mixture under reduced pressure to give the THF-adduct product as a colorless solid, 4.10 g, 91.3%.

THF adduct: $^1$H NMR (400 MHz, Benzene-d$_6$) δ 7.80-7.78 (m, 6H), 7.72 (dq, J=1.8, 0.9 Hz, 3H), 2.90-2.83 (m, 4H), 0.57-0.49 (m, 4H). $^{13}$C NMR (101 MHz, Benzene-d$_6$) δ 148.11, 133.40, 131.38 (q, J=32.5 Hz), 124.21 (q, J=272.8 Hz), 121.37 (p, J=4.1 Hz), 74.14, 23.94 (d, J=2.7 Hz). $^{19}$F NMR (376 MHz, Benzene-d$_6$) δ −62.95. $^{11}$B NMR (160 MHz, Benzene-d$_6$) δ 11.84.

Catalyst sample C2, bis(3,5-bis(trifluoromethyl)phenyl)(4-trifluoromethylphenyl)borane THF adduct, was prepared as follows.

Preparation of bis(3,5-bis(trifluoromethyl)phenyl)(4-trifluoromethylphenyl)borane

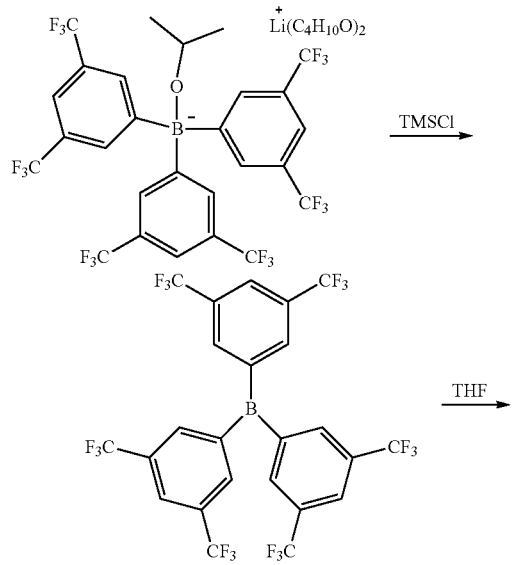

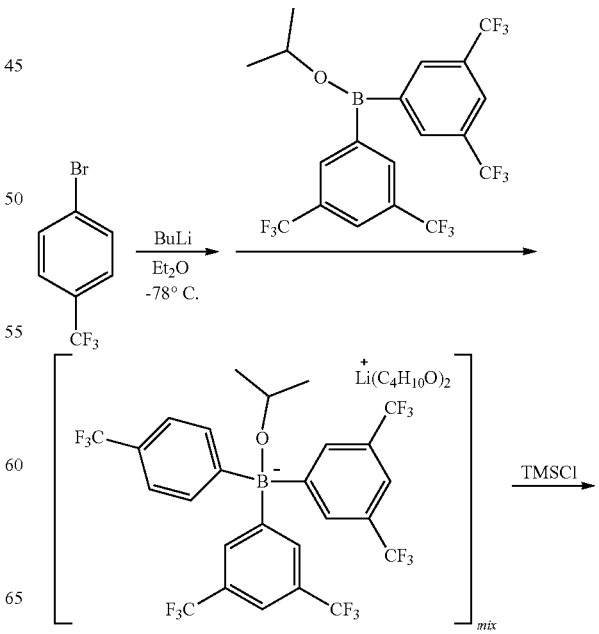

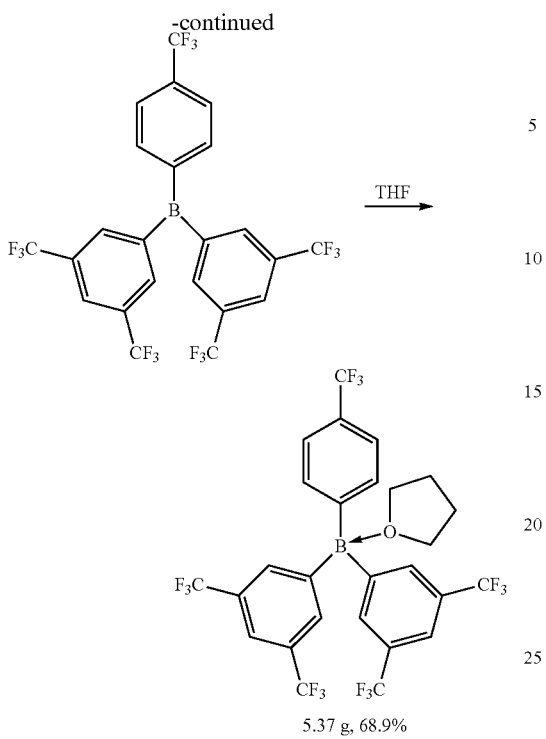

5.37 g, 68.9% n-Butyllithium (4.70 mL, 2.535 M in hexanes, 11.9 mmol) was added slowly dropwise to a cold (−78° C., CO$_2$(s)/acetone bath) solution of 1-bromo-4-trifluoromethylbenzene (2.750 g, 12.22 mmol) in diethyl ether (200 mL). The reaction mixture was stirred for 3 hours at −78° C. Isopropoxybis(3,5-bis(trifluoromethyl)phenyl)borane (5.910 g, 11.91 mmol) in diethyl ether (15 mL) was added slowly. The reaction mixture was allowed to warm to ambient temperature while stirring overnight to give a clear yellow solution with a trace of precipitate. The solvent was removed under reduced pressure to give a thick yellow oil. The oil was stirred at a rapid rate with hexane (100 mL) overnight (some cloudiness develops). The hexane layer was decanted off, filtered, and the volatiles were removed under reduced pressure. The oil layer was extracted again with hexane and the process was repeated several times. A small amount of oil that hadn't dissolved was discarded. The volatiles were removed under reduced pressure from the filtrate to give a yellow oil. The oil was dissolved in diethyl ether (100 mL) and trimethylsilylchloride (TMSCl, 1.5 g, 13.8 mmol) was added. Within 30 minutes copious precipitate had formed. The reaction mixture was allowed to stir overnight. The reaction mixture was filtered and the volatiles were removed under reduced pressure to give a pasty beige sludge. NMR spectra showed nearly complete reaction. The product was dissolved in ether and more TMSCl was added (0.4 mL). After stirring for several hours, the volatiles were removed under reduced pressure. The residue was extracted with benzene, filtered, and the volatiles were removed under reduced pressure to give a pasty solid. $^1$H NMR spectroscopy still showed some isopropyl groups and some ether. The residue was dissolved in ether, a small amount of TMSCl (0.2 mL) was added, and the reaction mixture was stirred for several hours. Several milliliters of THF were added and the volatiles were removed under reduced pressure. The product was extracted with benzene, filtered, and the volatiles were removed under reduced pressure to give the product as a white solid (5.370 g, 68.90%).

NMR spectra of the borane-THF complex: $^1$H NMR (400 MHz, Benzene-d$_6$) δ 7.83 (s, 4H), 7.78 (tq, J=1.7, 0.8 Hz, 2H), 7.41 (dq, J=7.4, 0.8 Hz, 2H), 7.07 (dq, J=7.5, 0.9 Hz, 2H), 3.04-2.96 (m, 4H), 0.70-0.62 (m, 4H). $^{13}$C NMR (126 MHz, Benzene-d$_6$) δ 149.08, 148.88, 134.18, 133.62 (d, J=3.8 Hz), 131.11 (q, J=32.4 Hz), 129.94 (q, J=32.1 Hz), 125.06 (d, J=272.1 Hz), 124.92 (q, J=3.8 Hz), 124.34 (q, J=272.7 Hz), 121.22 (dt, J=8.0, 4.0 Hz), 73.53, 24.10. $^{19}$F NMR (376 MHz, Benzene-d$_6$) δ −62.56 (s, 3F), −62.78 (s, 12F). 11B NMR (160 MHz, Benzene-d$_6$) δ 18.54.

Catalyst sample C3, bis(3,5-bis(trifluoromethyl)phenyl) (2,4,6-trifluorophenyl)borane THF adduct, was prepared as follows:

Preparation of lithium bis(diethyletherate) bis(3,5-bis(trifluoromethyl)phenyl)(2,4,6-trifluorophenyl)-isopropoxyborate

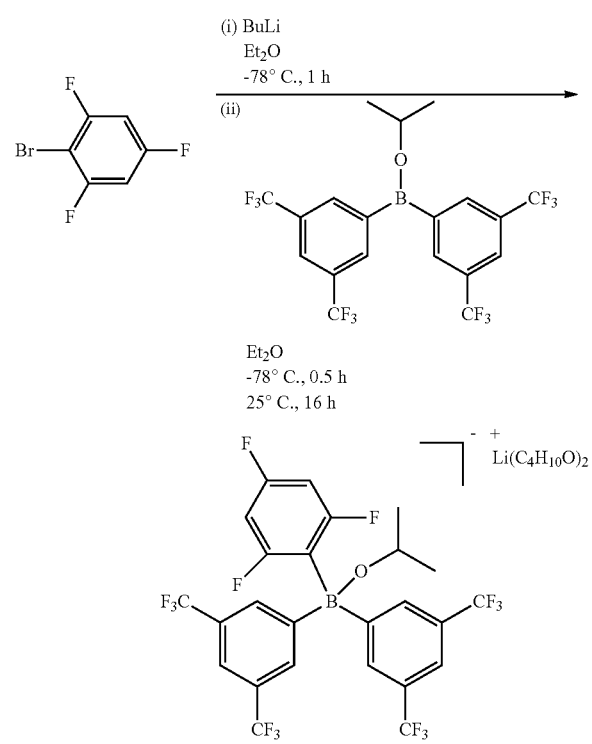

In a N$_2$-purged glove box, 2.06 g (9.78 mmol) of 1-bromo-2,4,6-trifluorobenzene was combined with 80 mL of diethyl ether in a 250-mL Schlenk flask. A Teflon-coated stir bar was added to the colorless solution and the flask was sealed with a rubber septum before being removed from the glove box. In a fume hood, the flask was connected to a nitrogen line and placed in a dry ice/acetone bath (−78° C.) for 20 minutes to chill. A 2.5 M solution of n-butyllithium in hexane (4.3 mL, 10.8 mmol) was added via syringe to the cold solution. The reaction mixture was stirred at −78° C. for 1 hour. A solution of 4.85 g of bis(3,5-bis(trifluoromethyl) phenyl)isopropoxyborane in 20 mL of diethyl ether was prepared in the glove box and drawn up into a syringe. The solution was injected into the flask containing the cold aryllithium solution at −78° C. and the mixture was stirred for half an hour at this temperature. The dry ice/acetone bath was removed and the reaction mixture was allowed to slowly warm to room temperature while stirring overnight. Then next morning, all volatiles were removed under vacuum to yield a sticky yellow solid. The flask was returned to the glove box and the sticky yellow material was extracted with 1) 80 mL of pentane, 2) 80 mL of hexanes, and 3) 60 mL of a 50/50 ether/hexanes mixture. All three solutions were placed in the glove box freezer overnight (−40° C.) and white crystalline material precipitated from solution. The crystalline material was collected by filtration, washed with cold pentane (−40° C.), and dried under vacuum for 1 hour. Total yield: 5.29 g (impure, approx. 5.5 mmol of desired lithium salt, 56%). It should be noted that pure material was not obtained; the lithium salt was contaminated with the isopropoxyborane starting material (12%-22% contaminated, depending on the batch of solid material collected). It was decided to proceed to the next step in the reaction without any further purification of the isolated material.

$^1$H NMR (400 MHz, Benzene-$d_6$) δ 8.26 (s, 4H, ortho-ArCH), 7.80 (s, 2H, para-ArCH), 6.22-6.07 (m, 2H, ortho-ArCH), 3.68 (hept, J=5.8 Hz, 1H, CH(CH$_3$)$_2$), 3.07 (q, J=7.1 Hz, 8H, OCH$_2$), 0.81 (t, J=7.1 Hz, 12H, OCH$_2$CH$_3$), 0.67 (d, J=6.2 Hz, 6H, CH(CH$_3$)$_2$). $^{13}$C NMR (101 MHz, Benzene-$d_6$) δ 166.2 (ddd, J=231.3, 22.4, 14.0 Hz, ArC), 162.3 (dt, J=247.1, 20.2 Hz, ArC), 159.5 (br s, ArC), 157.3 (br s, ArC), 133.8 (s, ortho-ArCH), 130.7 (q, J=31.9 Hz, ArC—CF$_3$), 125.5 (q, J=272.4 Hz, CF$_3$), 119.9 (p, J=4.0 Hz, para-ArCH), 101.0 (ddd, J=36.6, 24.0, 3.7 Hz, meta-ArCH), 65.9 (s, OCH(CH$_3$)$_2$), 65.8 (s, OCH$_2$CH$_3$), 25.7 (s, OCH(CH$_3$)$_2$), 14.7 (s, OCH$_2$CH$_3$). $^{19}$F NMR (376 MHz, Benzene-$d_6$) δ−62.7 (s, 12F, CF$_3$), −104.4 (br s, 2F, ortho-ArF), −112.3 (m, 1F, para-ArF).

Preparation of bis(3,5-bis(trifluoromethyl)phenyl)(2,4,6-trifluoroborane

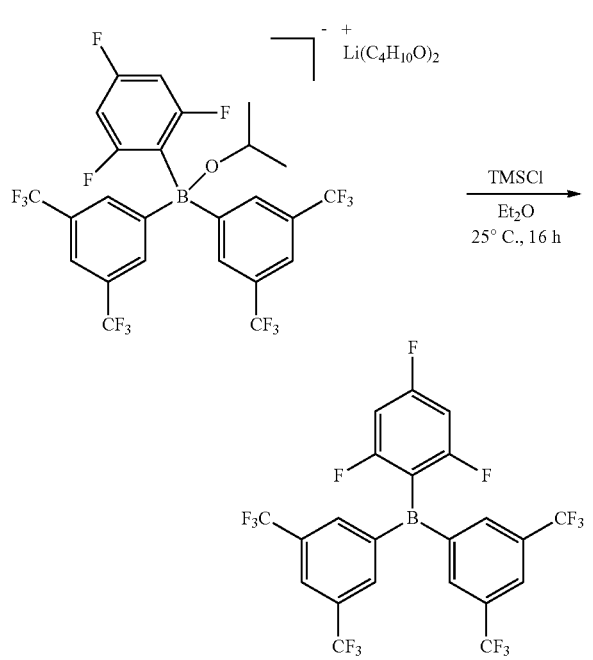

In a N$_2$-purged glove box, 3.30 g (78% pure, 3.29 mmol) of the lithium borate salt was dissolved in 60 mL of diethyl ether to form a colorless solution (note: the lithium borane salt was contaminated with 22% bis(3,5-bis(trifluoromethyl)phenyl)isopropoxyborane). Trimethylsilylchloride (1.0 mL, 7.9 mmol) was added with stirring to the solution at room temperature. There was no immediate sign of a reaction. The mixture was allowed to stir overnight at room temperature. The next morning, a copious amount of LiCl precipitate had formed in the flask. An aliquot of the reaction mixture was removed and analyzed by $^{19}$F NMR spectroscopy to confirm that the reaction had gone to completion. The reaction mixture was filtered through Celite to remove LiCl and the filtrate was pumped down to dryness. The resultant sticky white solid was extracted with 80-90 mL of hexanes and filtered again. The hexanes solution was placed in the glove box freezer overnight (−40° C.), during which time a white microcrystalline solid precipitated. The solid was collected by filtration, washed with 5-10 mL of cold pentane (−40° C.), and dried under vacuum for 1 hour. Multinuclear NMR spectroscopy confirmed formation of the desired material in pure form. Yield: 0.992 g, 1.75 mmol, 53.2%.

$^1$H NMR (400 MHz, Benzene-$d_6$) δ 7.88 (s, 6H, ArCH on CF$_3$-substituted ring), 6.03 (m, 2H, ArCH on 2,4,6-trifluorophenyl ring). $^{13}$C NMR (101 MHz, Benzene-$d_6$) δ 167.4 (dt, J=257.6, 16.2 Hz, para-ArCF), 166.2 (dt, J=253.5, 15.2 Hz, ortho-ArCF), 142.8 (br s, ArC), 137.5 (d, J=3.0 Hz, ortho-ArCH), 132.1 (q, J=33.4 Hz, ArC—CF$_3$), 126.9 (pent, J=4.0 Hz, para-ArCH), 124.1 (q, J=273.0 Hz, CF$_3$), 112.6 (br s, ArC), 101.6 (ddd, J=29.0, 24.9, 3.7 Hz, meta-ArCH). $^{19}$F NMR (376 MHz, Benzene-$d_6$) δ−63.1 (s, 12F, CF$_3$), −92.4 (m, 2F, ortho-ArCF), −98.5 (s, 1F, para-ArCF). 11B NMR (160 MHz, Benzene-$d_6$) δ 62.9 (broad s).

Preparation of THF adduct of bis(3,5-bis(trifluoromethyl)phenyl)(2,4,6-trifluoroborane

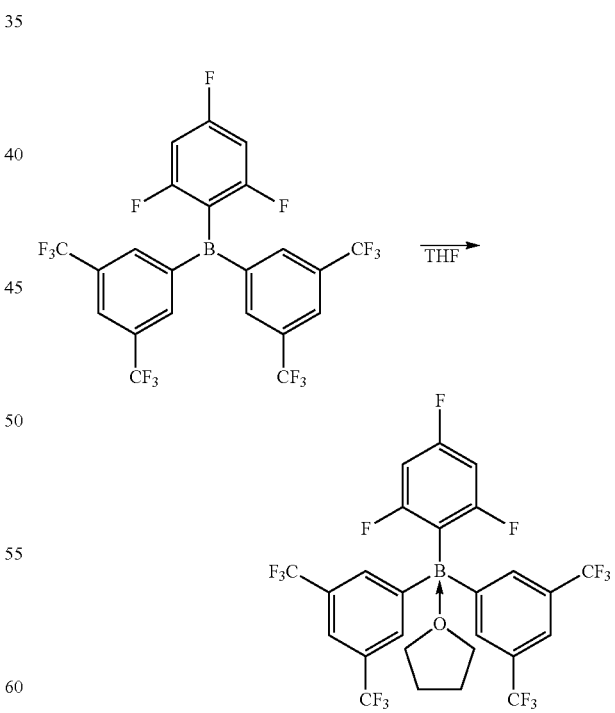

In a N$_2$-purged glove box, 0.992 g (1.75 mmol) of bis(3,5-bis(trifluoromethyl)phenyl)(2,4,6-trifluorophenyl)borane was weighed into a 110-mL glass jar and dissolved in 50 mL of THF. The THF was removed under vacuum with stirring to yield a white solid. The solid was triturated with 40 mL of pentane to help remove any uncoordinated THF. The white solid was characterized by multinuclear NMR spectroscopy as the mono-THF adduct of bis(3,5-bis(trifluoromethyl)phenyl)(2,4,6-trifluoro-phenyl)borane. Yield: 0.969 g, 1.51 mmol, 86.3%.

$^1$H NMR (400 MHz, Benzene-$d_6$) δ 7.96 (s, 4H, ortho-ArCH), 7.79 (s, 2H, para-ArCH), 6.16 (t, J=8.0 Hz, 2H, meta-ArCH), 3.10 (m, 4H, OCH$_2$), 0.79 (m, 4H, CH$_2$). $^{13}$C NMR (101 MHz, Benzene-$d_6$) δ 165.3 (ddd, J=245.4, 17.7, 14.3 Hz, ortho-ArCF), 163.9 (dd, J=249.5, 16.2 Hz, para-ArCF), 148.4 (br s, ArC), 134.0 (s, ortho-ArCH), 131.4 (q, J=32.4 Hz, ArC—CF$_3$), 121.8 (m, para-ArCH), 124.8 (q, J=272.7 Hz, CF$_3$), 101.3 (ddd, J=32.8, 24.2, 3.2 Hz, meta-ArCH), 72.6 (s, OCH$_2$), 24.8 (s, CH$_2$). $^{19}$F NMR (376 MHz, Benzene-$d_6$) δ−62.8 (s, 12F, CF$_3$), −96.9 (s, 2F, ortho-ArCF), −108.5 (s, 1F, para-ArCF). 11B NMR (160 MHz, Benzene-$d_6$) δ 13.2 (broad s).

Catalyst sample C4, bis(3,5-bis(trifluoromethyl)phenyl)(2,6-difluorophenyl) THF adduct, was prepared as follows:

Preparation of lithium bis(diethyletherate) bis(3,5-bis(trifluoromethyl)phenyl)(2,6-difluorophenyl)-isopropoxy borate

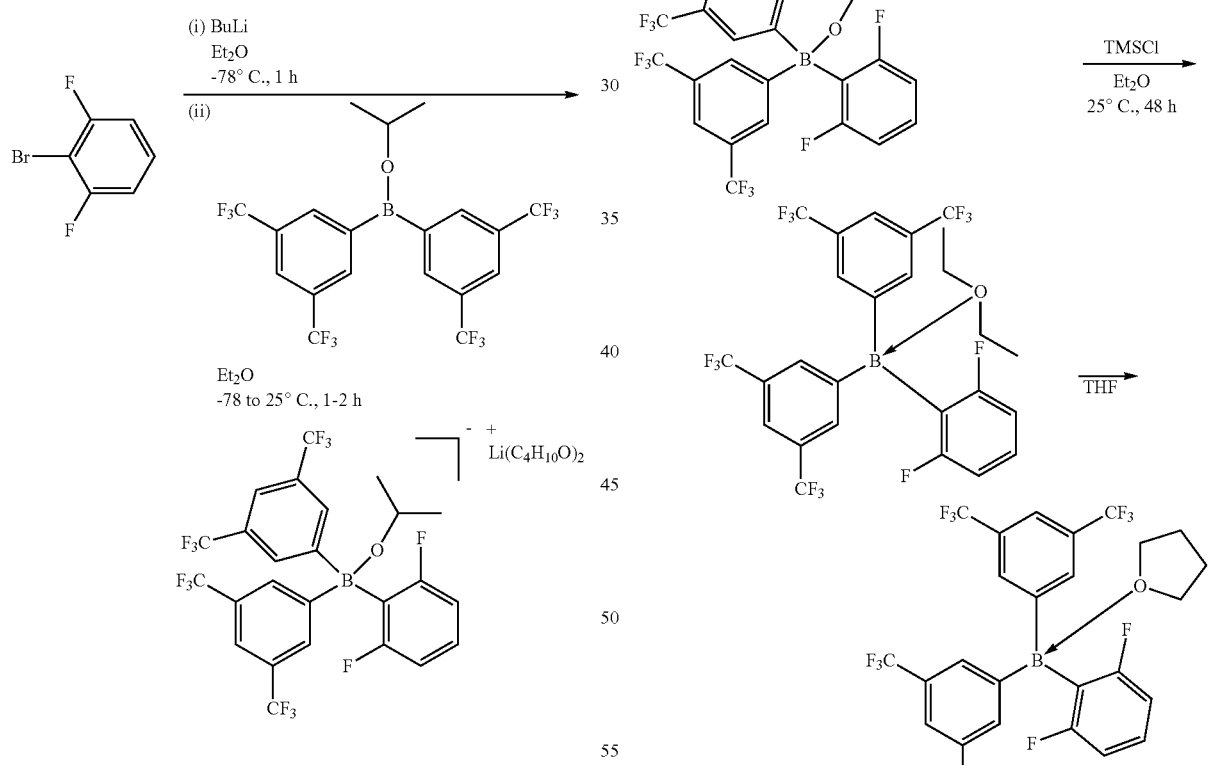

n-Butyllithium (3.00 mL, 2.48 M in hexanes, 7.44 mmol) was added slowly dropwise to a cold (−78° C., CO$_2$(s) bath) solution of 1-bromo-2,6-difluorobenzene (1.46 g, 7.56 mmol) in diethyl ether (100 mL). The reaction mixture was stirred for 1 hour at −78° C. and then a solution of bis(3,5-bis(trifluoromethyl)phenyl)isopropoxyborane (3.69 g, 7.44 mmol) in ether (10 mL) was added slowly. Precipitate formed while the reaction mixture was allowed to warm to ambient temperature. By the time the reaction mixture had reached room temperature, the precipitate had dissolved to give a clear solution which was stirred for several hours. The solution was filtered and the volatiles were removed under reduced pressure to give a crystalline-appearing solid. The solid was dissolved in a minimum of boiling ether and the solution was placed in the glove box freezer (−33° C.). After cooling overnight, the supernatant was decanted from the crystals which had formed. The crystals were dried under reduced pressure. Yield: 6.85 g, 88.4%.

$^1$H NMR (400 MHz, Benzene-$d_6$) δ 8.31 (s, 4H), 7.77 (tt, J=2.0, 0.9 Hz, 2H), 6.60 (dq, J=8.8, 7.5 Hz, 1H), 6.47-6.41 (m, 2H), 3.71 (hept, J=6.2 Hz, 1H), 3.05 (qd, J=7.1, 0.7 Hz, 8H), 0.82 (td, J=7.1, 0.6 Hz, 12H), 0.68 (d, J=6.2 Hz, 6H). $^{13}$C NMR (126 MHz, Benzene-$d_6$) δ 164.45 (dd, J=249.6, 11.3 Hz), 142.11, 137.21, 136.78 (t, J=3.8 Hz), 135.51 (t, J=10.8 Hz), 131.28 (q, J=33.3 Hz), 126.10 (p, J=3.8 Hz), 123.30 (q, J=273.1 Hz), 111.72-111.40 (m), 73.82, 65.57, 15.11, 2.57. $^{19}$F NMR (376 MHz, Benzene-$d_6$) δ−62.64, −106.66. $^{11}$B NMR (160 MHz, Benzene-$d_6$) δ 0.68 (s).

Preparation of THF adduct of bis(3,5-bis(trifluoromethyl)phenyl)(2,6-difluorophenyl)borane Lithium bis(diethyletherate) bis(3,5-bis(trifluoromethyl)phenyl)(2,6-difluorophenyl)isopropoxyborate (5.85 g, 10.6 mmol) was dissolved in ether (150 mL) and chlorotrimethylsilane (3.00 mL, 23.6 mmol) was added to the solution at ambient temperature. Precipitate began to form within 15 minutes. The reaction mixture was allowed to stir over the weekend. By Monday, the volatiles had evaporated away (non-sealed container). The colorless solid was extracted with ether and filtered. The volatiles were removed under reduced pressure to give the product as a colorless solid, 4.98 g. NMR spectra showed clean borane, but with only about 86% of the required ether for a mono etherate complex. The product was dissolved in ether to give a hazy solution. THF (6 mL) was added and the solution became crystal clear. The volatiles were removed under reduced pressure to give a glassy solid. The residue was extracted with benzene, filtered, and the volatiles were removed under reduced pressure to give a white solid. Yield: 4.63 g, 69.9%.

$^1$H NMR (400 MHz, Benzene-d$_6$) δ 8.02 (d, J=1.8 Hz, 2H), 7.77 (dq, J=1.9, 0.9 Hz, 1H), 6.71-6.60 (m, OH), 6.48 (t, J=8.4 Hz, 1H), 3.17-3.09 (m, 2H), 0.77-0.68 (m, 2H). $^{13}$C NMR (101 MHz, Benzene-d$_6$) δ 164.82 (dd, J=243.3, 14.1 Hz), 147.95, 133.82, 133.30, 130.91 (d, J=32.4 Hz), 124.41 (q, J=272.8 Hz), 121.40 (q, J=3.9 Hz), 112.57-111.60 (m), 73.58, 24.03 (d, J=3.3 Hz). $^{19}$F NMR (376 MHz, Benzene-d$_6$) δ −62.80, −99.69 (t, J=7.5 Hz). $^{11}$B NMR (160 MHz, Benzene-d$_6$) δ 12.2 (s).

Catalyst Sample C5, bis(3,5-bis(trifluoromethyl)phenyl) (2,5-bis(trifluoromethyl)phenyl)borane, was prepared as follows:

Preparation of lithium isopropoxy bis(3,5-bis(trifluoromethyl)phenyl)(2,5-bis(trifluoromethyl)phenyl) borate

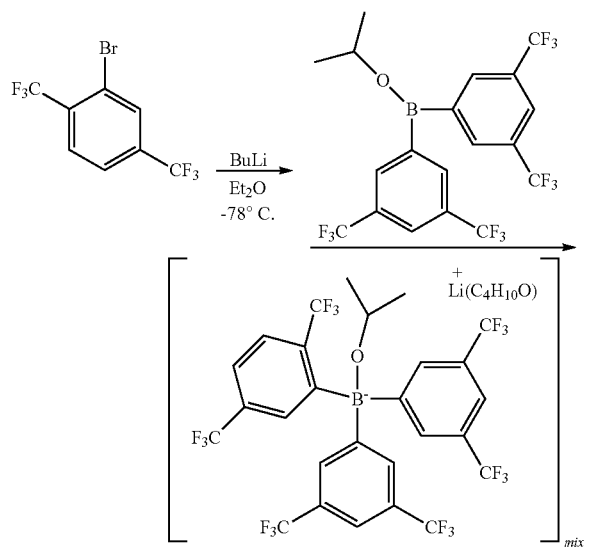

n-Butyllithium (4.00 mL, 2.535 M in hexanes, 10.14 mmol) was added slowly to a cold (−78° C., CO$_2$(s) bath) solution of 1-bromo-2,5-bis(trifluoromethyl)benzene (3.00 g, 10.24 mmol) in diethyl ether (200 mL). The reaction mixture was stirred for 1 hour at −78° C. Isopropoxy-bis(3, 5-bis(trifluoromethyl)phenyl)borane (5.036 g, 10.15 mmol) in ether (18 mL) was added slowly. The reaction mixture was stirred for several hours at −78° C. The solution was warmed to ambient temperature while stirring overnight to give a pale-yellow clear solution. The volatiles were removed from the reaction mixture to give a yellow oil. The oil was extracted with benzene. There was nothing insoluble. The volatiles were removed from the reaction mixture to give a yellow oil. The yield was 7.88 g, 98.3%.

$^1$H NMR (400 MHz, Benzene-d$_6$) δ 8.06 (s, 1H), 8.00 (s, 4H), 7.70 (dt, J=1.8, 0.9 Hz, 2H), 7.40 (d, J=8.3 Hz, 1H), 7.19 (d, J=8.4 Hz, 1H), 3.79 (hept, J=6.1 Hz, 1H), 2.78 (q, J=7.1 Hz, 4H), 0.73 (d, J=6.1 Hz, 6H), 0.54 (t, J=7.1 Hz, 6H). $^{13}$C NMR (101 MHz, Benzene-d$_6$) δ 158.31, 153.97, 135.44 (q, J=3.7 Hz), 135.23, 133.55 (t, J=4.1 Hz), 133.25, 133.18, 132.37 (d, J=97.8 Hz), 130.92 (q, J=32.0 Hz), 127.80 (q, J=273.9 Hz), 124.92 (q, J=272.5 Hz), 124.66 (q, J=272.8 Hz), 123.86 (q, J=3.8 Hz), 119.86 (p, J=3.9 Hz), 66.24, 66.17, 25.60, 13.94. $^{19}$F NMR (376 MHz, Benzene-d$_6$) δ −55.30−−55.51 (m), −62.82, −63.61. $^{11}$B NMR (160 MHz, Benzene-d$_6$) δ 2.16.

Preparation of bis(3,5-bis(trifluoromethyl)phenyl)(2, 5-bis(trifluoromethyl)phenyl)borane

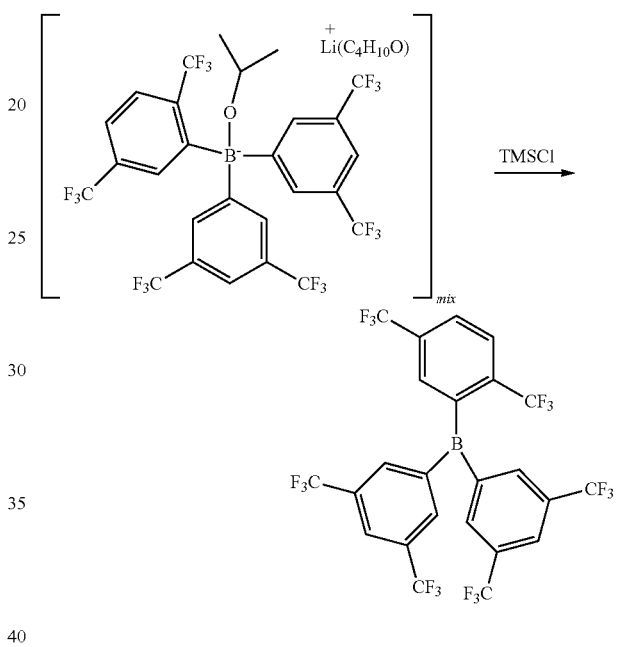

Lithium(diethyletherate) isopropoxy-bis(3,5-bis(trifluoromethyl)phenyl)(2,5-bis(trifluoromethyl)phenyl)-borate (7.88 g, 9.97 mmol) was dissolved in ether (150 mL). Chlorotrimethylsilane (2.6 mL, 20.5 mmol) was added. The reaction mixture was allowed to stir overnight to give a yellow solution with colorless precipitate. The volatiles were removed under reduced pressure. The residue was extracted with hexane (100 ml). The mixture was filtered and the volatiles were concentrated under reduced pressure. The solution was cooled in the freezer (−33° C.) overnight. The reaction mixture was filtered and the precipitate was dried under reduced pressure to give a white powder. Yield: 6.0182 g, 92.84%.

THF-free compound: $^1$H NMR (400 MHz, Benzene-d$_6$) δ 7.87 (s, 2H), 7.85 (s, 4H), 7.29 (s, 1H), 7.11 (d, J=1.2 Hz, 2H). $^{13}$C NMR (126 MHz, Benzene-d$_6$) δ 140.87, 140.75, 137.49 (d, J=3.8 Hz), 135.11 (q, J=31.7 Hz), 133.26 (q, J=33.0 Hz), 132.03 (q, J=33.6 Hz), 128.29, 127.34 (q, J=3.8 Hz), 127.11 (q, J=4.0 Hz), 127.01 (q, J=4.0 Hz), 124.46 (q, J=274.3 Hz), 123.70 (q, J=273.2 Hz), 123.49 (q, J=272.9 Hz). $^{19}$F NMR (376 MHz, Benzene-d$_6$) δ−56.98, −63.43, −63.47. $^{11}$B NMR (160 MHz, Benzene-d$_6$) δ 64.37.

Catalyst Sample C6, (3,5-bis(trifluoromethyl)phenyl)bis (2,5-bis(trifluoromethyl)phenyl)borane, was prepared as follows:

Preparation of lithium diisopropoxy (3,5-bis(trifluoromethyl)phenyl)(2,5-bis(trifluoromethyl)phenyl)borate

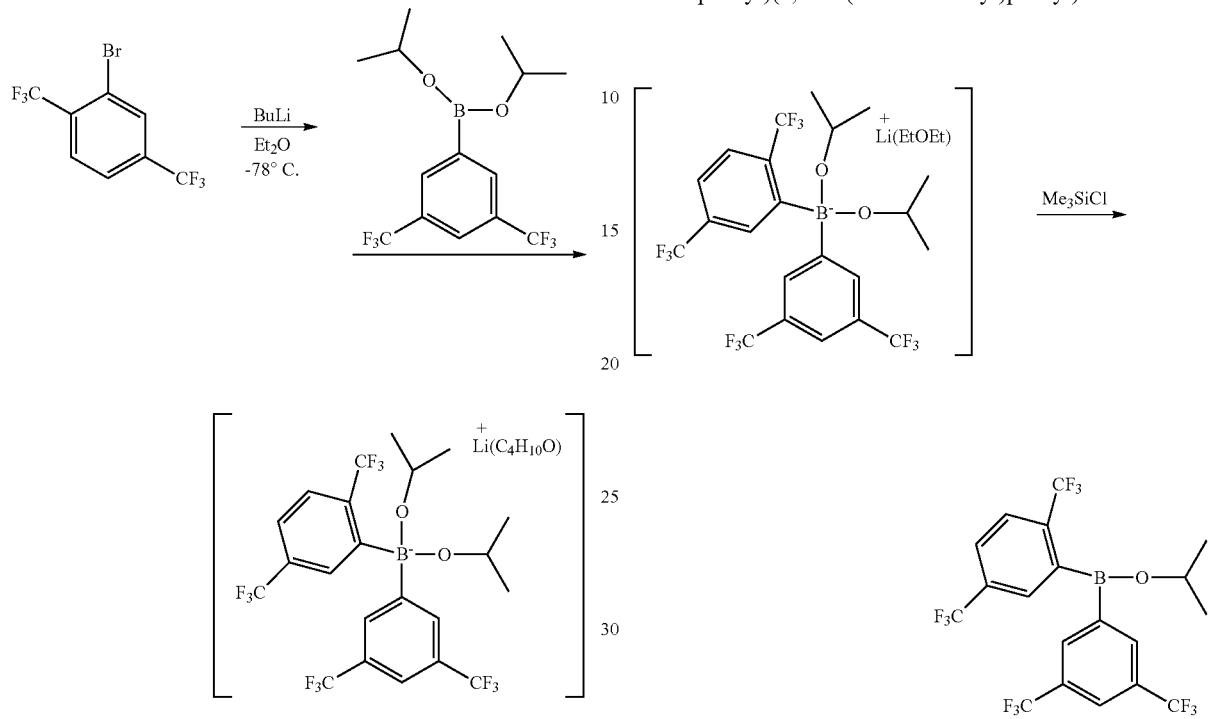

To a cold (between −101° C. and −99° C., CO$_2$(s), then N$_2$(0) methanol bath) solution of 1-bromo-2,5-bis(trifluoromethyl)benzene (3.000 g, 10.24 mmol) in diethyl ether (150 mL) was added n-butyllithium (4.00 mL, 2.535 M in hexanes, 10.14 mmol) with stirring. The reaction mixture was stirred for 2 hours at around −100° C. then was allowed to warm up to −78° C. Bis(isopropoxy)(3,5-bis(trifluoromethyl)phenyl)borane (3.510 g, 10.26 mmol) in ether (10 mL) was added slowly. The reaction mixture was allowed to warm to ambient temperature while stirring overnight. The volatiles were removed from the pale-yellow nearly clear solution under reduced pressure to give a crystalline-appearing solid. The solid was dissolved in ether (10 mL) and placed in the freezer. Nothing precipitated. The ether was evaporated and the yellow solid was dissolved in hexane, filtered, and concentrated under a nitrogen stream to give crystalline solid. The supernatant was removed and the solid was dried under reduced pressure. Yield of colorless crystals from the first crop: 3.318 g. NMR analysis of the crystals showed pure desired compound. The supernatant was placed in the freezer overnight. Crystalline matter formed. The supernatant was pipetted out and discarded. The crystalline residue was dried under reduced pressure: 2.017 g. Total yield: 5.335 g, 82.79%.

$^1$H NMR (400 MHz, Benzene-d$_6$) δ 8.39 (s, 2H), 8.26 (s, 1H), 7.90 (dq, J=1.8, 0.9 Hz, 1H), 7.56 (d, J=8.2 Hz, 1H), 7.27 (ddt, J=7.9, 1.7, 0.8 Hz, 1H), 3.18 (hept, J=6.0 Hz, 2H), 2.92 (q, J=7.1 Hz, 4H), 0.89 (t, J=7.1 Hz, 6H), 0.78 (d, J=6.1 Hz, 6H), 0.68 (d, J=6.0 Hz, 6H). $^{13}$C NMR (101 MHz, Benzene-d$_6$) δ 153.10, 136.65 (q, J=29.6 Hz), 134.81 (dd, J=2.7 Hz, 1.9 Hz), 133.93 (q, J=3.6 Hz), 131.93 (q, J=31.6 Hz), 131.35, 129.76 (q, J=31.9 Hz), 127.26 (q, J=274.6 Hz), 125.17 (q, J=272.4 Hz), 124.89 (q, J=272.8 Hz), 123.25 (q, J=3.9 Hz), 119.89 (p, J=3.9 Hz), 66.42, 64.08, 25.49, 24.57, 14.36. $^{19}$F NMR (376 MHz, Benzene-d$_6$) δ −55.79, −62.66, −63.30. $^{11}$B NMR (160 MHz, Benzene-d$_6$) δ 5.32.

Preparation of isopropoxy (3,5-bis(trifluoromethyl)phenyl)(2,5-bis(trifluoromethyl)phenyl)borane

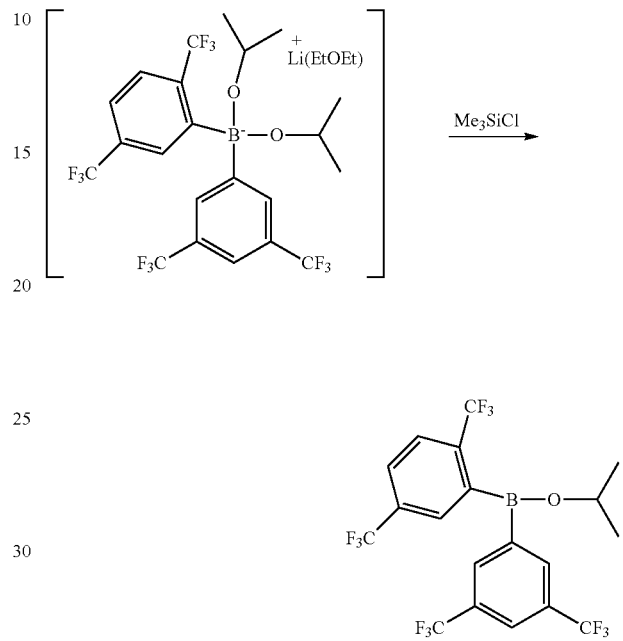

To a solution of lithium(diethyletherate) diisopropoxy-(3,5-bis(trifluoromethyl)phenyl)(2,5-bis(trifluoromethyl)phenyl)borate (3.318 g, 5.21 mmol) in ether (10 mL) was added chlorotrimethylsilane (2.0 mL) with rapid formation of precipitate. The reaction mixture was allowed to stir overnight. The reaction mixture was filtered and the volatiles were removed under reduced pressure. NMR analysis showed the reaction was complete. Some putative TMS-O-iPr ether was present, too. The second crop of lithium diisopropoxy (3,5-bis(trifluoromethyl)phenyl)(2,5-bis(trifluoromethyl)phenyl)borate prepared as described above was treated similarly (2.017 g, 3.17 mmol, of lithium salt; 2.0 mL of TMSCl) and stirred for 3 hours. The total amount of combined reagents: 5.335 g, 8.39 mmol; TMSCl: 4.0 mL, 31.6 mmol. The second reaction mixture was filtered and combined with the first reaction product. The volatiles were removed under reduced pressure. The residue was extracted with hexane, filtered, and the volatiles were removed overnight at 40° C. under reduced pressure to give the product as a yellow oil, 3.4703 g, 83.42%.

$^1$H NMR (400 MHz, Benzene-d$_6$) δ 8.05 (d, J=1.8 Hz, 2H), 7.80 (d, J=2.3 Hz, 1H), 7.34 (d, J=1.9 Hz, 1H), 7.12 (d, J=6.5 Hz, 1H), 7.10 (d, J=6.7 Hz, 1H), 3.78 (hept, J=6.1 Hz, 1H), 0.85 (d, J=6.1 Hz, 6H). $^{13}$C NMR (101 MHz, Benzene-d$_6$) δ 139.07, 136.28, 135.37 (q, J=31.8 Hz), 134.93 (d, J=3.9 Hz), 133.49 (q, J=32.7 Hz), 131.50 (q, J=33.0 Hz), 127.87, 126.95 (dq, J=7.5, 3.7 Hz), 126.46 (q, J=3.7 Hz), 125.41 (hex, J=3.8 Hz), 124.57 (q, J=273.9 Hz), 123.98 (q, J=272.8 Hz), 123.90 (q, J=273.0 Hz), 72.49, 23.71. $^{19}$F NMR (376 MHz, Benzene-d$_6$) δ−60.31, −63.27 (d, J=3.3 Hz), −63.47 (d, J=3.3 Hz). $^{11}$B NMR (160 MHz, Benzene-d$_6$) δ 41.28.

Preparation of lithium isopropoxy bis(2,5-bis(trifluoromethyl)phenyl)(3,5-bis(trifluoromethyl)phenyl)borate

Preparation of bis(2,5-bis(trifluoromethyl)phenyl)(3,5-bis(trifluoromethyl)phenyl)borane

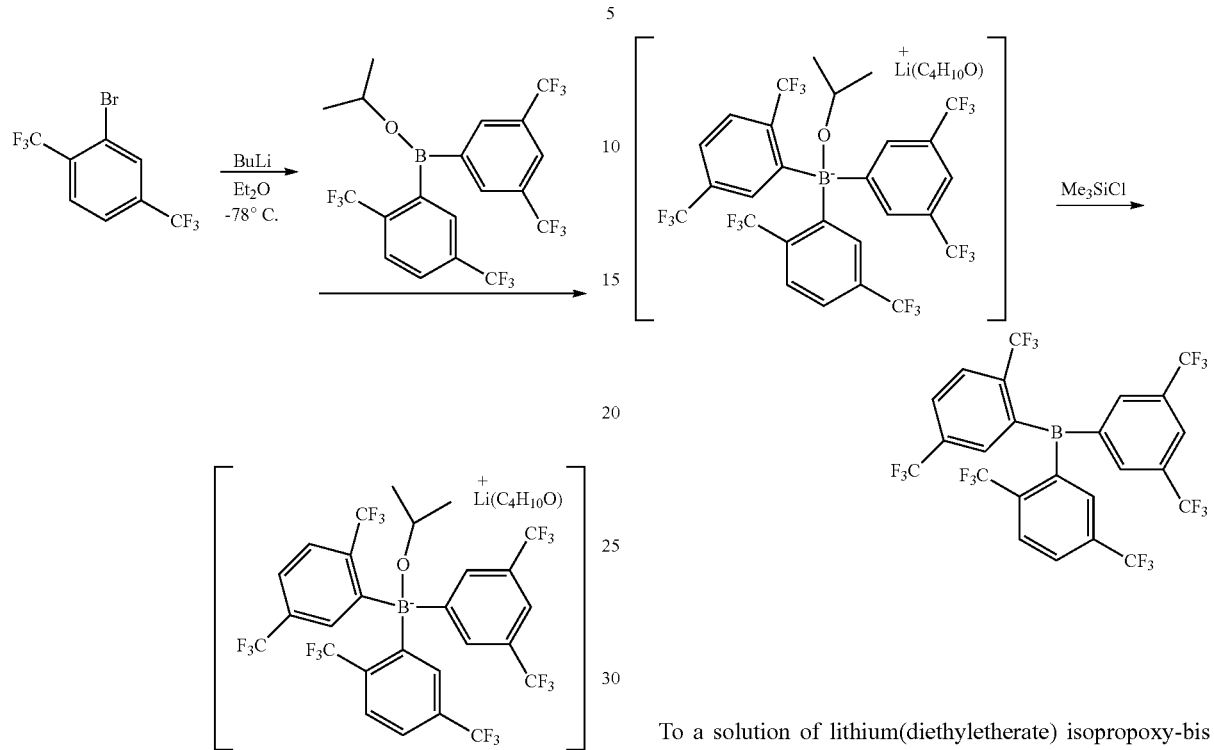

n-Butyllithium (2.40 mL, 2.535 M in hexanes, 6.08 mmol) was added slowly to a cold (−78° C., CO$_2$(s) bath) solution of 1-bromo-2,5-bis(trifluoromethyl)benzene (1.800 g, 6.14 mmol) in diethyl ether (150 mL). The reaction mixture was stirred for 1 hour at −78° C. Isopropoxy(2,5-bis(trifluoromethyl)phenyl)(3,5-bis(trifluoromethyl)phenyl)borane (3.022 g, 6.09 mmol) in ether (18 mL) was added slowly. The reaction mixture was stirred for several hours at −78° C. The solution was allowed to warm to ambient temperature while stirring overnight to give a pale-yellow clear solution. The volatiles were removed from the reaction mixture to give a yellow oil. The oil was extracted with benzene. There was nothing insoluble. The volatiles were removed from the reaction mixture to give a yellow oil. The yield was 4.21 g, 87.6%. 1H NMR (400 MHz, Benzene-d$_6$) δ 8.30 (s, 2H), 8.12 (s, 2H), 7.65 (dt, J=1.7, 0.9 Hz, 1H), 7.27 (d, J=8.2 Hz, 2H), 7.08 (d, J=8.2 Hz, 2H), 3.87 (hept, J=6.2 Hz, 1H), 2.91 (q, J=7.1 Hz, 4H), 0.65 (d, J=6.2 Hz, 6H), 0.63 (t, J=7.1 Hz, 6H). $^{13}$C NMR (101 MHz, Benzene-d$_6$) δ 157.17, 156.73, 134.42, 133.88 (q, J=3.6 Hz), 133.04 (d, J=28.4 Hz), 132.88 (q, J=32.1 Hz), 129.95 (q, J=31.9 Hz), 127.74 (q, J=273.6 Hz), 127.33 (q, J=6.9 Hz), 124.97 (q, J=272.4 Hz), 124.50 (q, J=273.0 Hz), 122.72 (q, J=3.8 Hz), 118.78 (p, J=4.1 Hz), 65.88, 65.34, 25.11, 13.91. $^{19}$F NMR (376 MHz, Benzene-d$_6$) δ−56.31, −62.89, −63.76. $^{11}$B NMR (160 MHz, Benzene-d$_6$) δ 2.98.

To a solution of lithium(diethyletherate) isopropoxy-bis(2,5-bis(trifluoromethyl)phenyl)(3,5-bis(trifluoromethyl)phenyl)borate (3.915 g, 4.95 mmol) in diethyl ether (150 mL) was added chlorotrimethylsilane (1.10 mL, 10.1 mmol) with stirring. Within 15 minutes, precipitate formed in solution. The reaction mixture was stirred overnight. The mixture was filtered and the volatiles were removed under reduced pressure to give a colorless solid, 3.260 g. The product was extracted with hexane, filtered, and the volatiles were removed under reduced pressure to give the product as a pale solid, 3.109 g, 96.53%.

$^1$H NMR (500 MHz, Benzene-d$_6$) δ 7.90 (s, 1H), 7.83 (s, 1H), 7.66 (s, 3H), 7.09 (s, 5H), 7.09 (s, 5H). $^{13}$C NMR (126 MHz, Benzene-d$_6$) δ 141.54, 140.05, 138.35 (q, J=3.8 Hz), 135.84 (q, J=32.0 Hz), 133.02 (q, J=33.0 Hz), 132.02 (q, J=33.7 Hz), 129.98 (q, J=3.5 Hz), 128.29, 127.91 (d, J=2.4 Hz), 127.13 (q, J=4.2 Hz), 124.15 (q, J=274.2 Hz), 123.70 (q, J=273.2 Hz), 123.37 (q, J=273.2 Hz). $^{19}$F NMR (470 MHz, Benzene-d$_6$) δ−56.40, −63.31, −63.58. $^{11}$B NMR (160 MHz, Benzene-d$_6$) δ 67.58.

Catalyst Sample C7 was prepared as follows:

Preparation of tris(2,5-bis(trifluoromethyl)phenyl)borane

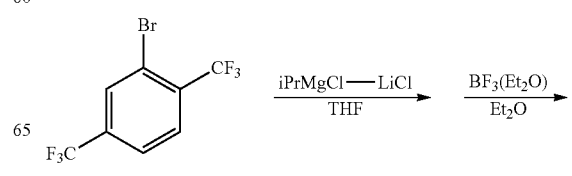

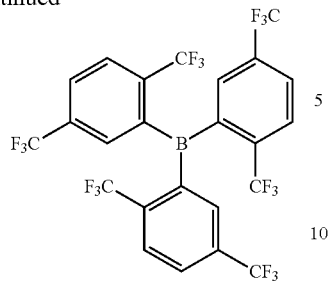

This reaction was carried out in a manner similar to a previously reported procedure.[2] Isopropylmagnesium chloride-lithium chloride (46.0 mL, 58.0 mmol, 1.26 M solution in THF) was added to a solution of 1-bromo-2,5-bis(trifluoromethyl)benzene (17.05 g, 58.2 mmol) in THF (250 mL) which was in an acetone bath cooled with dry ice (−76° C.). After the addition was complete, the reaction flask was transferred to an ice bath (0° C.) and the reaction mixture was stirred for 2 hours. The reaction mixture was cooled to −78° C. and boron trifluoride diethyletherate (2.43 mL, 2.74 g, 19.3 mmol) in 15 mL of ether was added. The reaction mixture was allowed to warm to room temperature while it was stirred over the weekend. The volatiles were removed from the solution to give a reddish solid, 12.77 g. The residue was extracted with toluene and filtered. The volatiles were removed under reduced pressure to give a pink powder, 10.75 g. The solids were extracted with methylene chloride to give a light violet solution. The solution was placed overnight in the freezer. The supernatant was decanted from the very light pinkish crystalline material which formed. The material was dried overnight under reduced pressure. Yield: 7.0003 g, 55.73%.

[2] Herrington, T. J.; Thom, A. J. W.; White, A. J. P.; Ashley, A. E. *Dalton Trans.* 2012, 41, 9019.

TH-free product: $^1$H NMR (400 MHz, Benzene-$d_6$) δ 7.57 (s, 1H), 7.13 (s, 3H), 7.08 (dd, J=8.3, 1.8 Hz, 3H). $^{13}$C NMR (101 MHz, Benzene-$d_6$) δ 141.10, 136.50 (q, J=32.2 Hz), 132.81 (q, J=33.1 Hz), 131.59 (q, J=3.8 Hz), 128.85 (q, J=3.7 Hz), 127.45 (q, J=3.4, 2.1 Hz), 123.93 (q, J=274.6 Hz), 123.59 (q, J=273.1 Hz). $^{19}$F NMR (376 MHz, Benzene-$d_6$) δ −56.48, −63.77. $^{11}$B NMR (160 MHz, Benzene-$d_6$) δ 68.81.

Catalyst sample C8, bis(3,5-bis(trifluoromethyl)phenyl)(2,3,5,6-tetrafluoro-4-trifluoromethylphenyl)borane THF adduct, was prepared as follows:

Preparation of lithium(tetrahydrofuranate) bis(3,5-bis(trifluoromethyl)phenyl)(2,3,5,6-tetrafluoro-4-trifluoromethylphenyl)isopropoxyborate

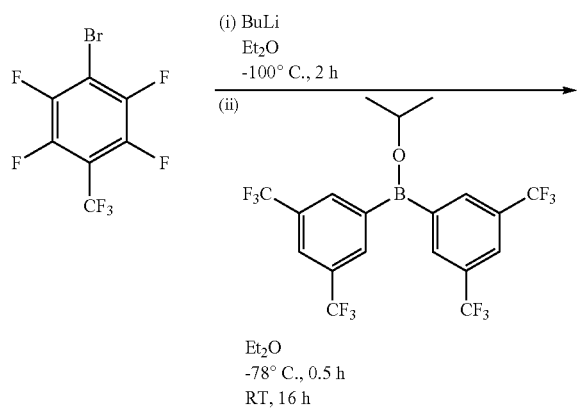

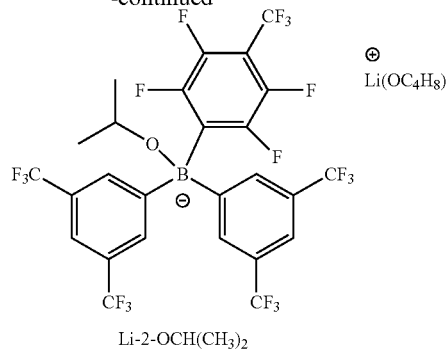

n-Butyllithium (3.00 mL, 2.54 M in hexanes, 7.61 mmol) was added to a cold (between −101° C. and −99° C., CO$_2$(s), then N$_2$(l) methanol bath) solution of 1-bromo-2,3,5,6-tetrafluoro-4-trifluoromethylbenzene (2.26 g, 7.61 mmol) in diethyl ether (100 mL) with stirring. The reaction mixture was stirred for 2 hours at −100° C. then was allowed to warm up to −76° C. Bis(3,5-bis(trifluoromethyl)phenyl)isopropoxy-borane (3.78 g, 7.61 mmol) in ether (10 mL) was added slowly to the reaction mixture. The reaction mixture was allowed to warm slowly to ambient temperature while stirring overnight. The next day, the pale-yellow, nearly clear solution was filtered and the volatiles were removed from the filtrate under reduced pressure to give a crystalline-appearing solid. The solid was washed with hexane, filtered, and dried under reduced pressure. An aliquot of the solid was removed for NMR analysis. It had limited solubility in benzene. The aliquot was dissolved in THF and the volatiles were removed under reduced pressure and then analyzed again by NMR in benzene. Yield: 6.16 g, 93.2%.

$^1$H NMR (500 MHz, Benzene-$d_6$) δ 8.32 (s, 4H), 7.85 (s, 2H), 3.47 (h, J=6.2 Hz, 1H), 3.26-3.17 (m, 4H), 1.24-1.16 (m, 4H), 0.55 (d, J=6.2 Hz, 6H). $^{13}$C NMR (126 MHz, Benzene-$d_6$) δ 144.07 (d, J=259.4 Hz), 134.41, 133.82, 133.48 (d, J=187.5 Hz), 130.59 (q, J=32.2 Hz), 130.45 (q, J=31.8 Hz), 126.40-123.43 (m), 125.84, 124.97 (q, J=272.4 Hz), 119.94 (p, J=4.0 Hz), 118.92 (d, J=190.9 Hz), 109.57 (d, J=22.7 Hz), 68.38, 65.30, 25.64, 25.13. $^{19}$F NMR (470 MHz, Benzene-$d_6$) δ −56.26 (t, J=20.7 Hz), −62.59, −137.04, −141.73. $^{11}$B NMR (160 MHz, Benzene-$d_6$) δ 1.20.

Preparation of bis(3,5-bis(trifluoromethyl)phenyl)(2,3,5,6-tetrafluoro-4-trifluoromethylphenyl)borane tetrahydrofuranate, THF Adduct

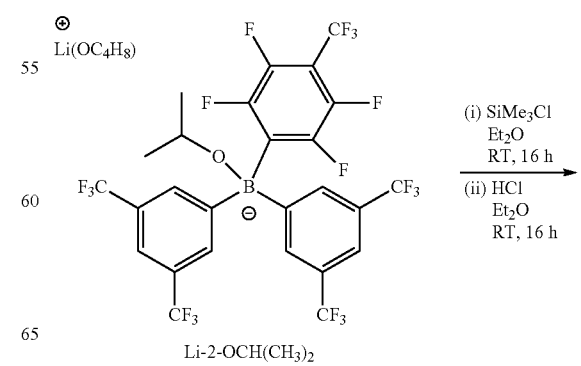

-continued

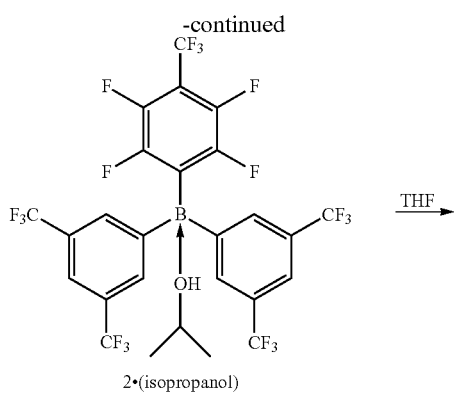

2·(isopropanol)

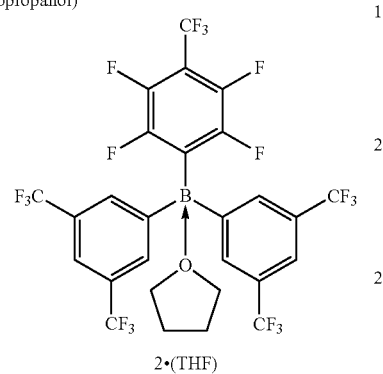

2·(THF)

To a solution of lithium(tetrahydrofuranate) bis(3,5-bis(trifluoromethyl)phenyl)(2,3,5,6-tetrafluoro-4-(trifluoromethyl)phenyl)isopropoxyborate (6.16 g, 7.10 mmol) in diethyl ether (100 mL) was added chlorotrimethylsilane (2.00 mL, 18.4 mmol) with stirring. The reaction mixture was stirred overnight. The next day, analysis of an aliquot of the reaction mixture by $^{19}$F NMR spectroscopy revealed that no reaction had occurred. Hydrogen chloride solution in ether (7.00 mL, 2.0 M, 14.0 mmol) was added and the reaction mixture was stirred overnight. The next day, analysis of an aliquot of the reaction mixture by $^{19}$F NMR spectroscopy revealed that the reaction was complete. The mixture was filtered and the volatiles were removed from the filtrate under reduced pressure. The resultant residue was dissolved in toluene, filtered, and the volatiles were removed from the filtrate under reduced pressure to give 4.50 g of crude product. The colorless, pasty solid was washed with hexane and filtered to give a colorless powder, which was dried under reduced pressure. NMR analysis of the powder revealed that one molecule of isopropanol remained in the coordination sphere of the borane. Yield of the borane as a isopropanol adduct: 2.45 g, 52.8%.

A portion of the borane isopropanol adduct (1.811 g) was dissolved in ether (40 mL) and THF (10 mL) was added to the solution. The solution was allowed to evaporate slowly to give large crystals. The supernatant was removed, and the very pale, yellow crystals were washed with hexane. The crystals were dried under reduced pressure (1.08 g). The crystals were analyzed by X-ray crystallography and found to be the borane isopropanol adduct. The THF had not displaced the coordinated alcohol. The supernatant solution from the crystals and the hexane washings were combined and concentrated under vacuum to give a second crop of crystals (0.422 g). The second crop of crystals was washed and dried in the same manner as the first crop. NMR analysis showed the presence of coordinated isopropanol, but little or no THF. THF was added and then the volatiles were removed under reduced pressure. NMR analysis showed the presence of THF, but still some isopropanol. The solid was dissolved in THF and then pumped off. This was repeated five more times to give the THF adduct of the product as a white powder. Yield: 0.413 g, 22.4%.

THF adduct:

$^1$H NMR (400 MHz, Benzene-d$_6$) δ 7.87 (s, 4H), 7.80 (s, 4H), 3.02-2.93 (m, 4H), 0.78-0.72 (m, 4H). $^{13}$C NMR (126 MHz, Benzene-d$_6$) δ 147.98 (td, J=16.5, 3.6 Hz), 146.05 (tt, J=11.8, 4.1 Hz), 145.58 (d, J=20.9 Hz), 143.50 (d, J=20.1 Hz), 133.44, 131.39 (q, J=32.6 Hz), 124.24 (q, J=272.7 Hz), 121.78 (t, J=4.0 Hz), 121.45 (q, J=274.4 Hz), 109.38-108.10 (m), 73.75, 23.90. $^{19}$F NMR (376 MHz, Benzene-d$_6$) δ −56.57 (t, J=21.0 Hz), −62.95, −130.60 (dd, J=22.5, 13.2 Hz), −140.71 (qt, J=19.7, 8.6 Hz). $^{11}$B NMR (160 MHz, Benzene-d$_6$) δ 7.22. The catalyst samples prepared as described above in Reference Example 2 are shown below.

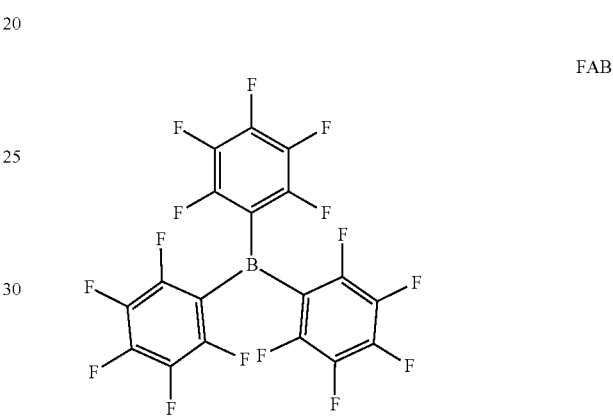

FAB

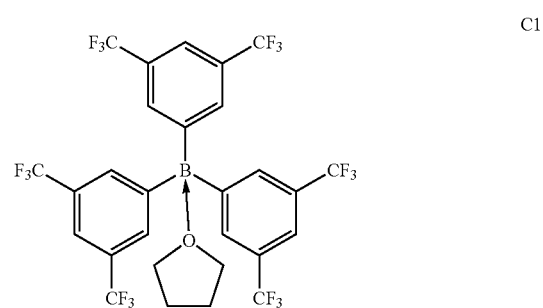

C1

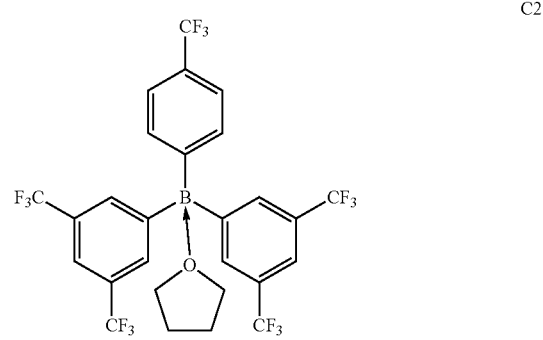

C2

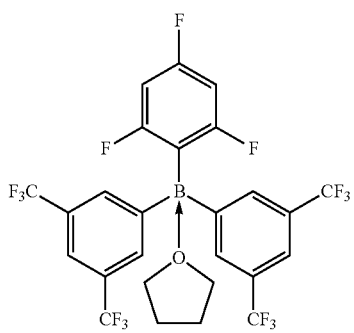

C3

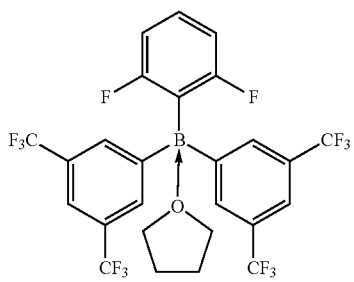

C4

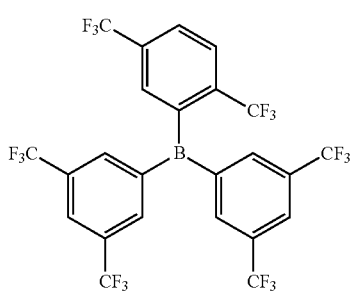

C5

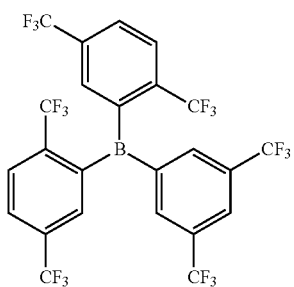

C6

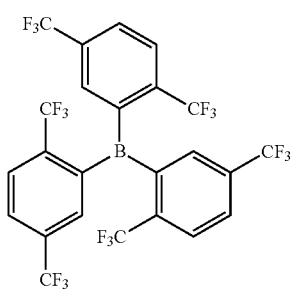

C7

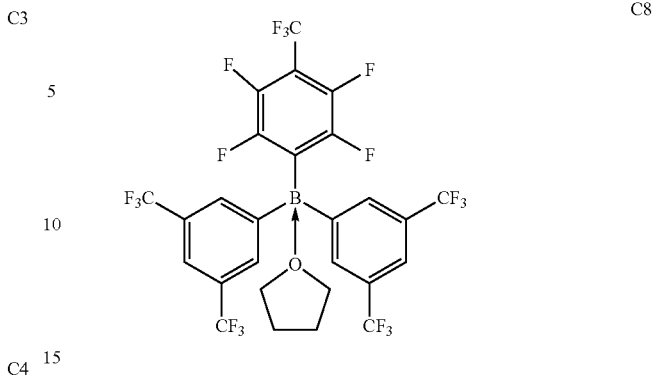

C8

Structures of fluorinated arylborane Lewis acid catalyst samples C1 to C8, and commercially available FAB, are shown above. Structure C1 is tris(3,5-bis(trifluoromethyl)phenyl)borane THF adduct (corresponding to starting material A1) in the claims). Structure C2 is bis(3,5-bis(trifluoromethyl)phenyl)(4-trifluoromethylphenyl)borane THF adduct corresponding to starting material A2) in the claims). Structure C3 is bis(3,5-bis(trifluoromethyl)phenyl)(2,4,6-trifluorophenyl)borane THF adduct (corresponding to starting material A3) in the claims). Structure C4 is bis(3,5-bis(trifluoromethyl)phenyl)(2,6-difluorophenyl)borane THF adduct (corresponding to starting material A4) in the claims). Structure C5 is bis(3,5-bis(trifluoromethyl)phenyl)(2,5-bis(trifluoromethyl)phenyl)borane (corresponding to starting material A5) in the claims). Structure C6 is (3,5-bis(trifluoromethyl)phenyl)bis(2,5-bis(trifluoromethyl)phenyl)borane (corresponding to starting material A6) in the claims). Structure C7 is tris(2,5-bis(trifluoromethyl)phenyl)borane. Structure C8 is bis(3,5-bis(trifluoromethyl)phenyl)(2,3,5,6-tetrafluoro-4-trifluoromethylphenyl)borane THF adduct (corresponding to starting material A7) in the claims).

Reference Example 3—General Procedure

In a nitrogen-purged glove-box, 1 wt % catalyst solutions were prepared in glass vials by dissolving the solid catalyst samples shown above in anhydrous toluene. In a glass vial was placed the cyclic polyorganohydrogensiloxane (MH-1109, D'x (x=4,5,6), 11.2 g) and a Teflon-coated stir bar. To the stirred solution was added the desired catalyst sample via micropipette (ex. 225 μL) followed by slow addition of the silanol-terminated polydimethylsiloxane fluid (ex. 8.4 g) over the course of 1 hour. Aliquots of the reaction mixture were taken, quenched with one drop of phenylacetylene and analyzed by $^{29}$Si NMR in CDCl$_3$ containing Cr(acac)$_3$ as an NMR relaxation agent (~1 g/100 mL). Conversion was established by comparing the signals of HOSi(Me)$_2$O- (MOH) to MeSiO$_3$ (T). The FAB 5 ppm run (see Table 2) was conducted outside of the glovebox on a nitrogen-purged Schlenk line on a batch scale (MH-1109 104.7 g, silanol-terminated polydimethylsiloxane fluid 80.1 g, FAB in toluene, 105 μL) using a peristaltic pump to deliver the silanol-terminated polydimethylsiloxane fluid over the course of 39 min.

Example 4—General Procedure for Stability Monitoring

In a nitrogen-purged glove-box, the solutions of 1 wt % of the catalyst samples described above were prepared in glass vials by dissolving the solid catalyst sample in anhydrous toluene. In a glass vial was placed the cyclic polyorganohydrogensiloxane silane (MH-1109, 5 g) and a Teflon-coated stir bar. To the stirred solution was added the desired catalyst sample via micropipette (ex. 100.5 μL). Aliquots were sampled over time and quenched with a phenylacetylene/toluene mixture such that the toluene could act as an internal standard. The aliquots were then analyzed by GC. The relative amount of reaction was compared by monitoring the ratio of MH-1109 to toluene standard. The MH-1109 was monitored over time prior to PA Fluid addition. The reaction using only 5 ppm FAB was performed similarly outside of a glovebox using a nitrogen purged glass vial connected to a Schlenk line.

Dehydrogenative Coupling Reaction Results

All fluorinated triarylborane catalyst candidates tested (FAB, C1, C3, C5) showed some ability to catalyze for the dehydrogenative coupling reaction shown below. However, a side reaction (ring-opening polymerization/crosslinking) occurred when using FAB, monitored by the consumption of MH-1109 over time in the presence of the fluorinated triarylborane Lewis acid catalyst. The MH-1109 was monitored over time prior to PA Fluid addition. The stability study using only 5 ppm loading of FAB gelled shortly after the 2-hour aliquot was measured. The study using 100 ppm loading of FAB gelled almost immediately upon catalyst addition. All studies using one of samples C1, C3 or C5 did not gel and showed minimal sign of reaction with MH-1109 up to 24 hours after catalyst addition, an unexpected result owing to the similarity of the catalyst structures. This highly improved pot life is desirable for commercial-scale manufacturability.

Dehydrogenative coupling model reaction. Note that the cyclic siloxane may have 4-6 siloxane units per molecule and the corresponding cyclic groups in the product may each have 4-6 siloxane groups.

TABLE 2

Conversion data of dehydrogenative coupling between MH-1109 and silanol fluid with various catalysts.

| Catalyst | Catalyst Loading (ppm) | Time (h) | Conversion |
|---|---|---|---|
| FAB | 100 | —* | —* |
| FAB | 5 | 1 | >99% |
| C1 | 100 | 1.5 | 12% |
| C1 | 100 | 19 | 17% |
| C3 | 100 | 1.5 | 6% |
| C3 | 100 | 19 | 7% |
| C5 | 100 | 1.3 | 99% |
| C5 | 100 | 18.7 | 98% |

*denotes that the reaction gelled prior to addition of silanol fluid (<2 min).

Definitions and Usage of Terms

Abbreviations used in the specification have the definitions in Table 5, below.

TABLE 5

Abbreviations

| Abbreviation | Definition |
|---|---|
| cP | centipoise |
| d | Day |
| Da | Daltons |
| DP | degree of polymerization |
| FTIR | Fourier Transform Infrared |
| g | Grams |
| GC | gas chromatography |
| GPC | gel permeation chromatography |

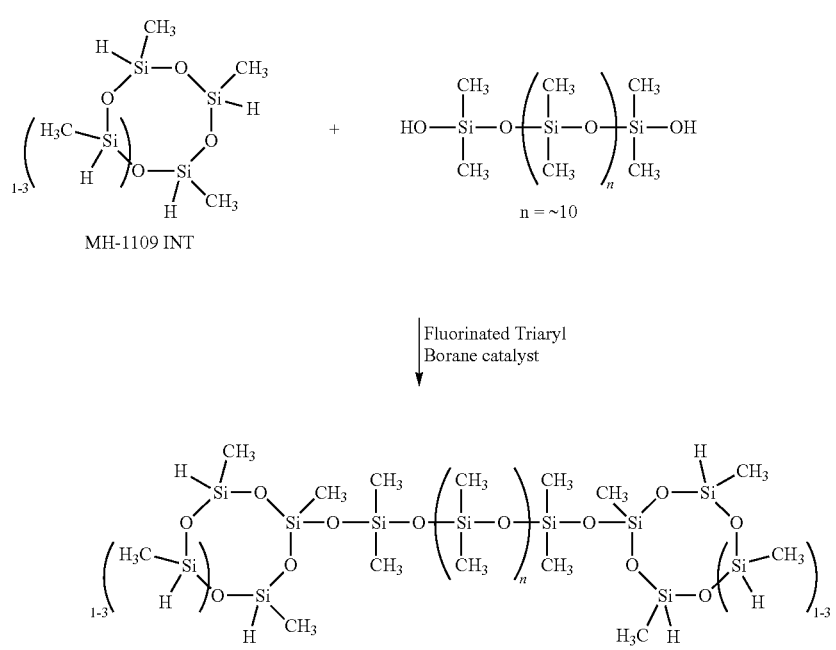

TABLE 5-continued

Abbreviations

| Abbreviation | Definition |
|---|---|
| HPLC | high performance liquid chromatography |
| Me | Methyl |
| mg | Milligrams |
| MHz | megaHertz |
| mL | Milliliters |
| mm | millimeters |
| Mn | number average molecular weight as measured by GPC as described in Reference Example 2 |
| Mp | Peak molecular weight as measured by GPC as described in Reference Example 2 |
| mPa · s | milli-Pascal seconds |
| MS | mass spectroscopy |
| Mw | weight average molecular weight |
| Mz | Z-average molecular weight |
| NMR | nuclear magnetic resonance |
| O.D. | outer diameter |
| PD | polydispersity |
| Ph | phenyl |
| ppm | parts per million |
| PTFE | polytetrafluoroethylene |
| RH | relative humidity |
| RT | room temperature of 25° C. ± 5° C. |
| s | seconds |
| SiH content | hydrogen, as silicon-bonded hydrogen, as measured by $^{29}$Si NMR as described in Reference Example 3 |
| THF | tetrahydrofuran |
| μL | microliter |
| μm | micrometer |
| Vi | Vinyl |

All amounts, ratios, and percentages are by weight unless otherwise indicated. The amounts of all starting materials in a composition total 100% by weight. The SUMMARY and ABSTRACT are hereby incorporated by reference. The articles 'a', 'an', and 'the' each refer to one or more, unless otherwise indicated by the context of specification. The singular includes the plural unless otherwise indicated. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

The term "comprising" and derivatives thereof, such as "comprise" and "comprises" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims.

The invention claimed is:

1. A method for preparing a product comprising a polyfunctional organohydrogensiloxane, where the method comprises:
  1) Combining starting materials comprising
    A) a fluorinated triarylborane Lewis acid of formula

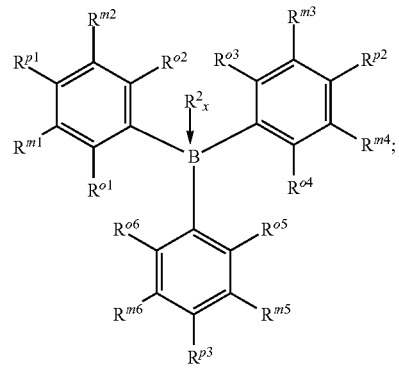

where each of $R^{o1}$, $R^{o2}$, $R^{o3}$, $R^{o4}$, $R^{o5}$, $R^{o6}$, $R^{m1}$, $R^{m2}$, $R^{m3}$, $R^{m4}$, $R^{m5}$, $R^{m6}$, $R^{p1}$, $R^{p2}$, and $R^{p3}$ is independently selected from the group consisting of H, F, and $CF_3$; $R^2$ includes a functional group or a functional polymer group; and subscript x is 0 or 1; with the provisos that: not all of $R^{o1}$, $R^{o2}$, $R^{o3}$, $R^{o4}$, $R^{o5}$, $R^{o6}$, $R^{m1}$, $R^{m2}$, $R^{m3}$, $R^{m4}$, $R^{m5}$, $R^{m6}$, $R^{p1}$, $R^{p2}$, and $R^{p3}$ can be F simultaneously;
not all of $R^{o1-6}$, $R^{m1-6}$, and $R^{p1-3}$ can be H simultaneously; and
when two or more of $R^{o1}$, $R^{o2}$, $R^{o3}$, and $R^{o4}$ are $CF_3$, then $R^{o5}$ and $R^{o6}$ are each selected from H or F;
  B) a hydroxyl-functional organosilicon compound of formula

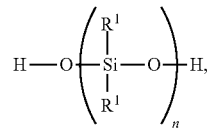

where subscript n is 1 to 2,000, and each $R^1$ is independently selected from the group consisting of monovalent hydrocarbon groups and monovalent halogenated hydrocarbon groups; and
  C) a cyclic polyorganohydrogensiloxane of formula $(RHSiO_{2/2})_v$, where subscript v is 3 to 12; and each R is an independently selected monovalent hydrocarbon group; thereby preparing the product comprising a polyfunctional organohydrogensiloxane and a by-product comprising $H_2$;

optionally 2) during and/or after step 1), removing the $H_2$ generated during formation of the polyfunctional organohydrogensiloxane; and 3) neutralizing residual fluorinated triarylborane compound in the polyfunctional organohydrogensiloxane, wherein where the polyfunctional organohydrogensiloxane has formula a-1):

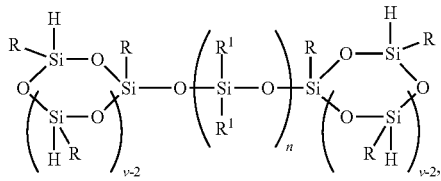

where each subscript v is independently 3 to 12;

each subscript n is independently 1 to 1,000;

each R is an independently selected monovalent hydrocarbon group; and each $R^1$ is independently selected from monovalent hydrocarbon groups and monovalent halogenated hydrocarbon groups, with the proviso that one or more hydrogen atoms in formula a-1) may be replaced by a group of formula a-2):

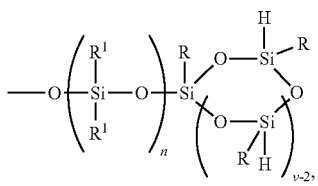

where each of subscript n, subscript v, R and $R^1$ are independently selected and described above.

2. The method of claim 1, where the fluorinated triarylborane is selected from the group consisting of tris(3,5-bis(trifluoromethyl)phenyl)borane THF adduct; bis(3,5-bis(trifluoromethyl)phenyl)(2,4,6-trifluorophenyl)borane THF adduct; and bis(3,5-bis(trifluoromethyl)phenyl)(2,5-bis(trifluoromethyl)phenyl)borane.

3. The method of claim 1, where starting material B) comprises a hydroxyl-terminated polydiorganosiloxane, subscript n is 2 to 1,000, and each $R^1$ is selected from the group consisting of an alkyl group of 1 to 20 carbon atoms, an alkenyl group of 2 to 20 carbon atoms, an aryl group of 6 to 20 carbon atoms, and a halogenated alkyl group of 1 to 20 carbon atoms.

4. The method of claim 1, where in the cyclic polyorganohydrogensiloxane, subscript v is 4 to 10, and each R is an alkyl group of 1 to 6 carbon atoms.

5. The method of claim 1, where step 2) is present.

6. The method of claim 1, where the polyfunctional organohydrogensiloxane has one or more hydrogen atoms in formula a-1) is replaced by a group of formula a-2):

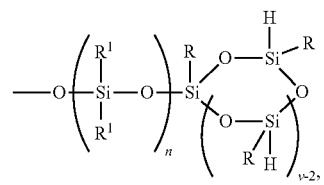

where each of subscript n, subscript v, R and $R^1$ are independently selected and described above.

7. The method of claim 1, where the polyfunctional organohydrogensiloxane has formula:

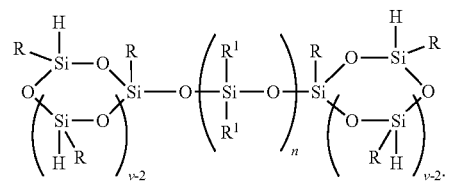

8. The method of claim 1, further comprising recovering the polyfunctional organohydrogensiloxane from the product.

9. A method for preparing a clustered functional organopolysiloxane comprising:

1) preparing a) the product by the method of claim 1, and

2) Combining starting materials comprising a) the product, b) a hydrosilylation reaction catalyst, and c) a reactive species having an average, per molecule at least one aliphatically unsaturated group capable of undergoing an addition reaction with a silicon-bonded hydrogen atom of starting material a) and further comprising one or more curable groups per molecule, where the clustered functional organopolysiloxane has formula a'-1):

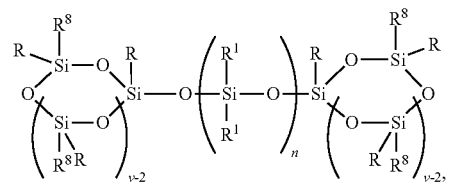

where each subscript v is independently 3 to 12;

each subscript n is independently 1 to 1,000;

each R is an independently selected monovalent hydrocarbon group;

each $R^1$ is independently selected from monovalent hydrocarbon groups and monovalent halogenated hydrocarbon groups; and each $R^8$ is independently selected from the group consisting of H and a curable group, and with the proviso that one or more of $R^8$ may be replaced with a group of formula a'-2);

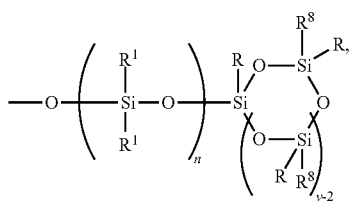

where subscript n, subscript v, R, $R^1$, and $R^8$ are as described above; with the proviso that at least one $R^8$ per molecule is the curable group.

10. The method of claim 9, where the reactive species is selected from the group consisting of:
   i) a silane of formula $R^4{}_y SiR^5{}_{(4-y)}$, where subscript y is 1 to 3, each $R^4$ is the aliphatically unsaturated group capable of undergoing an addition reaction, and each $R^5$ is the curable group; thereby preparing a product comprising a clustered functional organosiloxane; and
   ii) an organic compound of formula $R^6 R^7$, where each $R^6$ is the aliphatically unsaturated group capable of undergoing an addition reaction, and each R/is the curable group.

11. The method of claim 9, where the clustered functional organopolysiloxane has one or more of $R^8$ is replaced with a group of formula a'-2):

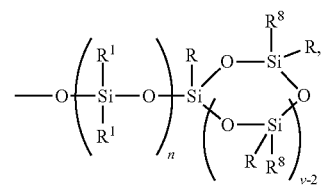

where subscript n, subscript v, R, $R^1$, and $R^8$ are as described above.

12. The method of claim 9, where the clustered functional organopolysiloxane has formula:

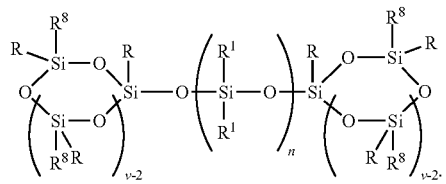

13. A curable composition comprising:
   (I) the product prepared by the method of claim 1, and
   (II) a curing agent.

14. The method of claim 10, where the each $R^5$ is independently selected from the group consisting of an organic group containing an acrylate group, an organic group containing an alcohol group, an organic group containing an alkoxy group, an organic group containing an epoxy group, an organic group containing an isocyanate group, an organic group containing a methacrylate group, and an organic group containing a urethane group; and each $R^7$ is independently selected from the group consisting of an organic group containing an acrylate group, an organic group containing an alcohol group, an organic group containing an alkoxy group, an organic group containing an epoxy group, an organic group containing an isocyanate group, an organic group containing a methacrylate group, and an organic group containing a urethane group.

15. The method of claim 10, where ii) an organic compound is selected from the group consisting of allyl acrylate, allyl glycidyl ether, allyl methacrylate, and combinations thereof.

16. The curable composition of claim 13, further comprising an additional starting material selected from the group consisting of (III) a crosslinker, (IV) a solvent, (V) an adhesion promoter, (VI) a colorant, (VII) a reactive diluent, (VIII) a corrosion inhibitor, (IX) a polymerization inhibitor, (X) a filler, (XI) a filler treating agent, (XII) an acid acceptor, and a combination thereof.

17. A thermal radical curable composition comprising:
   (I) the clustered functional organopolysiloxane prepared by the method of claim 14,
   (II) a curing agent comprising
      (a) a radical initiator,
      (b) a condensation reaction catalyst;
   (III) a crosslinker, and
   (XIII) a reactive resin and polymer.

18. An adhesive composition comprising:
   A) the clustered functional organopolysiloxane prepared by the method of claim 14, where the clustered functional organopolysiloxane has acrylate functional groups, epoxy functional groups, and/or methacrylate functional groups,
   B) a reactive resin and polymer,
   C) a condensation reaction catalyst, and
   D) a free radical initiator.

19. A release coating composition comprising:
   (i) the polyfunctional organohydrogensiloxane prepared by the method of claim 1;
   (ii) a polyorganosiloxane having an average, per molecule, of at least two silicon-bonded aliphatically unsaturated groups capable of undergoing hydrosilylation reaction,
   (iii) a hydrosilylation reaction catalyst, and
   (iv) a hydrosilylation reaction inhibitor.

* * * * *